United States Patent
Hatano

(10) Patent No.: US 7,957,316 B2
(45) Date of Patent: Jun. 7, 2011

(54) NETWORK DEVICE MANAGEMENT APPARATUS AND DEVICE MANAGEMENT METHOD

(75) Inventor: Manami Hatano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 12/393,389

(22) Filed: Feb. 26, 2009

(65) Prior Publication Data

US 2009/0222546 A1    Sep. 3, 2009

(30) Foreign Application Priority Data

Feb. 29, 2008   (JP) .................. 2008-051115

(51) Int. Cl.
*G06F 19/00*   (2006.01)

(52) U.S. Cl. ........ 370/252; 370/254; 370/400; 709/220; 709/223; 717/120

(58) Field of Classification Search .................. 370/259
See application file for complete search history.

(56) References Cited

U.S. PATENT DOCUMENTS

| | | | |
|---|---|---|---|
| 6,246,487 B1 | 6/2001 | Kobayashi et al. | 358/1.13 |
| 7,194,526 B2 | 3/2007 | Kanemitsu | 709/220 |
| 7,403,982 B2 * | 7/2008 | Tanaka et al. | 709/220 |
| 2005/0152288 A1 * | 7/2005 | Datla et al. | 370/256 |
| 2005/0172266 A1 * | 8/2005 | Buskens et al. | 717/120 |

FOREIGN PATENT DOCUMENTS

| | | |
|---|---|---|
| JP | 10-285324 | 10/1998 |
| JP | 11-239136 | 8/1999 |
| JP | 2002-099472 | 4/2002 |
| JP | 2002-171255 | 6/2002 |
| JP | 2003-337771 | 11/2003 |

* cited by examiner

*Primary Examiner* — Chi H. Pham
*Assistant Examiner* — Shick Hom
(74) *Attorney, Agent, or Firm* — Fitzpatrick, Cella, Harper & Scinto

(57) ABSTRACT

When a management operation for changing an IP address of a device is applied to a plurality of devices, and the devices as operation targets include a network device management apparatus, the self apparatus is put to the end of operations, and the IP address change operation is applied to other devices (1808). As a result, even when the network device management apparatus as an operation target device is rebooted, since the management operations for all devices as operation targets are complete so far, a situation that the management operations for other devices are not executed due to an interruption of processing by rebooting can be avoided.

11 Claims, 39 Drawing Sheets

FIG. 6

| | C601 | C602 | C603 | C604 | C605 | C606 | C607 |
|---|---|---|---|---|---|---|---|
| | IP ADDRESS | SELF DEVICE | MAC ADDRESS | DEVICE NAME | INSTALLATION LOCATION | MODEL NAME | STATUS |
| L611 | 192.168.0.4 | No | XXX0048981 | Device-A | Room A | MFP-30x0 | Ready |
| L612 | 192.168.0.8 | No | XXX006138C | Device-B | Room A | MFP-30x0 | Ready |
| L613 | 192.168.0.10 | Yes | XXX0035E92 | Device-C | Room B | MFP-40x5 | Not Ready |
| L614 | 192.168.0.12 | No | XXY0C390A | Device-D | Room B | MF-3xx20P | Ready |
| | . . | . . | . . | . . | . . | . . | . . |
| L699 | 192.168.0.231 | No | XXY0D29AA | Device-X | Room R | MF-4xx90PX | Not Ready |

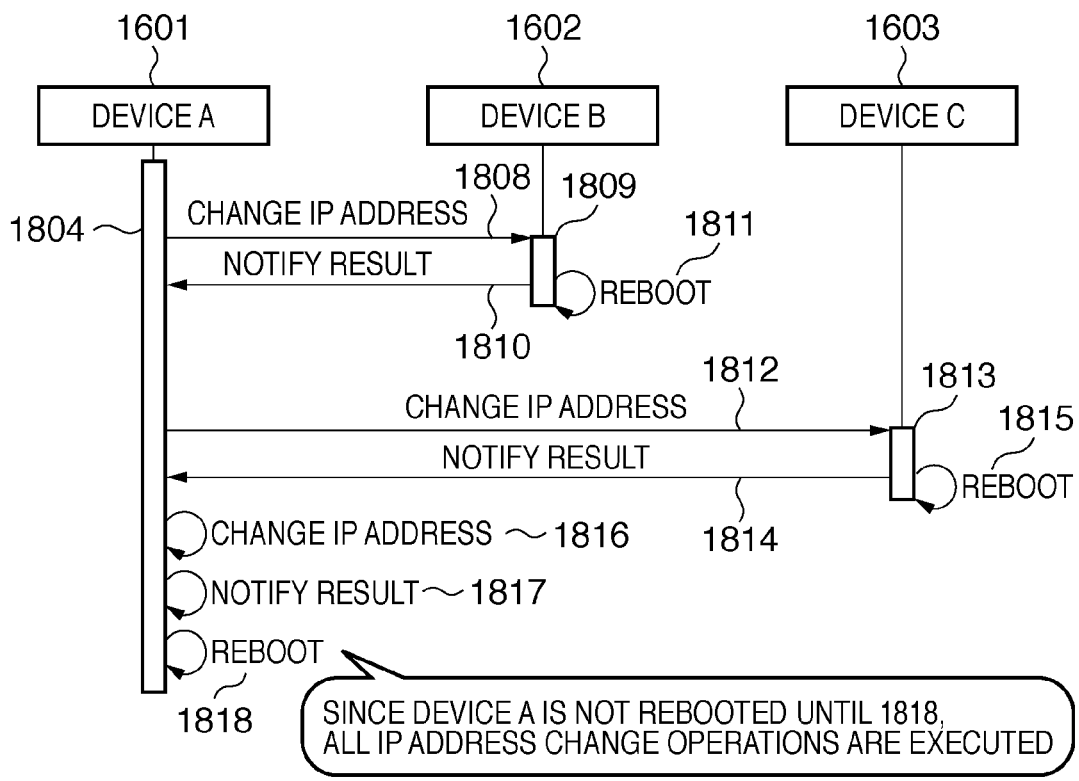

FIG. 26

| PROTOCOL OF SNMP MANAGER | OPERATION FOR PROTOCOL OF SNMP AGENT | |
|---|---|---|
| WHEN ONLY SNMPv1 IS ON | × SWITCH ONLY SNMPv1 TO ON→OFF | ○ SWITCH ONLY SNMPv3 TO ON→OFF |
| WHEN ONLY SNMPv3 IS ON | ○ SWITCH ONLY SNMPv1 TO ON→OFF | × SWITCH ONLY SNMPv3 TO ON→OFF |
| WHEN BOTH SNMPv1 AND SNMPv3 ARE ON | ○ SWITCH ONLY SNMPv1 TO ON→OFF | ○ SWITCH ONLY SNMPv3 TO ON→OFF |

○ NO PROBLEM IS POSED IN SUBSEQUENT MANAGEMENT IF THIS OPERATION IS EXECUTED

× PROBLEM IS POSED IN SUBSEQUENT MANAGEMENT IF THIS OPERATION IS EXECUTED

FIG. 27

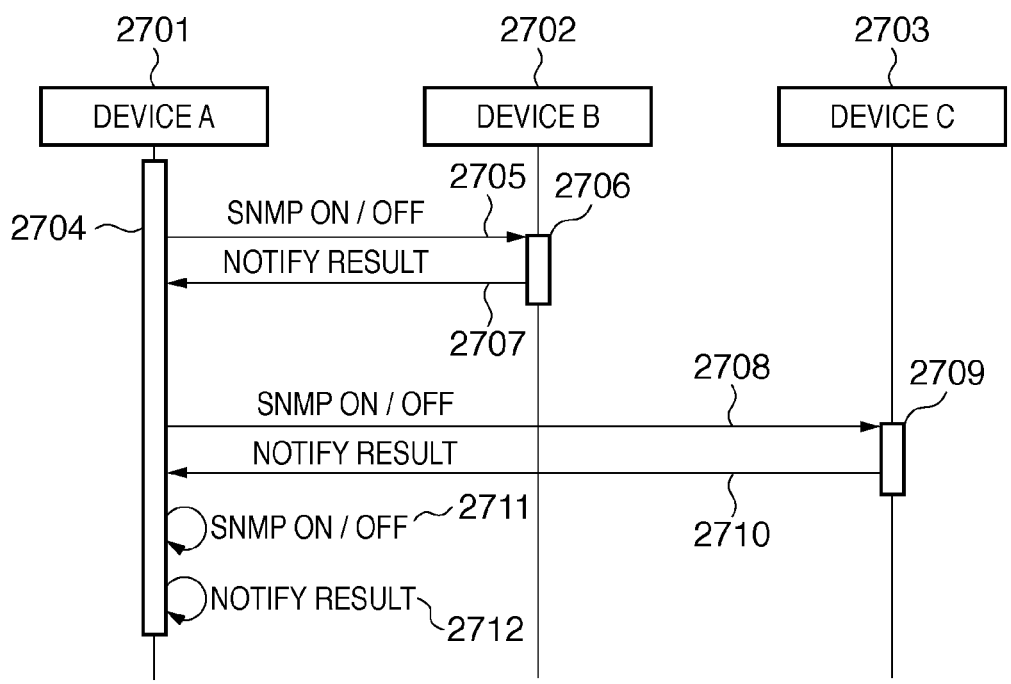

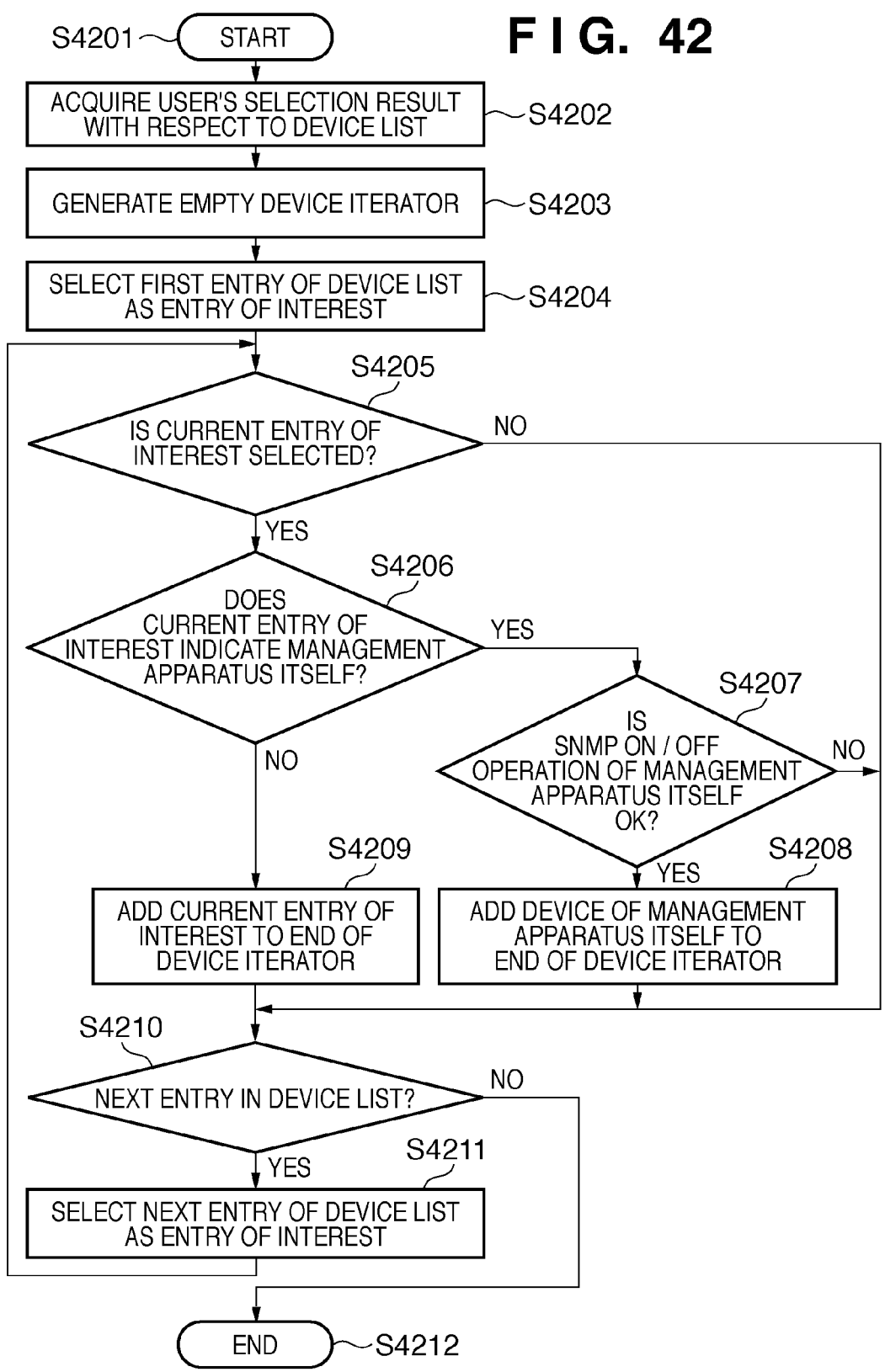

NETWORK DEVICE MANAGEMENT APPARATUS AND DEVICE MANAGEMENT METHOD

BACKGROUND OF THE INVENTION

1. Field of the Invention

The present invention relates to a network device management apparatus which remotely manages network devices connected to a network, and a device management method in that apparatus.

2. Description of the Related Art

Conventionally, in order to manage network devices, it is a common practice to use an independent information processing apparatus as a network device management apparatus independently of devices to be managed. In such a system, the management apparatus itself never becomes a management target. For this reason, the influence of execution of a management operation for a management target device on the management apparatus itself need not be considered. In this system, target devices are detected from a network, and are recorded in a device list in an order they are detected. In general, management operation targets are selected based on that device list, and the management operation is applied to the selected devices in the order they are described in the device list (for example, see Japanese Patent Laid-Open No. 2003-337771 (p. 12, FIG. 8, etc.))

Some conventional systems adopt the following means upon changing the settings of nodes connected to a network. That is, a setting change route is generated based on connection states of network connection points of the nodes on a connection route in the network. Then, the settings are changed in turn from devices farther from the network connection point of the management apparatus in the route (for example, see Japanese Patent Laid-Open No. 2002-171255 (p. 5, FIG. 2, etc.))

In another conventional system, a device has a server function, and provides a means for managing the settings of that device via that server (for example, see Japanese Patent Laid-Open No. 10-285324 (p. 27, FIG. 2, etc.))

Furthermore, in still another conventional system, devices have server functions that solely manage themselves, and display links by notifying each other of the links based on the HTTP protocol. Such system is contributory to individual management of a plurality of devices by the user (for example, see Japanese Patent Laid-Open No. 11-239136 (p. 6, FIG. 2, etc.) or Japanese Patent Laid-Open No. 2002-099472 (p. 4, FIG. 1, etc.))

However, of the aforementioned related arts, in the system in which a device itself has a server function of managing the device settings, only the settings of that device are managed.

Of the related arts, devices have server functions, and the server functions of a plurality of devices automatically detect and display links. However, even in such system, the settings of devices have to be managed individually, and the settings cannot be executed for a plurality of devices at the same time.

Furthermore, the aforementioned related art that simultaneously applies a management operation to a plurality of devices does not consider any system in which the management apparatus itself is a management target. Therefore, when the management apparatus itself is a management target, if a management operation is applied to a plurality of devices, the management operation for the management apparatus itself or other devices may often fail due to the influence of a status change of the management apparatus as a result of execution of the management operation to the management apparatus itself and the like.

The related arts include the management apparatus that considers the setting execution order of devices. Even in such case, the management apparatus itself merely undergoes setting lastly as a closest node on the connection route. Therefore, a case in which an operation is inhibited from being executed for a management target device and a case in which a management operation for an arbitrary device fails if an operation is executed for that device after other devices cannot be appropriately processed.

SUMMARY OF THE INVENTION

The present invention has been made in consideration of the above related arts, and to provide a network device management apparatus which can successfully complete a management operation while preventing troubles caused by the management operation and its application order when the management operation is applied to have the management apparatus itself as a network device as a management target, and a management method.

According to one aspect of the present invention, the present invention comprises the following arrangement. That is, a network device management apparatus which can execute a management operation for a plurality of network devices, which are connected to a network and include a self apparatus, as management targets, comprises: a designation unit, configured to designate a management operation to be executed for the plurality of network devices; and an execution unit, configured to determine an order of execution of the management operation for the self apparatus in accordance with a type of the management operation designated by the designation unit, and executes the management operation for the plurality of network devices.

According to another aspect of the present invention, a network device management apparatus which can execute a management operation for a plurality of network devices, which are connected to a network and include a self apparatus, as management targets, comprises: a designation unit, configured to designate a management operation to be executed for the plurality of network devices; a determination unit, configured to determine, in accordance with a type of the management operation designated by the designation unit, whether or not execution of the management operation for the self apparatus is adequate; and an execution unit, configured to execute the management operation for network devices except for the self apparatus when the determination unit determines that execution for the self apparatus is inadequate, and executes the management operation for the plurality of network devices including the self apparatus when the determination unit determines that execution for the self apparatus is adequate.

According to the present invention, even when a network device management apparatus runs on a network device, a management operation is appropriately applied to a plurality of network devices including that device itself, and execution of the management operation can be successfully completed.

Further features of the present invention will become apparent from the following description of exemplary embodiments with reference to the attached drawings.

BRIEF DESCRIPTION OF THE DRAWINGS

FIG. 6 is a view showing an example of a device list of the management apparatus according to the first, second, and third embodiments of the present invention;

FIG. 18 is a sequence chart for explaining a case in which the processing order is considered when the management apparatus according to the first and second embodiments of the present invention changes the IP addresses of a plurality of devices including the self device;

FIG. 19 is a view showing an example of a site certificate used for an HTTPS protocol by the management apparatus according to the first, second, and third embodiments of the present invention and other devices;

FIG. 26 is a table showing the states of problems caused depending on combinations when the management apparatus according to the first embodiment of the present invention executes SNMP protocol ON/OFF switching operations;

FIG. 27 is a sequence chart for explaining a case in which the management apparatus according to the first, second, and third embodiments of the present invention executes an SNMP ON/OFF operation for itself when it executes that operation for a plurality of devices including the self device;

FIG. 42 is a flowchart for explaining an example of the sequence executed when the management apparatus according to the third embodiment of the present invention generates a device iterator from devices selected by the user when it executes an SNMP ON/OFF operation of devices selected by the user.

DESCRIPTION OF THE EMBODIMENTS

Embodiments according to the present invention will be described hereinafter. This embodiment relates to a network device management apparatus installed in a network device. That is, the network device management apparatus itself (to be referred to as a self apparatus hereinafter) can be selected as a network device as a management target. When a management operation to be executed is designated, and the self apparatus is selected as a management target in this embodiment, the management apparatus determines an order of execution of the management operation for the self apparatus according to the type of the management operation. More specifically, upon execution of a management operation that requires resetting a network device as a management target such as an IP address re-setting instruction via SNMP and a protocol stack ON/OFF setting instruction, the execution order of the management operation for the self apparatus is set to be the end of management target devices. On the other hand, upon execution of a management operation for other devices using the management operation result of the self apparatus such as a DNS server re-setting instruction and a site certificate update instruction, the execution order of the management operation for the self apparatus is set to be the head of target devices.

When the self apparatus is selected as a management target, the management apparatus checks according to the type of the management operation whether or not execution of the management operation for the self apparatus is adequate. The types of management operations which are inadequate to be executed for the self apparatus include downloading of a file from the network management apparatus via HTTPS that requires to provide a site certificate, delivery of device setting information, and an ON/OFF setting operation of a protocol used in the management operation. When the management operation of such type is designated, the management apparatus executes the management operation for network devices as management targets except for the self apparatus. These arrangements and sequences will be described in more detail hereinafter.

First Embodiment

Figure 1:
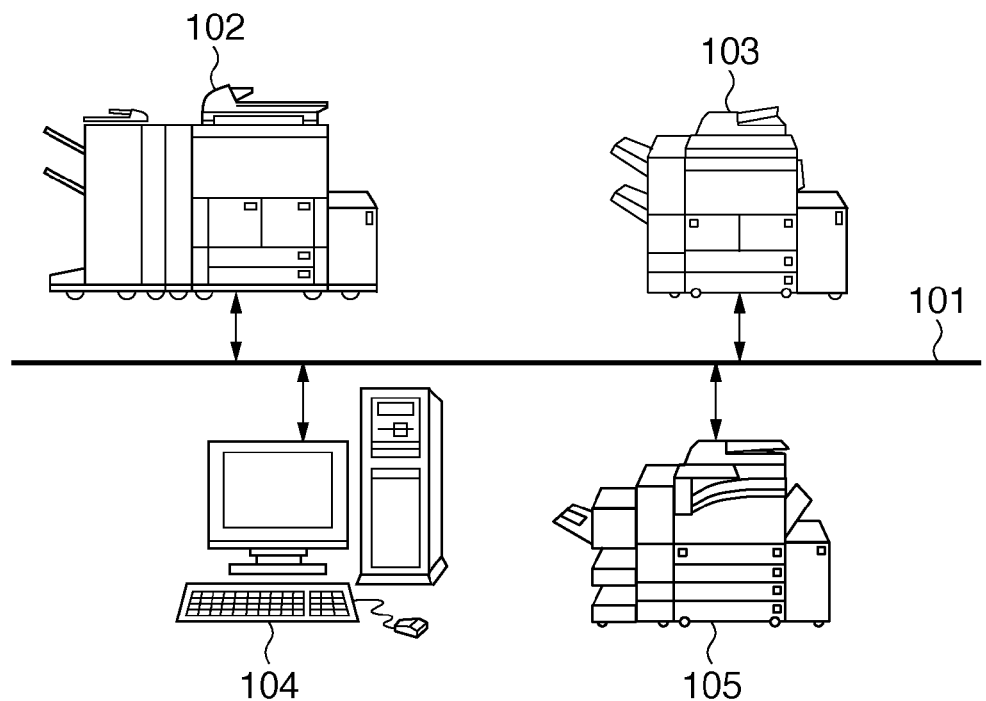
FIG. 1 is a view showing the overall configuration of a network device management system according to the first, second, and third embodiments of the present invention.

The first embodiment of the present invention will be described hereinafter with reference to the drawings. FIG. 1 is a view showing the overall configuration of a network device management system of this embodiment. Reference numeral 101 denotes a network. Reference numeral 102 denotes a multifunctional printer (to be abbreviated as an MFP hereinafter) which serves as a network device management apparatus of the present invention. Reference numeral 103 denotes another MFP. Reference numeral 104 denotes a personal computer (to be abbreviated as a PC hereinafter) as an information processing apparatus used by the user. Reference numeral 105 denotes still another MFP.

Figure 2:
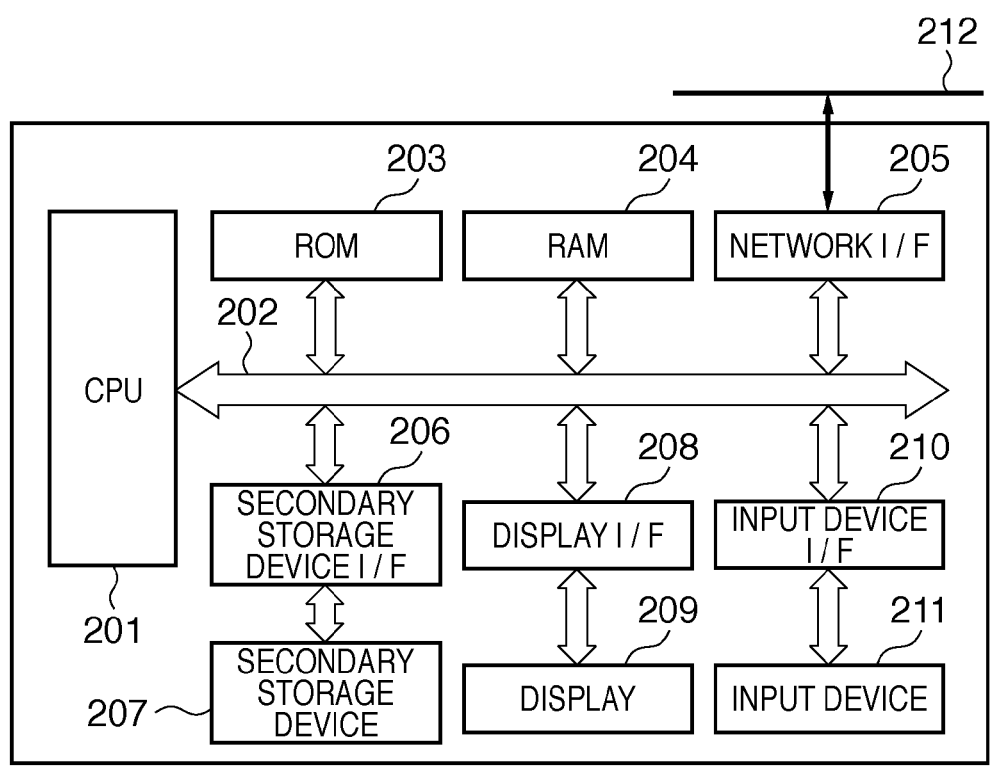
FIG. 2 is a block diagram showing an example of the internal arrangement of a PC according to the first, second, and third embodiments of the present invention.

FIG. 2 is a block diagram showing the internal arrangement of the PC 104 of this embodiment. Reference numeral 201 denotes a central processing unit (to be abbreviated as a CPU hereinafter) of the PC 104. Reference numeral 202 denotes a system bus required to connect peripheral devices to the CPU 201. Reference numeral 203 denotes a read-only primary storage (to be referred to as a ROM hereinafter). Reference numeral 204 denotes a readable/writable primary storage (to be referred to as a RAM hereinafter). Reference numeral 212 denotes the network 101 to which the PC 104 is connected. Reference numeral 205 denotes a network interface ("interface" will be abbreviated as "I/F" hereinafter) required to connect the PC 104 to the network 101. Reference numeral 207 denotes a secondary storage device. Reference numeral 206 denotes a secondary storage device I/F required to connect the secondary storage device 207 to the system bus 202. Reference numeral 209 denotes a display. Reference numeral 208 denotes a display I/F required to connect the display 209 to the system bus 202. Reference numeral 211 denotes an input device. Reference numeral 210 denotes an input device I/F required to connect the input device 211 to the system bus 202.

Figure 3:
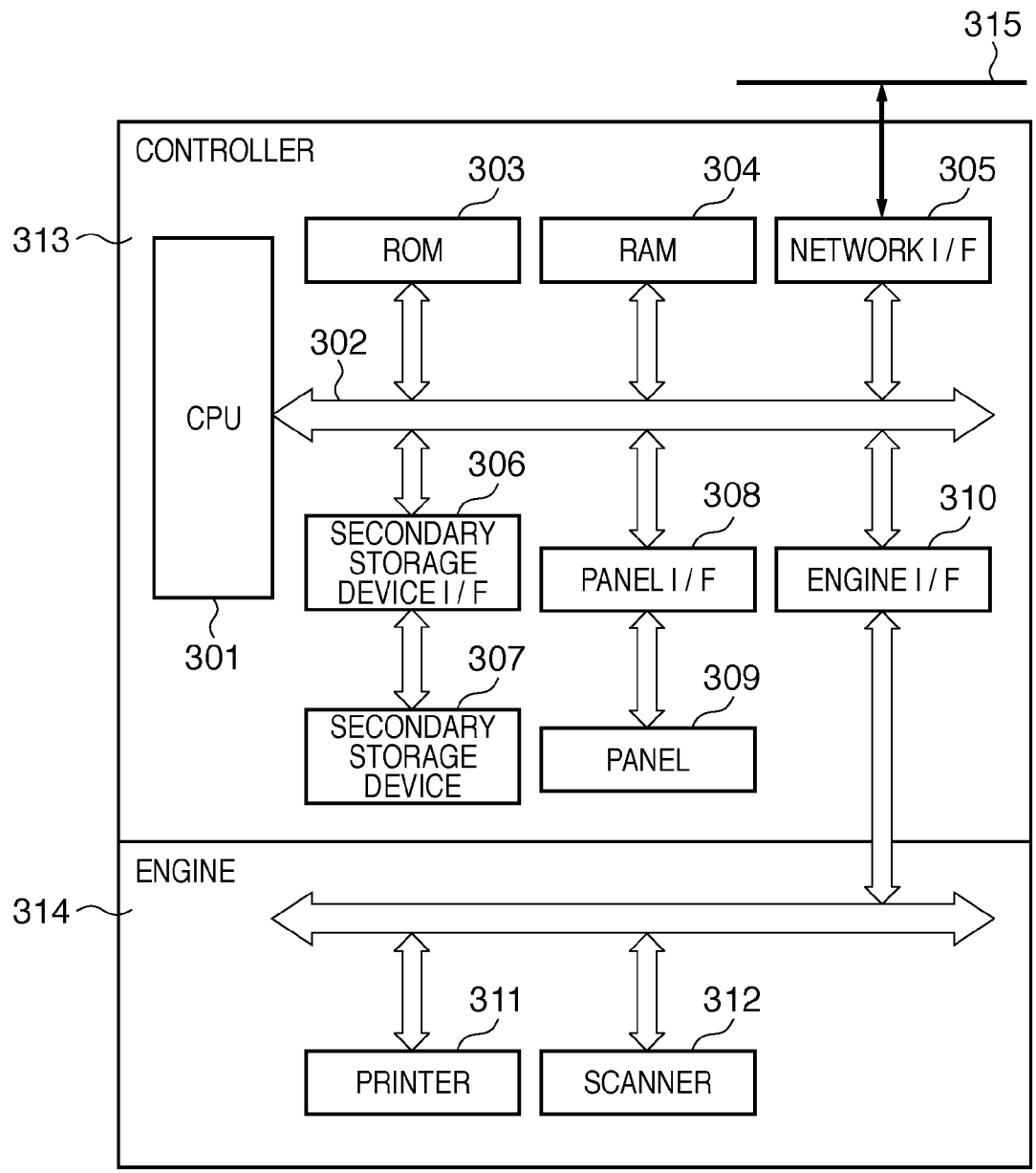
FIG. 3 is a block diagram showing an example of the internal arrangement of an MFP according to the first, second, and third embodiments of the present invention.

FIG. 3 is a block diagram showing an example of the internal arrangement of the MFP of this embodiment. Reference numeral 313 denotes a controller. Reference numeral 314 denotes an engine. Reference numeral 315 denotes the network 101. Reference numeral 301 denotes a CPU of the controller. Reference numeral 302 denotes a system bus of the controller. Reference numeral 303 denotes a ROM of the controller. Reference numeral 304 denotes a RAM of the controller. Reference numeral 305 denotes a network I/F required to connect the MFP to the network 315 via the controller. Reference numeral 307 denotes a secondary storage device. Reference numeral 306 denotes a secondary storage device I/F required to connect the secondary storage device 307 to the system bus 302. Reference numeral 309 denotes an operation panel used to operate the MFP. Reference numeral 308 denotes a panel I/F required to connect the operation panel 309 to the system bus 302. Reference numeral 310 denotes an engine I/F required to interconnect the controller 313 and engine 314. Reference numeral 311 denotes a printer. Reference numeral 312 denotes a scanner.

Figure 4:
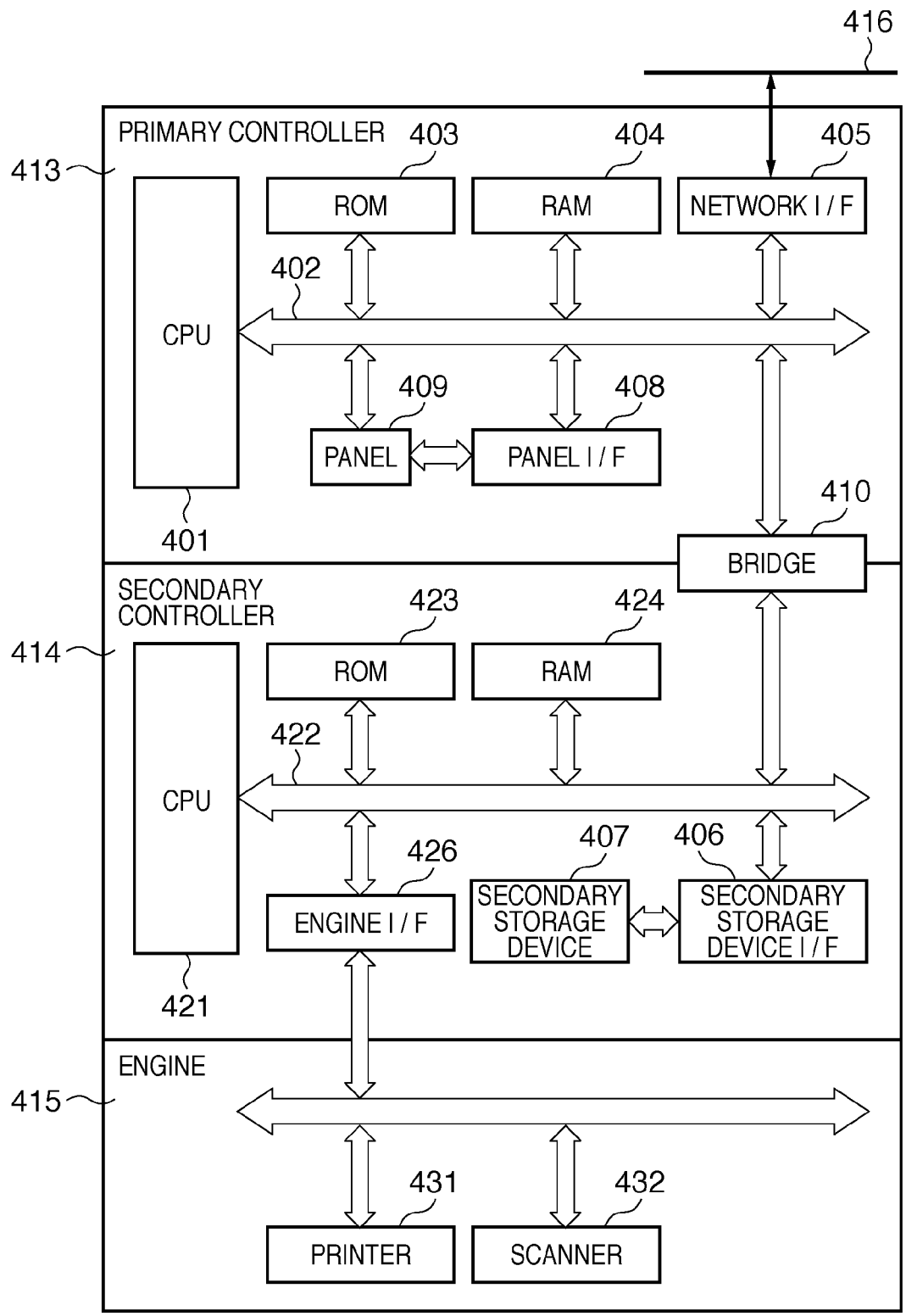
FIG. 4 is a block diagram showing another example of the internal arrangement of an MFP according to the first, second, and third embodiments of the present invention.

FIG. 4 is a block diagram showing another example of the internal arrangement of the MFP of this embodiment. Reference numeral 413 denotes a primary controller. Reference numeral 414 denotes a secondary controller. Reference numeral 415 denotes an engine. Reference numeral 416 denotes the network 101. Reference numeral 401 denotes a CPU of the primary controller 413. Reference numeral 402 denotes a system bus of the primary controller 413. Reference numeral 403 denotes a ROM of the primary controller 413. Reference numeral 404 denotes a RAM of the primary controller 413. Reference numeral 405 denotes a network I/F required to connect the MFP to the network 416 via the primary controller 413. Reference numeral 409 denotes an operation panel. Reference numeral 408 denotes a panel I/F required to connect the operation panel 409 to the system bus 402 of the primary controller. Reference numeral 410 denotes a bridge required to interconnect the primary controller 413 and secondary controller 414. Reference numeral 421 denotes a CPU of the secondary controller 414. Reference numeral 422 denotes a system bus of the secondary controller 414. Reference numeral 423 denotes a ROM of the secondary controller 414. Reference numeral 424 denotes a RAM of the secondary controller 414. Reference numeral 426 denotes an engine I/F required to interconnect the secondary controller 414 and engine 415. Reference numeral 407 denotes a secondary storage device. Reference numeral 406 denotes a secondary storage device I/F required to connect the system bus 422 of the secondary controller and the secondary storage device 407. Reference numeral 431 denotes a printer. Reference numeral 432 denotes a scanner.

<Device List Creation Processing>

The sequence of processing executed when a search module of the MFP serving as the network device management apparatus of this embodiment searches for devices as management targets will be described below with reference to the flowchart of FIG. 5. Note that respective processes described as those to be implemented by respective modules of the management apparatus in the present invention are described under the assumption that the CPU 301 incorporated in the controller 313 of the MFP shown in FIG. 3 interprets and executes these processes. However, the same processes can be executed when the primary controller 413 and secondary controller 414 cooperate via the bridge 410 in the MFP having the arrangement shown in FIG. 4. Such differences between the arrangements in the MFPs are normally hidden from respective modules which are controlled by an operating system (to be abbreviated as an OS hereinafter) which runs on each of these controllers, and will be described below. Therefore, the same processing as the contents to be described below under the assumption of the arrangement shown in FIG. 3 can be executed by the MFP with the arrangement shown in FIG. 4. Also, even an MFP which adopts an arrangement other than those described above can execute the same processing as the contents to be described below as long as an OS having appropriate functions runs.

When the search module conducts a search, it starts processing in step S501. The search module checks in step S502 if the apparatus is connected to the network. If the apparatus is not connected to the network, the process jumps to step S520. If the apparatus is connected to the network, the process advances to step S503. In step S503, the search module reads out a search setting. The search module checks in step S504 if the search setting indicates a broadcast search. If the search setting does not indicate a broadcast search, the process advances to step S510. If the search setting indicates a broadcast search, the process advances to step S505.

In step S505, the search module broadcasts a search packet onto the network. The search module waits for a response in step S506. The search module checks in step S507 if a response is received. If no response is received, the process jumps to step S509. If a response is received, the process advances to step S508.

In step S508, the search module adds a device which returned the response to a device list. After addition, the process advances to step S509. The device list is saved in, for example, a memory.

The search module checks in step S509 if a predetermined time period has elapsed after broadcasting of the search packet in step S505. If the predetermined time period has elapsed, the process advances to step S519. If the predetermined time period has not elapsed yet, the process returns to step S506 to continue the processes.

If the search setting does not indicate a broadcast search in step S504, the process advances to step S510. The search module checks in step S510 if the readout search setting indicates an IP address search. If the search setting does not indicate an IP address search, the process jumps to step S517. If the search setting indicates an IP address search, the process advances to step S511.

In step S511, the search module reads out an IP address to be searched from the search setting. In step S512, the search module transmits a search packet to the readout IP address. In step S513, the search module waits for a response. The search module checks in step S514 if a response is received. If no response is received, the process advances to step S516. If a response is received, the process advances to step S515.

In step S515, the search module adds a device which returned the response to a device list. After addition, the process advances to step S519.

The search module checks in step S516 if a predetermined time period has elapsed after transmission of the search packet in step S512. If the predetermined time period has elapsed, the process advances to step S519. If the predetermined time period has not elapsed yet, the process returns to step S513 to continue the processes.

If it is determined in step S510 that the search setting does not indicate an IP address search, the process jumps to step S517. In step S517, the search module executes processing for reading out required information of the self device (to be also referred to as the self apparatus since it indicates the network device management apparatus itself) in order to execute processing for registering the self device in the device list. In step S518, the search module adds the self device to the device list using the readout information. In this case, the search module sets a "self device flag" in the device list. After that, the process advances to step S519.

The search module checks in step S519 if another search to be executed is set. If YES in step S519, the process returns to step S503 to continue the processes. If NO in step S519, the process advances to step S520. If the process reaches step S520, the search module ends the processing.

<Example of Device List>

Figure 5:
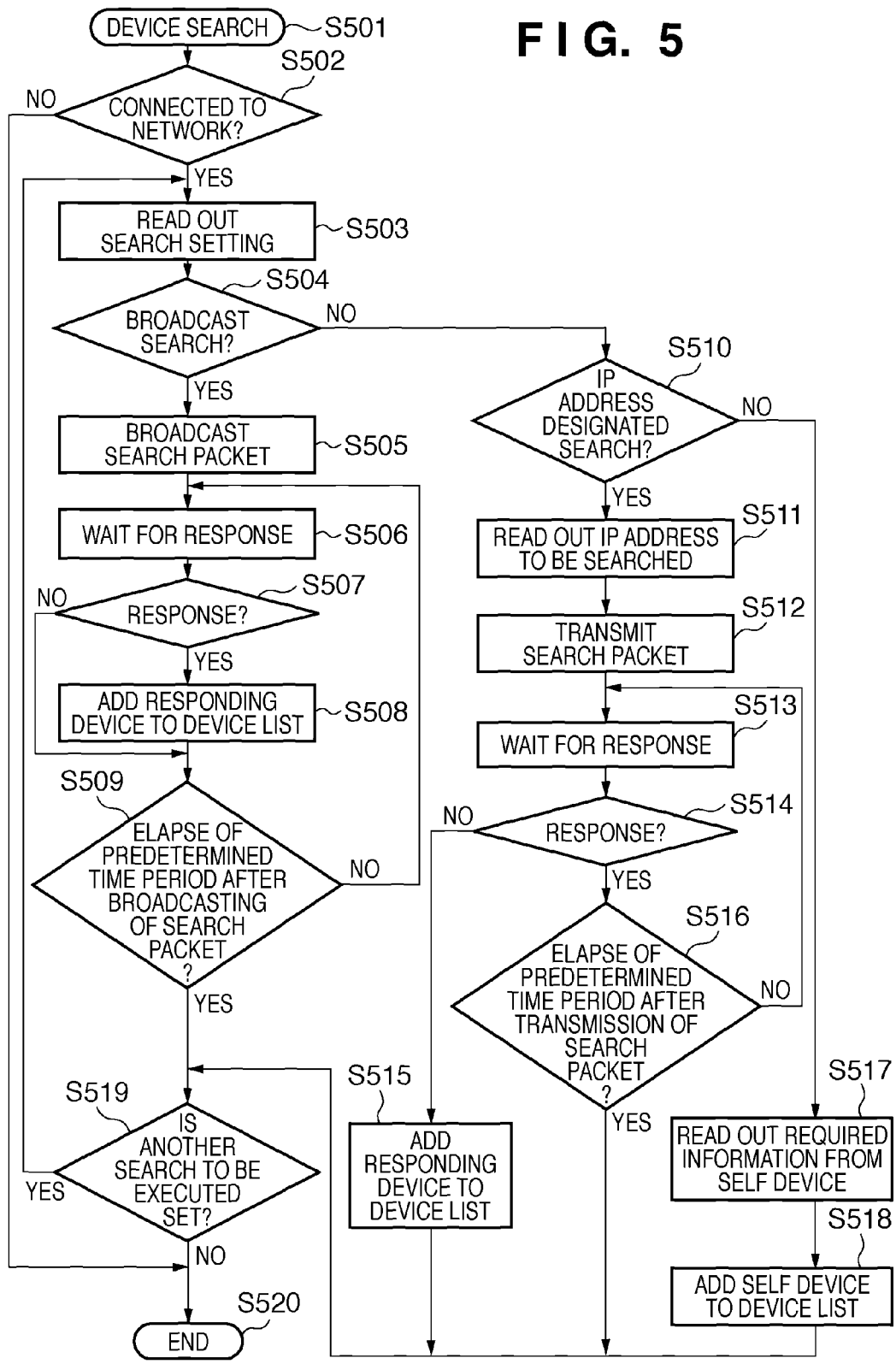
FIG. 5 is a flowchart for explaining the contents of processing executed when a search module of a management apparatus according to the first, second, and third embodiments of the present invention searches for management target devices.

FIG. 6 shows an example of the device list created as a result of execution of the device search processing shown in FIG. 5. A column C601 stores IP addresses of devices registered in this device list. A column C602 stores a flag indicating if such device is the self device. A column C603 stores MAC addresses of these devices. A column C604 stores device names. A column C605 stores installation locations. A column C606 stores model names. A column C607 stores the current statuses of these devices.

Reference numerals L611 to L699 denote examples of entries stored in this device list. These entries store attributes of respective devices. For example, the entry L611 is given a name "Device-A", as indicated by the column C604 of this entry, and corresponds to a device installed at "Room A", as indicated by the column C605. The model name of the device indicated by this entry is "MFP-30x0", as indicated by the column C606. As indicated by the column C602 of this entry, this device is not the management apparatus itself. This device is given an IP address "192.168.0.4", as indicated by the column C601 of this entry, and has a MAC address "XXX0048981". Note that "XXX" stores an arbitrary vendor ID, but it does not influence the operation of this embodiment if it stores any peculiar ID. Also, this device is currently ready to use, as indicated by the column C607 of this entry. The same applies to the entry L612 and subsequent entries. However, since the entry L614 indicates the network device management apparatus itself, the self device flag "YES" is set in the column C602.

<Selection of Management Target Device and Designation of Management Operation>

Figure 7:
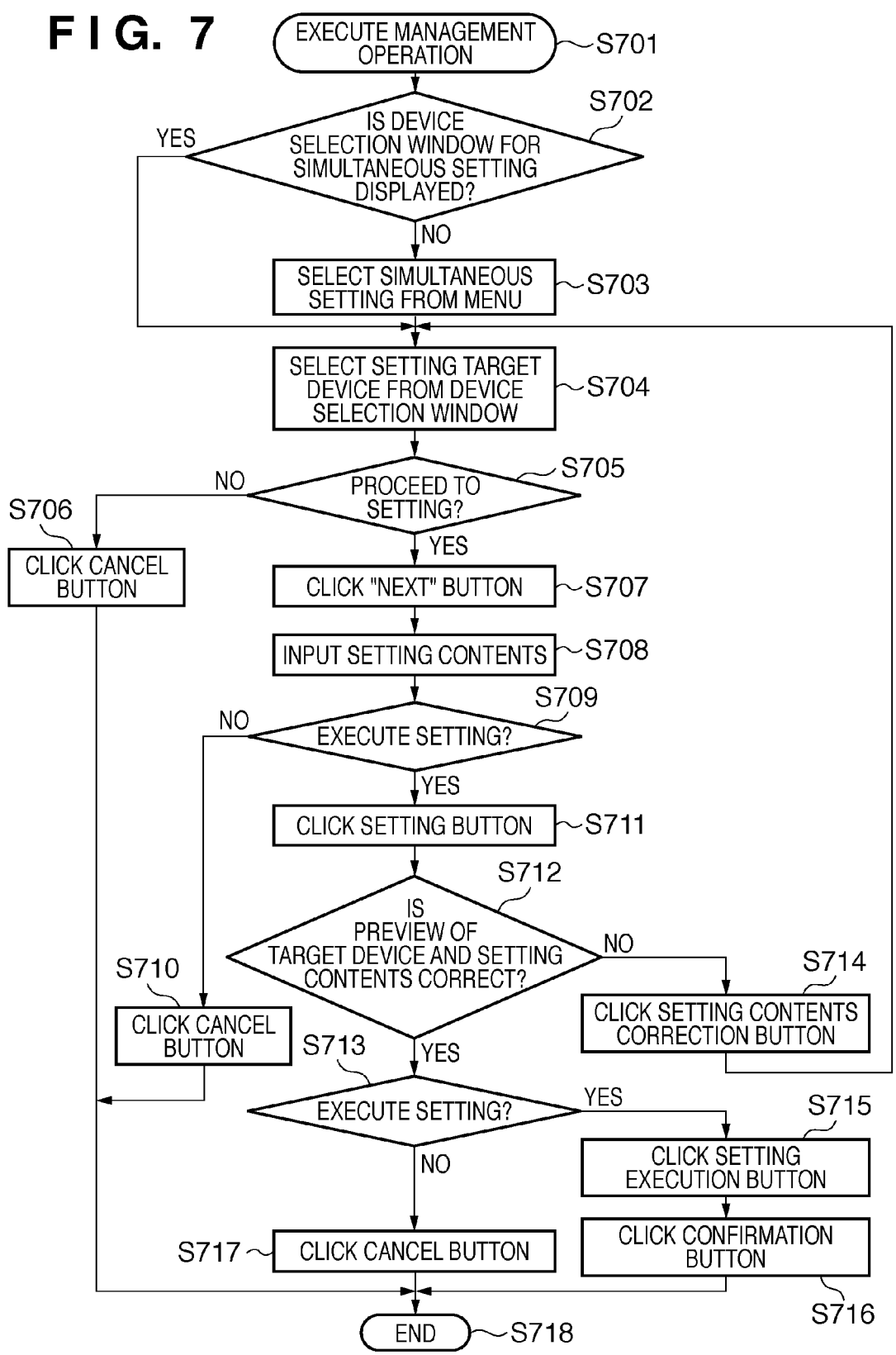
FIG. 7 is a flowchart for explaining an example of the sequence executed when the user of the management apparatus according to the first, second, and third embodiments of the present invention executes device simultaneous settings.

FIG. 7 is a flowchart that describes the sequence executed when the user selects devices from the device list so as to apply a management operation to the selected devices. The user starts an operation from step S701. The user checks in step S702 if the screen displays a device selection window for simultaneous settings. If YES in step S702, the process jumps to step S704. If NO in step S702, the process advances to step S703, and the user selects "device simultaneous setting" from a menu.

Figure 8:
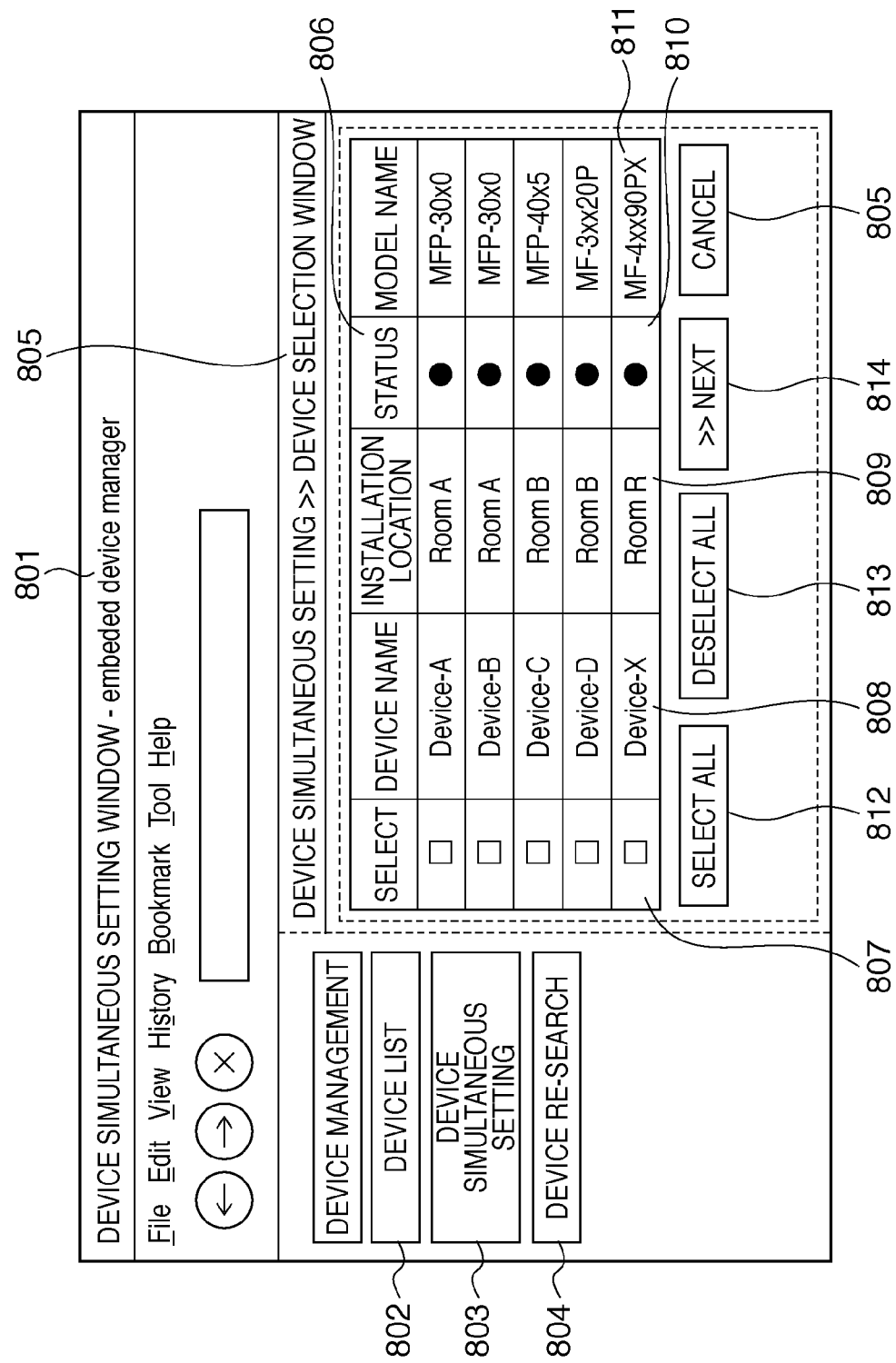
FIG. 8 is a view showing an example of a device selection window of the device simultaneous settings of the management apparatus according to the first, second, and third embodiments of the present invention.

FIG. 8 shows an example of a user interface displayed by the management apparatus of this embodiment in step S704. This example corresponds to a display example of a device selection window for device simultaneous settings. Reference numeral 801 denotes a window of a browser. Reference numeral 802 denotes a device list menu. Reference numeral 803 denotes a device simultaneous setting menu. The user can select "device simultaneous setting" by clicking this device simultaneous setting menu 803 in step S703. Reference numeral 804 denotes a device re-search menu. Reference numeral 805 denotes a window type indication indicating what kind of window the currently displayed window is. Reference numeral 806 denotes a device selection table used to make device selection. Reference numeral 807 denotes a column which displays check boxes used to select devices. Reference numeral 808 denotes a column used to display device names. Reference numeral 809 denotes a column used to display the installation locations. Reference numeral 810 denotes a column used to display the current statuses of devices. Reference numeral 811 denotes a column used to display the model names of devices. Reference numeral 812 denotes a "select all" button used to change all displayed devices to selected states. Reference numeral 813 denotes a "deselect all" button used to cancel the selected states of all devices if any of devices displayed on this window is in a selected state. Reference numeral 814 denotes a "next" button used to settle the selected states and to advance to the next step. Reference numeral 815 denotes a "cancel" button used to cancel selection.

If the user selects the device simultaneous setting menu 803 in step S703, the window changes to the device selection window shown in FIG. 8. The window displayed when it is determined in step S702 that the device selection window has already been displayed is that shown in FIG. 8. When the process advances to step S704, the user views this window.

In step S704, the user selects devices as setting targets from this device selection window (FIG. 8). The user can also select devices by checking or unchecking the check boxes in the column 807. In addition, the user can finally select desired devices using selection of all devices by clicking the button 812 or deselection of all selected devices by clicking the button 813 together.

After completion of selection, the user determines in step S705 whether or not to proceed to the setting. If the user wants to cancel the setting, the process advances to step S706, and he or she clicks the cancel button 815. In this case, the process directly advances to step S718. If the user wants to proceed to the setting, the process advances to step S707. In step S707, the user clicks the "next" button 814. Then, the management apparatus of this embodiment changes the window to a setting contents input window.

Figure 9:
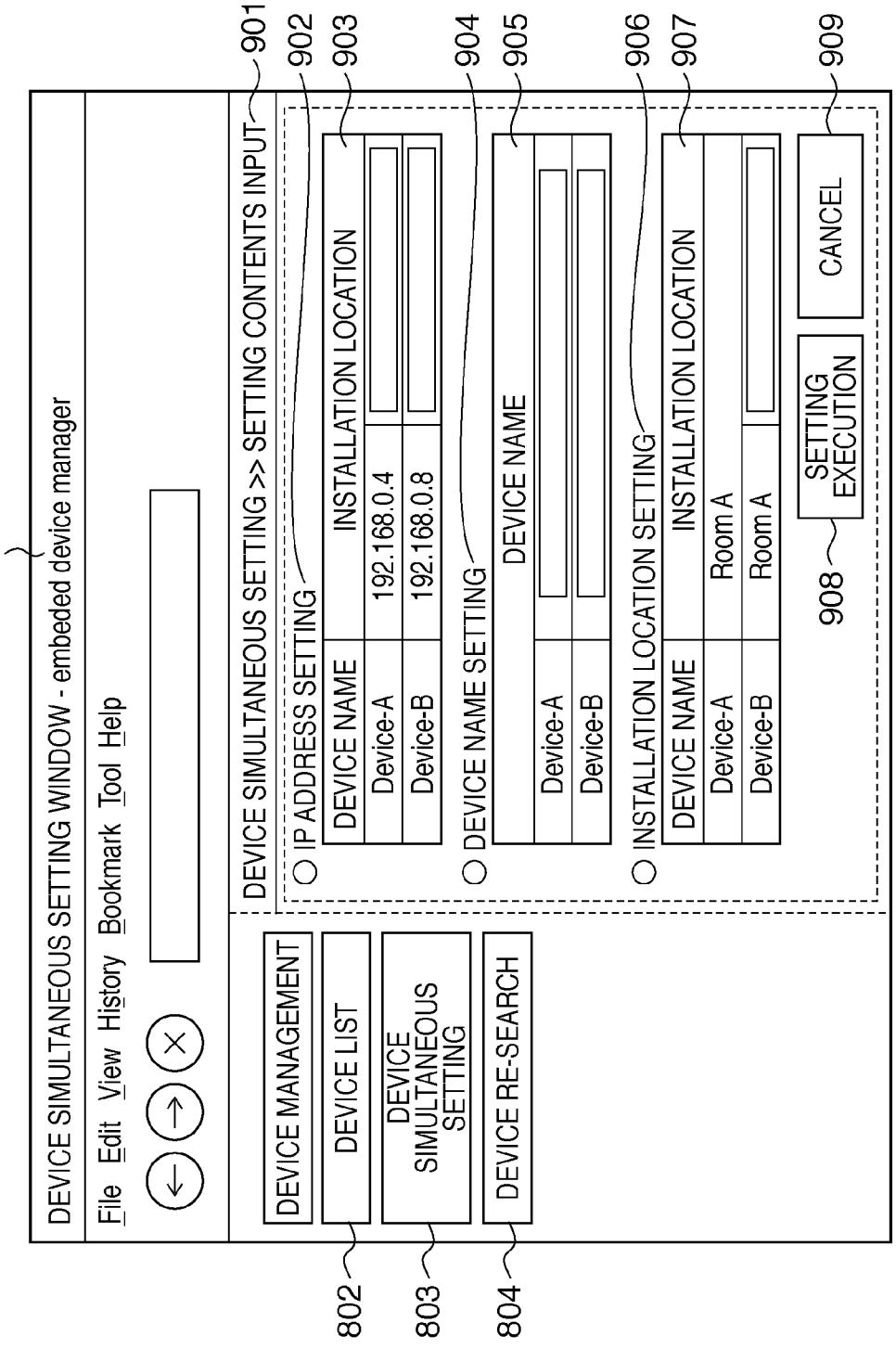
FIG. 9 is a view showing an example of a setting contents input window of the device simultaneous settings of the management apparatus according to the first, second, and third embodiments of the present invention.

FIG. 9 shows an example of the setting contents input window. Reference numeral 801 denotes a window of the browser. Reference numeral 802 denotes a device list menu. Reference numeral 803 denotes a device simultaneous setting menu. The user can select "device simultaneous setting" by clicking this device simultaneous setting menu 803 in step S703. Reference numeral 804 denotes a device re-search menu.

Reference numeral 901 denotes a window type indication indicating what kind of window the currently displayed window is. Reference numeral 902 denotes an IP address setting option. Reference numeral 903 denotes new IP address input fields used to set IP addresses. Reference numeral 904 denotes a device name setting option. Reference numeral 905 denotes new device name input fields used to set device names. Reference numeral 906 denotes an installation location setting option. Reference numeral 907 denotes new installation location input fields used to set installation locations. The operator selects a radio button of a desired option, and inputs required data.

Reference numeral 908 denotes a setting execution button used to execute the setting. Reference numeral 909 denotes a cancel button used to cancel the setting. The options 902, 904, and 906 can be selected by corresponding radio buttons, and one of these options can be executed. However, such implementation is not always required. It is a common practice to receive entries in the input fields 903, 905, and 907 only when the corresponding option 902, 904, or 906 is selected. However, such implementation is not always required.

If the user clicks the "next" button 814 in step S707, the management apparatus of this embodiment changes the window to that shown in FIG. 9. In step S708, the user inputs the setting contents using that window. For example, the user makes an operation to select the device name setting option 904, and to input data in the input fields 905. The user determines in step S709 if he or she wants to actually execute the setting with the current contents. If the user wants to cancel the setting, the process advances to step S710, and he or she clicks the cancel button 909. In this case, the process advances to step S718.

If the user wants to execute the setting, the process advances to step S711, and he or she clicks the setting execution button 908. Then, the management apparatus of this embodiment changes the window and displays a setting contents preview window.

Figure 10:
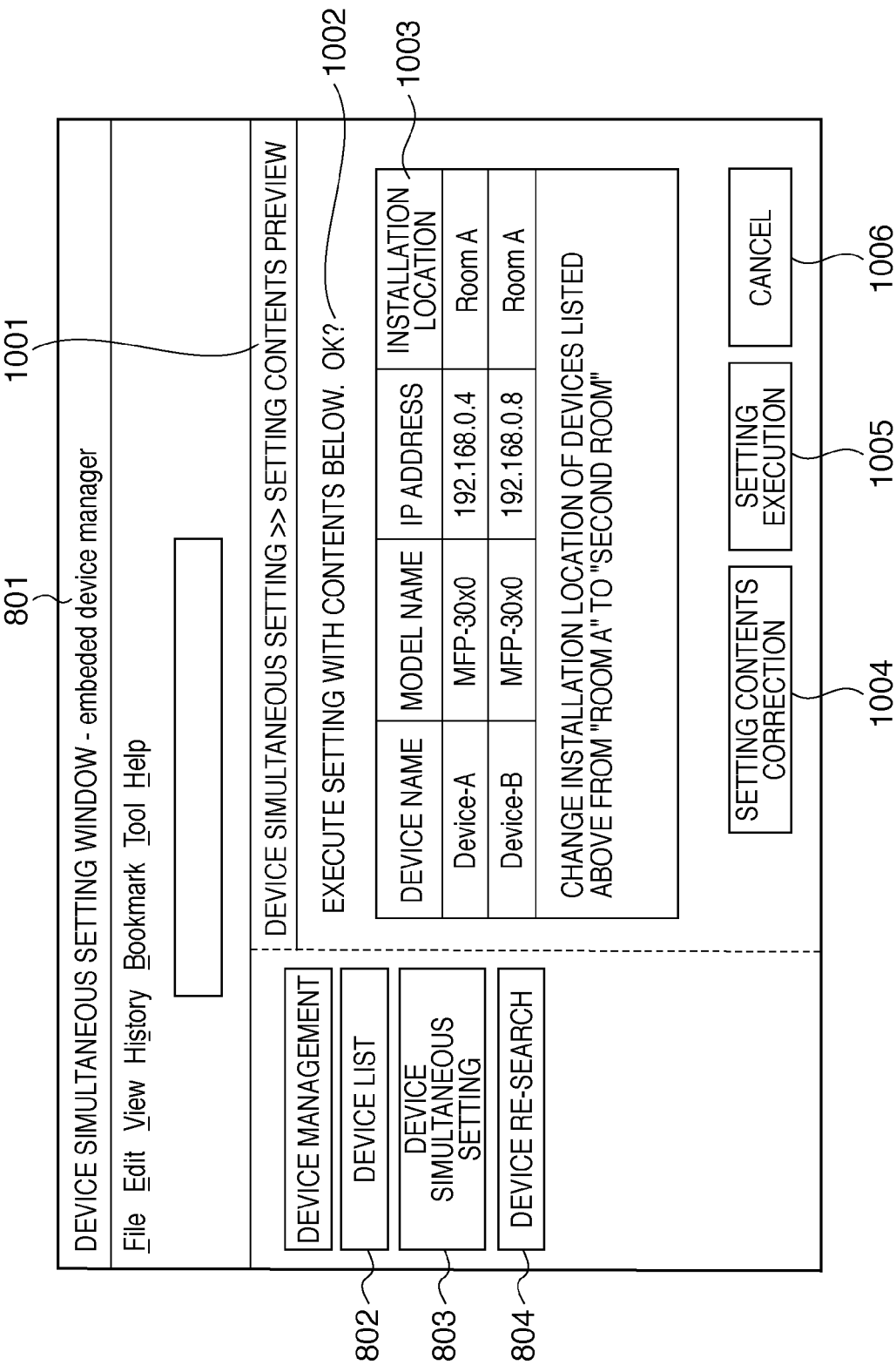
FIG. 10 is a view showing an example of a setting contents preview window of the device simultaneous settings of the management apparatus according to the first, second, and third embodiments of the present invention.

FIG. 10 shows an example of the setting contents preview window. Reference numeral 801 denotes a window of the browser. Reference numeral 802 denotes a device list menu. Reference numeral 803 denotes a device simultaneous setting menu. Reference numeral 804 denotes a device re-search menu.

Reference numeral 1001 denotes a window type indication indicating what kind of window the currently displayed window is. Reference numeral 1002 denotes a message indicating that the preview of the setting change contents is displayed. Reference numeral 1003 denotes a preview area which displays the preview of the setting change contents. FIG. 10 shows an example in which the setting to change the installation location "Room A" before the setting to "second room" is to be executed in association with "Device-A" and "Device-B". Reference numeral 1004 denotes a setting contents correction button used to correct the setting contents. Reference numeral 1005 denotes a setting execution button used to confirm the setting contents and to execute the setting. Reference numeral 1006 denotes a cancel button used to cancel execution of the setting.

If the user clicks the setting execution button 908 in step S711, the management apparatus of this embodiment changes the window to that shown in FIG. 10. In step S712, the user refers to the preview contents displayed on the window shown in FIG. 10 and determines if the setting contents are those he or she intended. If the setting contents are incorrect, the process advances to step S714. In step S714, the user presses the setting contents correction button 1004. Then, the management apparatus of this embodiment changes the window to return to the device selection window shown in FIG. 8. The process returns to step S704, and the user redoes the operation from that window.

If the user determines in step S712 that the preview contents are correct, the process advances to step S713, and the user determines if the setting is executed to have the current contents. If the user selects to execute the setting, the process advances to step S715, and he or she clicks the setting execution button 1005. Then, the setting is executed. After execution of the setting, the management apparatus of this embodiment changes the window and displays a window indicating that execution of the setting is complete.

Figure 11:
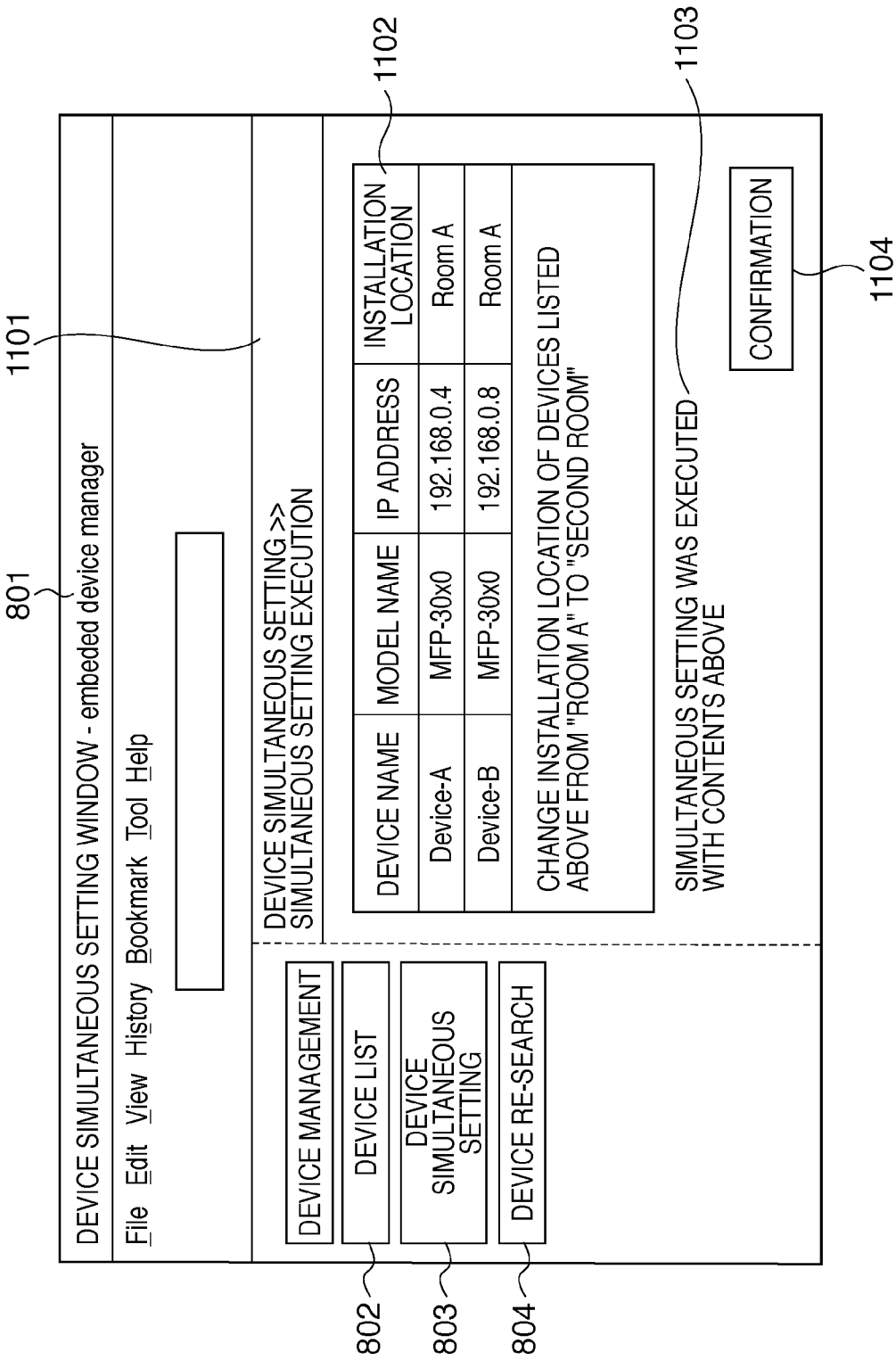
FIG. 11 is a view showing an example of a window which reports the execution result of the device simultaneous settings of the management apparatus according to the first, second, and third embodiments of the present invention.

FIG. 11 shows an example of a window used when the management apparatus of this embodiment reports execution of the setting. Reference numeral 801 denotes a window of the browser. Reference numeral 802 denotes a device list menu. Reference numeral 803 denotes a device simultaneous setting menu. Reference numeral 804 denotes a device re-search menu.

Reference numeral 1101 denotes a window type indication indicating what kind of window the currently displayed window is. Reference numeral 1102 denotes an area for displaying the setting change contents. Reference numeral 1103 denotes a message indicating that the simultaneous setting has been executed with the contents displayed on the area 1102. Reference numeral 1104 denotes a confirmation button used to make the user confirm the contents of this message.

If the user clicks the setting execution button 1005 in step S715, the management apparatus of this embodiment executes the setting, and changes the window to that which reports the setting contents, as shown in FIG. 11. In step S716, the user confirms the contents on the window shown in FIG. 11, and clicks the confirmation button 1104. After the user clicks the button, the process directly advances to step S718.

At this time, the selected management target devices and the type of designated management operation are stored in a memory or the like.

If the user selects to cancel the setting in step S713, the process advances to step S717, and he or she clicks the cancel button 1006. Then, the setting operation is canceled. After the user clicks the button, the process advances to step S718. In step S718, the user completes the simultaneous setting operation.

Figure 12:
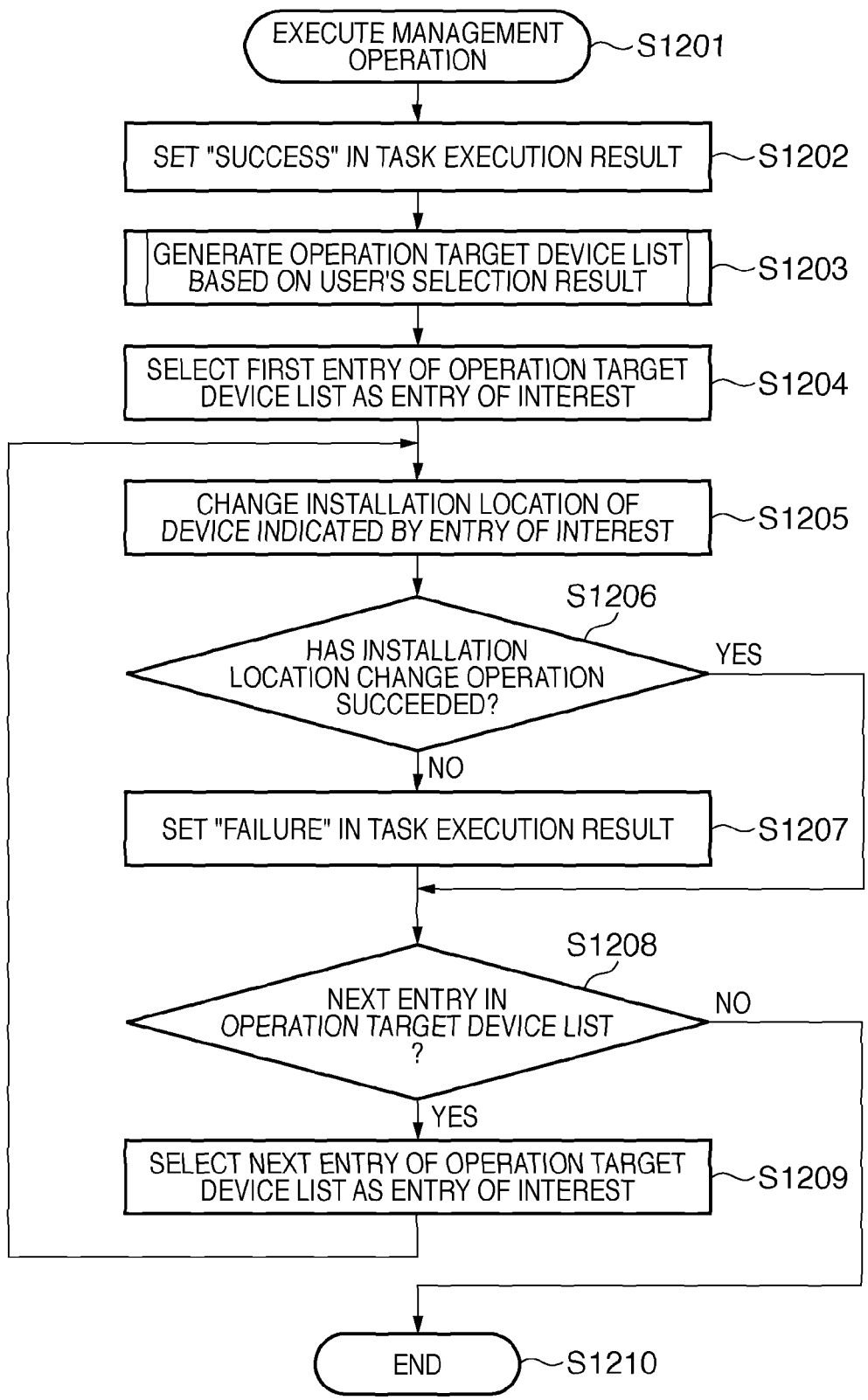
FIG. 12 is a flowchart for explaining an example of the sequence executed when the management apparatus according to the first and second embodiments of the present invention changes the installation locations of devices selected by the user.

Processing executed when the management apparatus of this embodiment is operated by the user in the aforementioned sequence to simultaneously make settings for a plurality of devices will be described below. The execution order depends on the types of management operations. That is, the network device management apparatus checks the type of the designated management operation. For example, when the management operation is an installation location change instruction according to the checking result, FIG. 12 is executed. FIG. 12 is executed not only for the installation location change operation, but also for a management operation when the device itself as the network device management apparatus (i.e., the self apparatus) is selected as a management target, and the order of processing with respect to the self apparatus does not influence the processing for other devices.

Figure 15:
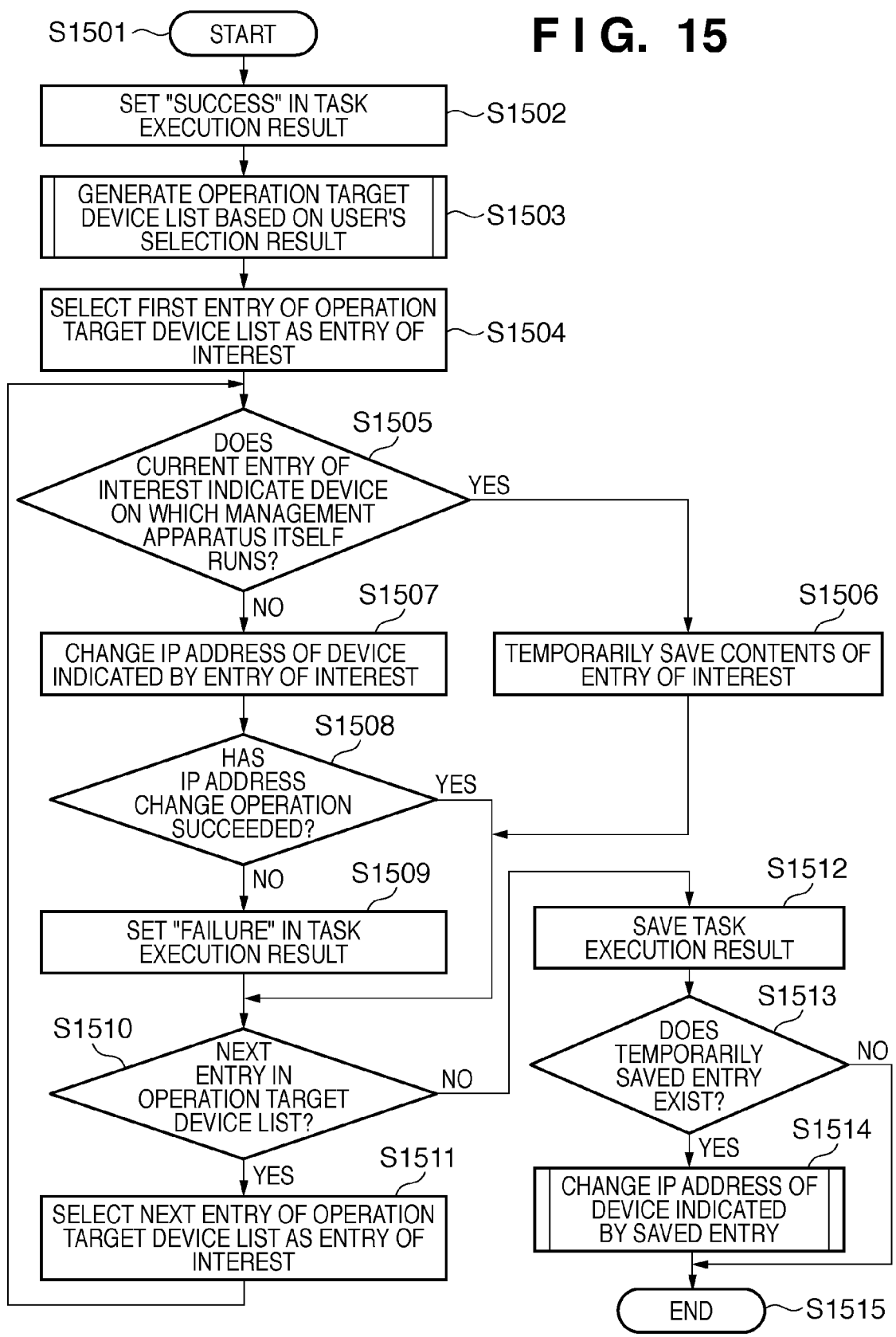
FIG. 15 is a flowchart for explaining an example of the sequence executed when the management apparatus according to the first embodiment of the present invention changes the IP addresses of devices selected by the user.

For example, when the management operation is an IP address change instruction according to the checking result, FIG. 15 is executed. FIG. 15 is executed not only for the IP address change instruction, but also for a management operation when the device itself as the network device management apparatus (i.e., the self apparatus) is selected as a management target, and a device is reset by the management operation. Also, this processing is executed for a management operation that instructs a network device as a management target to set a protocol stack to be ON or OFF.

Figure 24:
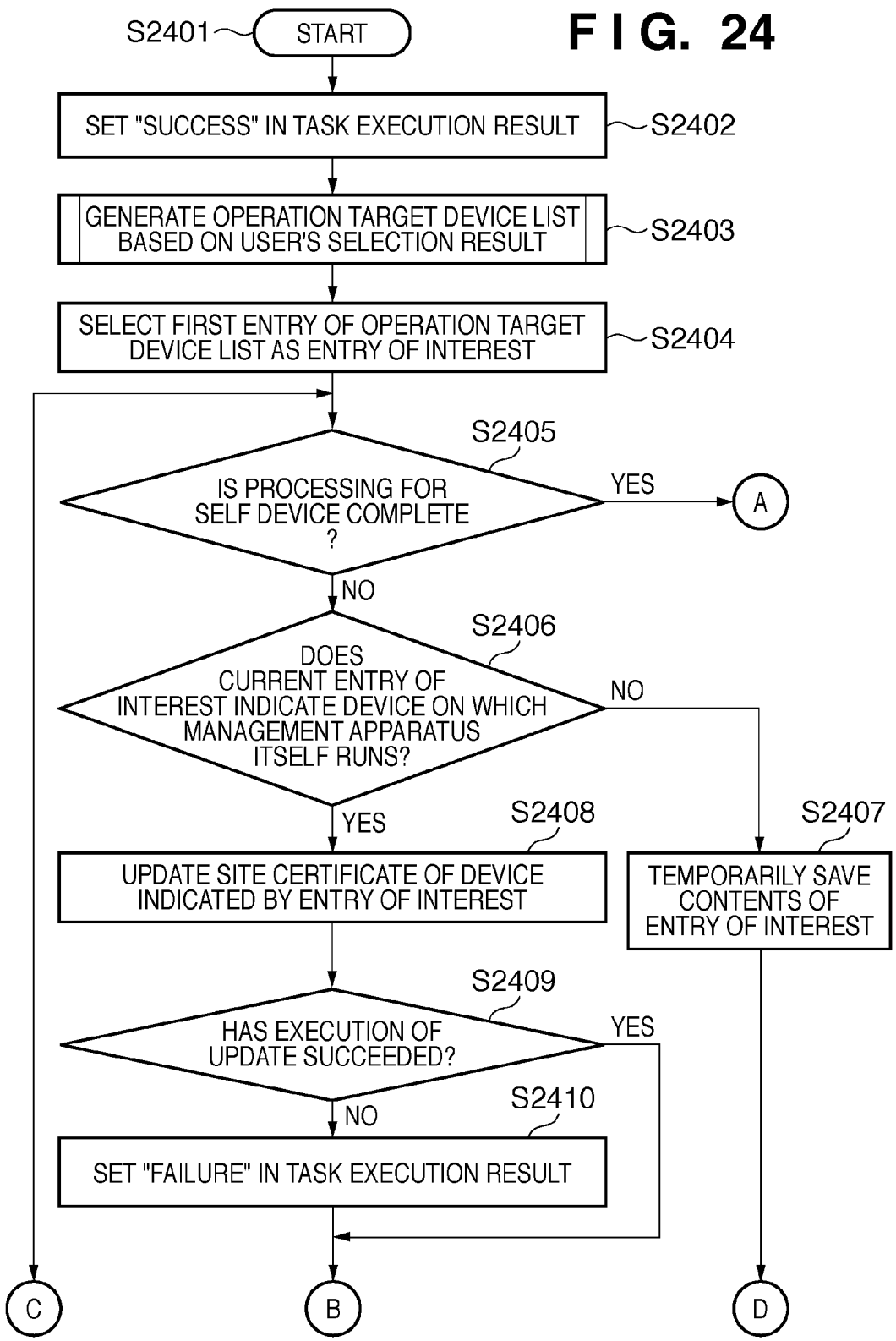
FIG. 24 is a part of a flowchart for explaining an example of the sequence executed when the management apparatus according to the first embodiment of the present invention updates the site certificates of devices selected by the user.
Figure 25:
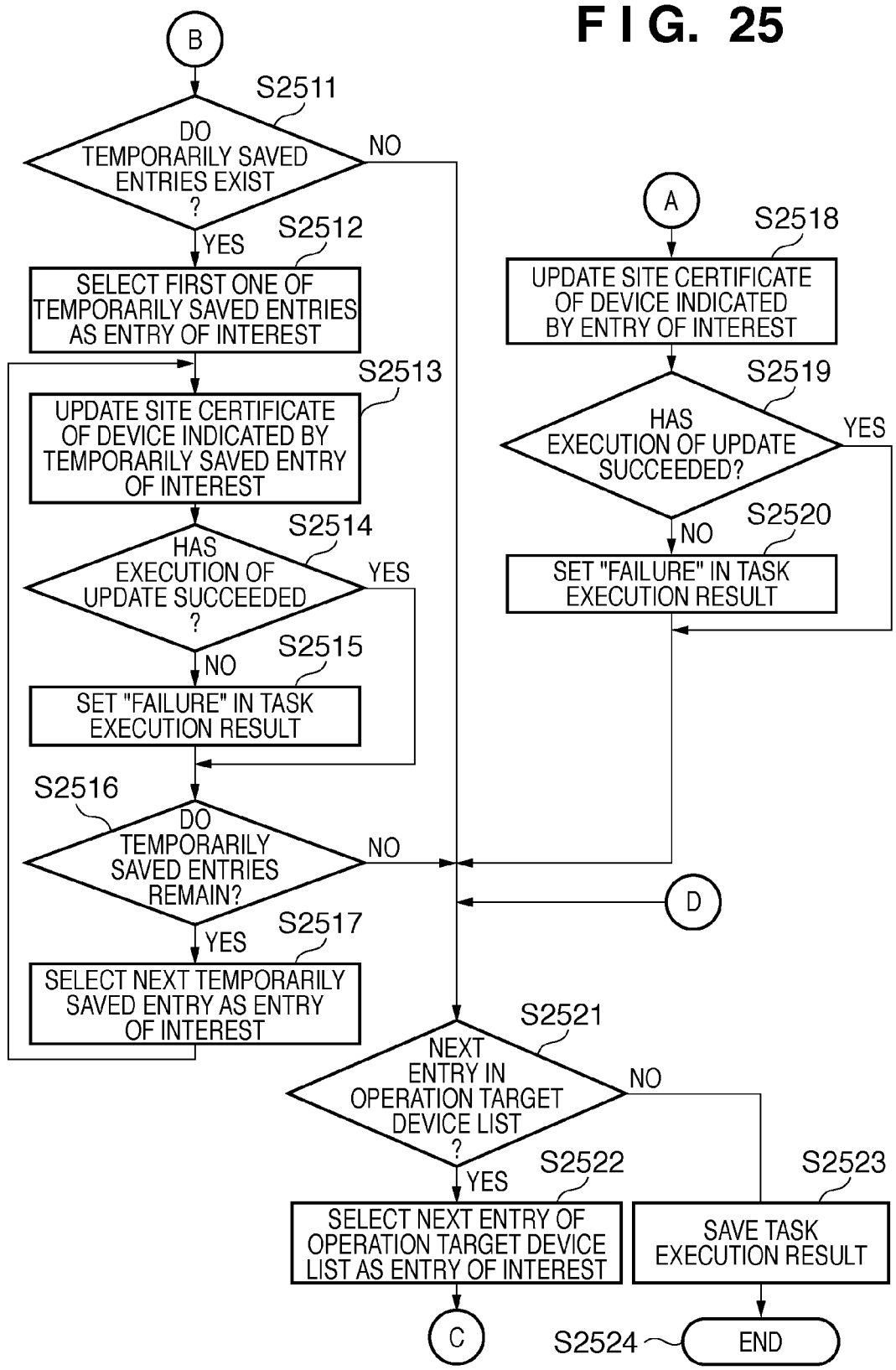
FIG. 25 is another part of a flowchart for explaining an example of the sequence executed when the management apparatus according to the first embodiment of the present invention updates the site certificates of devices selected by the user.

For example, when the management operation is a site certificate update instruction according to the checking result, FIGS. 24 and 25 are executed. FIGS. 24 and 25 are executed not only for the site certificate update instruction, but also for a management operation when the device itself as the network device management apparatus is selected as a management target, and the management operation for other devices is executed with reference to the result of the management operation for the self apparatus. This processing is also executed for a management operation that instructs to re-set a DNS server.

Figure 28:
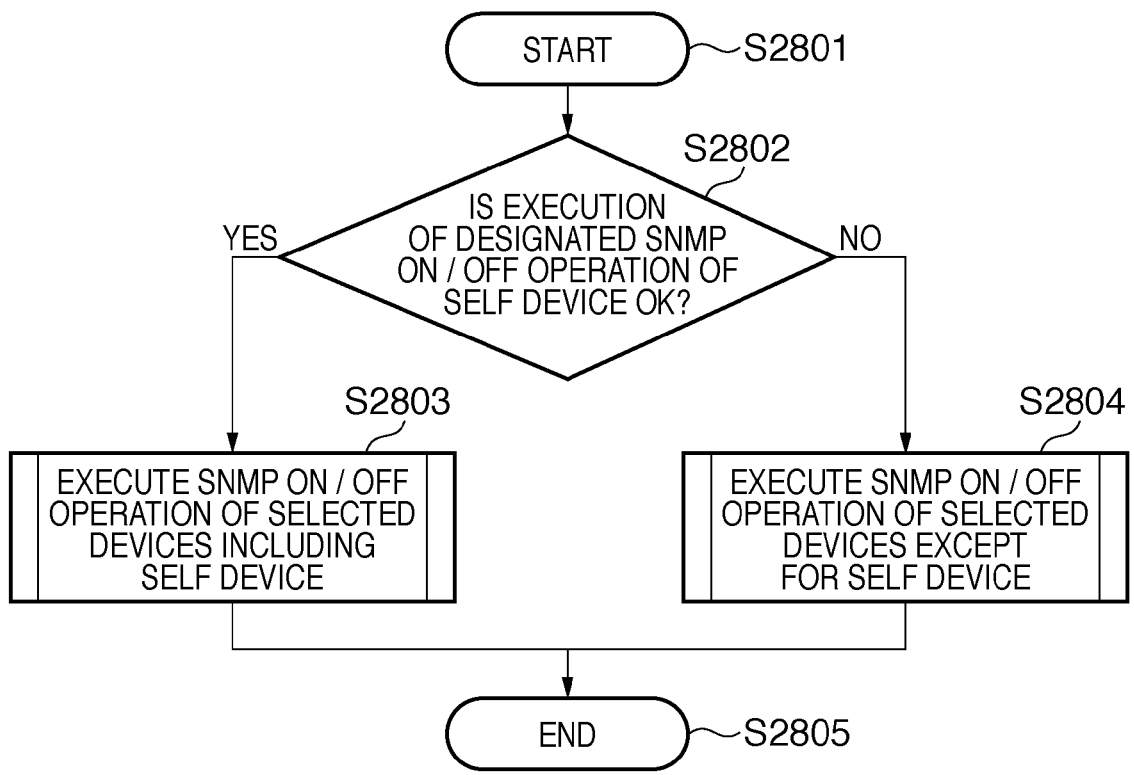
FIG. 28 is a part of a flowchart for explaining an example of the sequence executed when the management apparatus according to the first and second embodiments of the present invention executes an SNMP ON/OFF operation of devices selected by the user.
Figure 29:
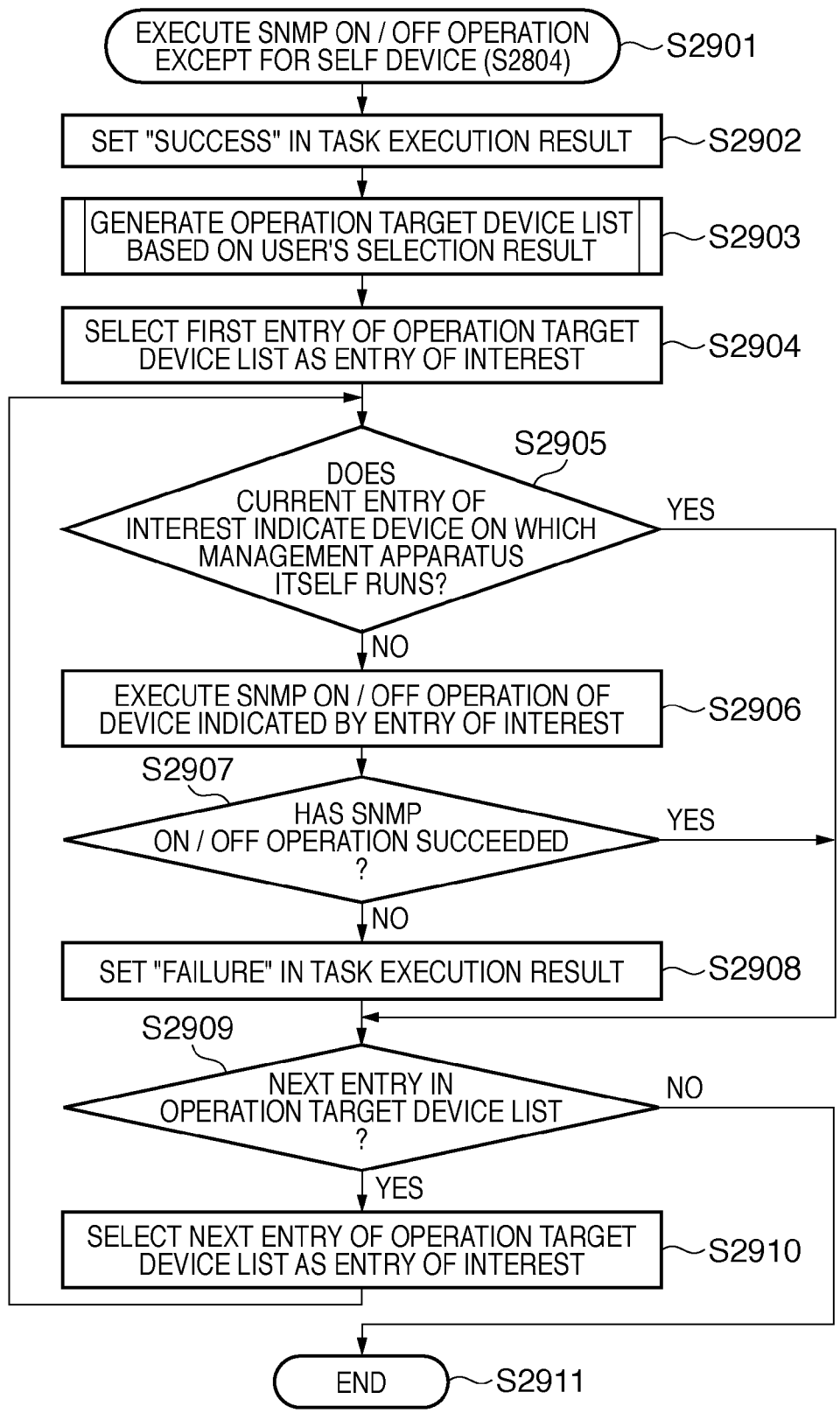
FIG. 29 is another part of a flowchart for explaining an example of the sequence executed when the management apparatus according to the first and second embodiments of the present invention executes an SNMP ON/OFF operation of devices selected by the user.
Figure 30:
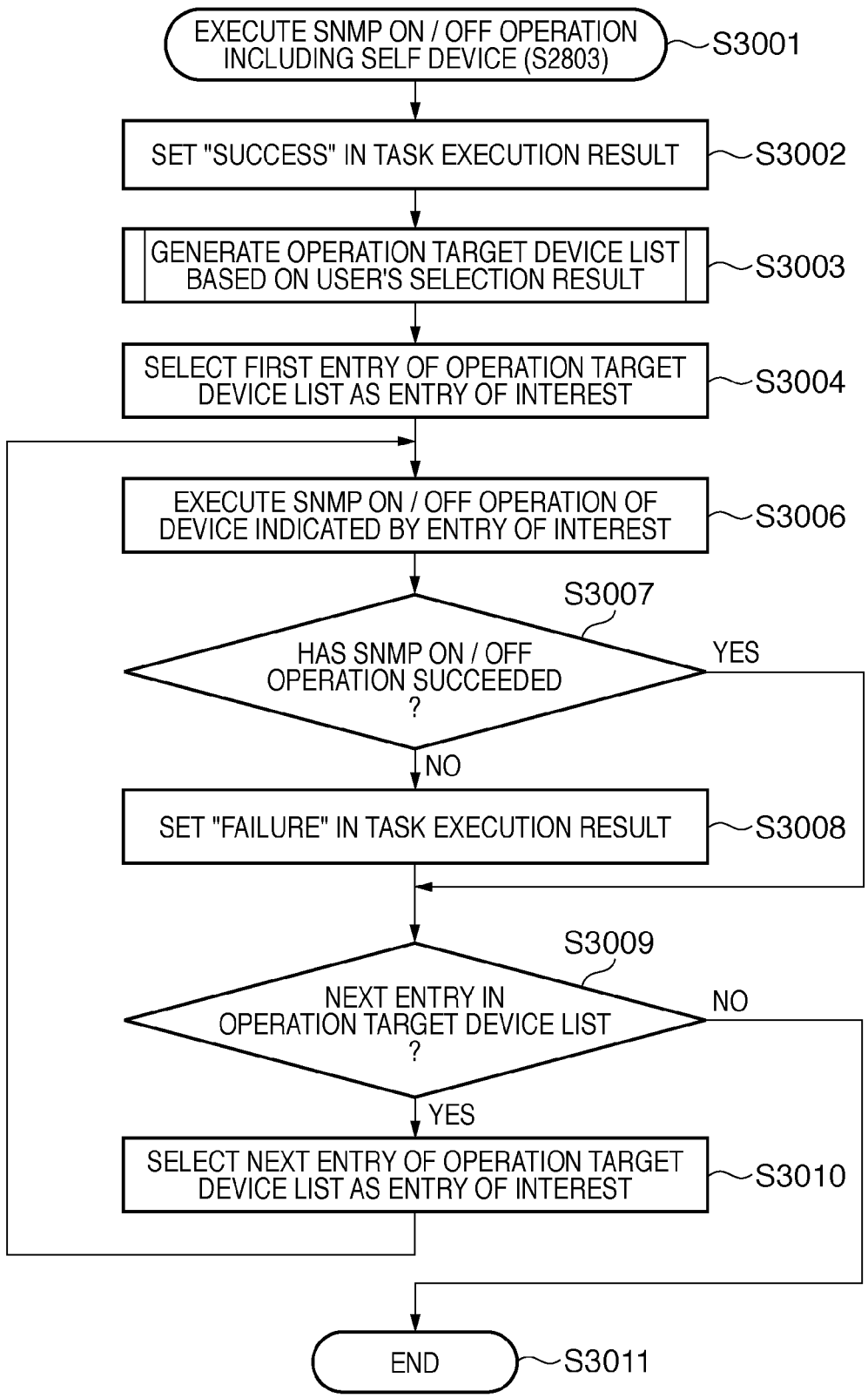
FIG. 30 is still another part of a flowchart for explaining an example of the sequence executed when the management apparatus according to the first and second embodiments of the present invention executes an SNMP ON/OFF operation of devices selected by the user.

For example, when the management operation is executed via SNMP and is an SNMP ON/OFF instruction according to the checking result, FIGS. 28, 29, and 30 are executed. These figures are executed not only for the SNMP ON/OFF instruction, but also for a management operation when the device itself as the network device management apparatus (i.e., the self apparatus) is selected as a management target, and the operation is not normally completed in that case. For example, FIGS. 28, 29, and 30 are executed not only for the SNMP but also for ON/OFF operations of other protocols which are used in the management operation. Also, this processing is executed for management operations including a file download instruction from the network management apparatus via HTTPS that requires providing a site certificate, and delivery of device setting information.

<Installation Location Change Operation>

FIG. 12 is a flowchart that describes processing executed when the management apparatus of this embodiment simultaneously changes "installation locations" of devices. The management apparatus of this embodiment executes this processing when the user clicks the setting execution button 1005 in step S716 in the flowchart of FIG. 7.

The operator selects target devices of a management operation, designates the type of management operation, and gives the instruction for execution of the designated management operation in the aforementioned sequence. The network device management apparatus displays the user interfaces according to the sequence shown in FIG. 7, and applies the management operation of the designated type to management target devices selected according to the operations on the user interfaces.

This management apparatus starts processing from step S1201. In step S1202, the management apparatus sets "success" in the execution result of a task in advance. The task is an entity of the management operation, and the designated management operation is implemented by executing the corresponding task. In step S1203, the management apparatus generates an operation target device list based on the user's device selection result. Note that the user's device selection result indicates the selection result of devices which are selected on the device selection window in FIG. 8 in step S704 in the flowchart of FIG. 7, and which result is finally settled in step S715.

Figure 13:
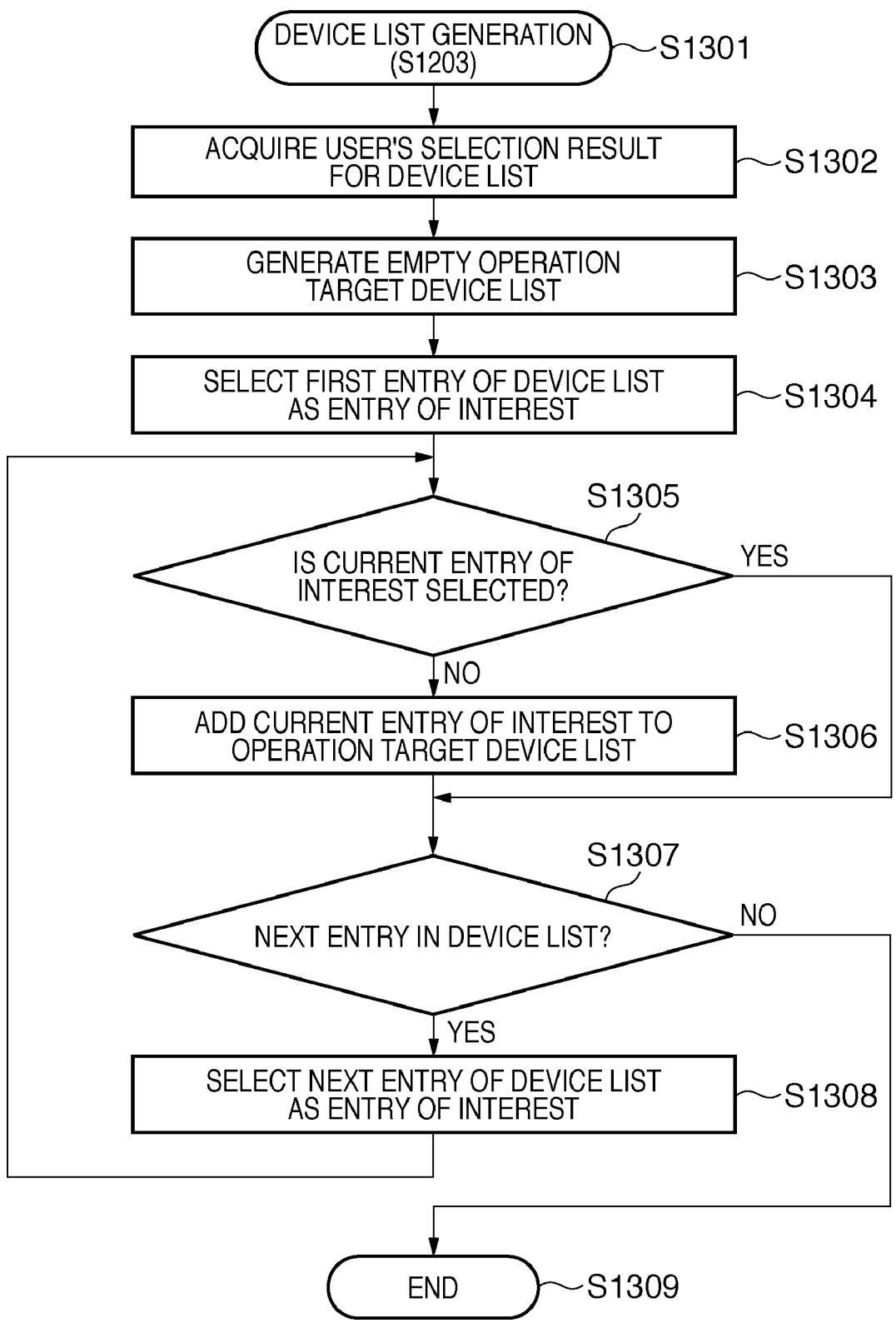
FIG. 13 is a flowchart for explaining an example of the sequence executed when the management apparatus according to the first and second embodiments of the present invention generates an operation target device list from devices selected by the user.

FIG. 13 is a flowchart that describes processing executed when this management apparatus generates an operation target device list based on such selection result and information of the original device list. This processing is an example of that in step S1203.

The management apparatus starts processing from step S1301. In step S1302, the management apparatus acquires information of devices selected by the user as operation targets in the sequence of FIG. 7 in addition to that of the device list (created in the sequence of FIG. 5). In step S1303, the management apparatus generates an empty operation target device list. The process advances to step S1304 to select the first entry in the device list as an entry of interest. The management apparatus checks in step S1305 if the current entry of interest is selected. If the entry of interest is selected, the process advances to step S1306 to add the current entry of interest to the operation target device list. The process then advances to step S1307. If it is determined in step S1305 that the current entry of interest is not selected, the process jumps to step S1307.

The management apparatus checks in step S1307 if the device list includes the next entry. If YES in step S1307, the process advances to step S1308, and the management apparatus selects the next entry in the device list as an entry of interest. If NO in step S1307, the process jumps to step S1309, thus ending the processing.

In step S1204, the management apparatus selects the first entry of the generated operation target device list as an entry of interest. In step S1205, the management apparatus changes the installation location of a device indicated by the entry of interest.

Figure 14:
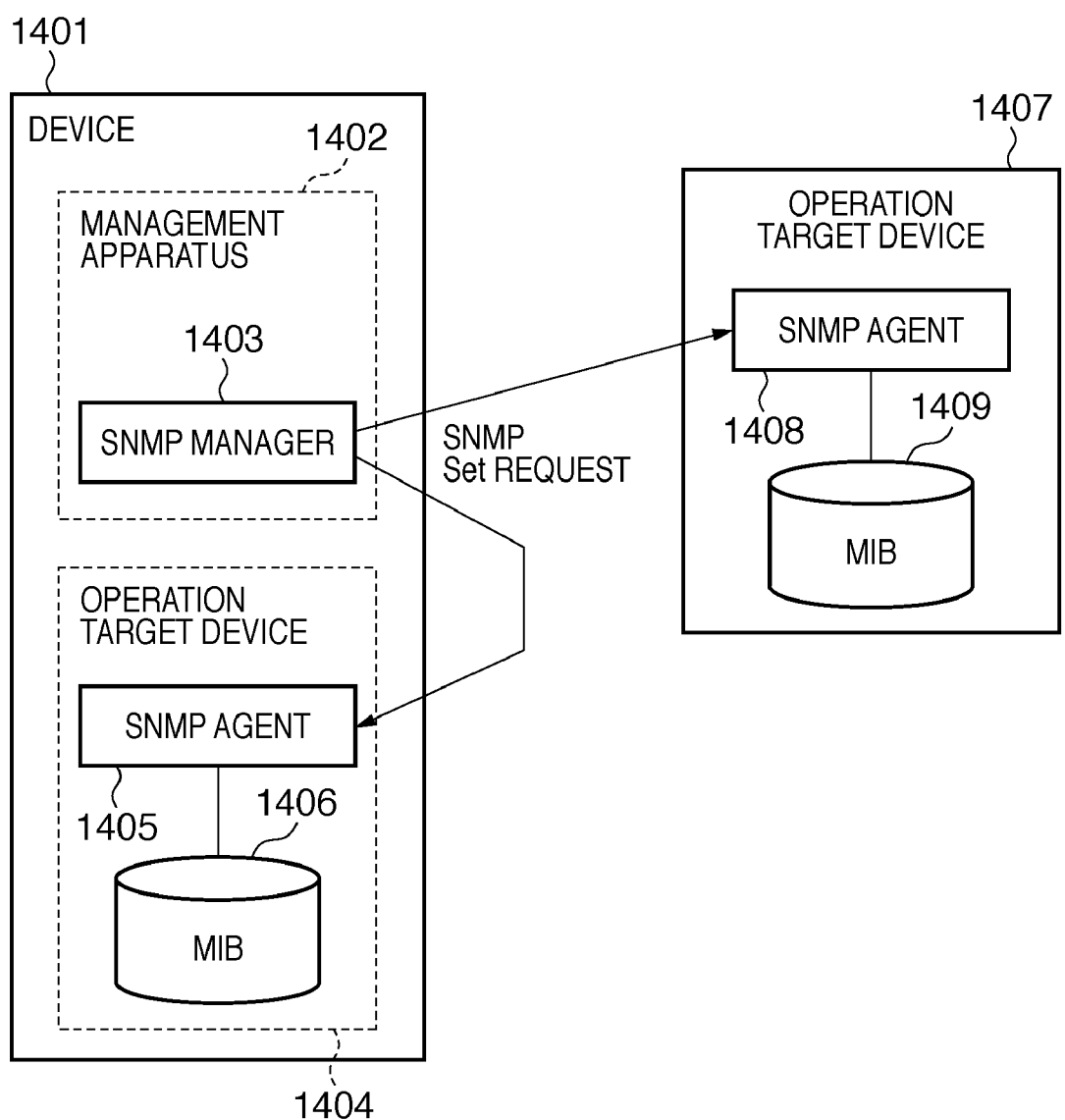
FIG. 14 is a block diagram showing an example of the relationship of respective modules when the management apparatus according to the first, second, and third embodiments of the present invention changes the installation location of an operation target device.

FIG. 14 is a view showing the mutual relationship of relating modules upon changing the device installation location. A device 1401 is that on which the management apparatus of this embodiment runs. A network device management apparatus 1402 is the management apparatus of this embodiment. Reference numeral 1403 denotes a module which is incorporated in the management apparatus of this embodiment and implements an SNMP manager function. Reference numeral 1404 denotes a module of a device as an operation target, which is incorporated in this device 1401. Reference numeral 1405 denotes a module which implements an SNMP agent function; and 1406, a management (device) information base (to be abbreviated as MIB hereinafter) connected to that SNMP agent. Reference numeral 1407 denotes a device different from the device 1401. The devices 1401 and 1407 are connected via the network 101. In particular, the device 1407 serves as an operation target of the management apparatus of this embodiment. Reference numeral 1408 denotes an SNMP agent module incorporated in the device 1407; and 1409, an MIB connected to that SNMP agent.

The installation location is changed in the following sequence. That is, the network device management apparatus 1402 transmits an SNMP Set request to the operation target device 1404 or 1407 via the SNMP manager function 1403. Then, upon reception of the request, the SNMP agent 1405 or 1408 updates data in the MIB 1406 or 1409 that stores the installation location.

The process advances to step S1206, and this management apparatus checks if the installation location data change operation has succeeded. If the operation has succeeded, the process jumps to step S1208. If the operation has failed, the process advances to step S1207, and the management apparatus sets "failure" in the task execution result. After that, the process advances to step S1208.

The management apparatus checks in step S1208 if the operation target device list includes the next entry. If YES in step S1208, the process advances to step S1209; otherwise, the process jumps to step S1210.

In step S1209, the management apparatus selects the next entry in the operation target device list as an entry of interest. After that, the process continues from step S1205. In step S1210, the management apparatus ends the processing.

The "installation location data change operation" used as an example will be described in more detail below. The device 1401 on which the management apparatus 1402 itself runs can be selected as the operation target device 1404. That is, it is possible that the user selects, in the operation in FIG. 7, the device 1401 on which the network device management apparatus runs as an operation target, and applies the "installation location data change operation" to that device. In such case, the SNMP agent 1405 of the operation target device 1404 rewrites the installation location data in the MIB 1406. However, as far as this operation is concerned, even when that data is rewritten, an operation that influences the operation of the management apparatus 1402 via the device 1401 itself is never done. Therefore, the rewrite timing of the installation location data of the operation target device 1404 by the management apparatus 1402 need not be considered. For this reason, in step S1205, whether the management target device of interest is the device 1401 on which the management apparatus itself runs or another device 1407 is not particularly considered.

<IP Address Change Operation>

Processing for changing an IP address of a device will be described as another operation example.

In the IP address change processing as well, the relationship between the management apparatus and operation target device is the same as that presented in FIG. 14. The management apparatus 1402 executes an operation for the self device 1401 and that for another device 1407 by communications between the SNMP manager 1403 and the SNMP agents 1405 and 1408 via the SNMP protocol.

It should be noted that the device is to be rebooted upon changing its IP address. That is, the SNMP agents 1405 and 1408 rewrite IP address data on the MIBs 1406 and 1409, but the rewritten IP addresses are not reflected to actual operations in this state. Hence, each SNMP agent reboots the device so as to immediately reflect a change in IP address in practice.

Figure 16:
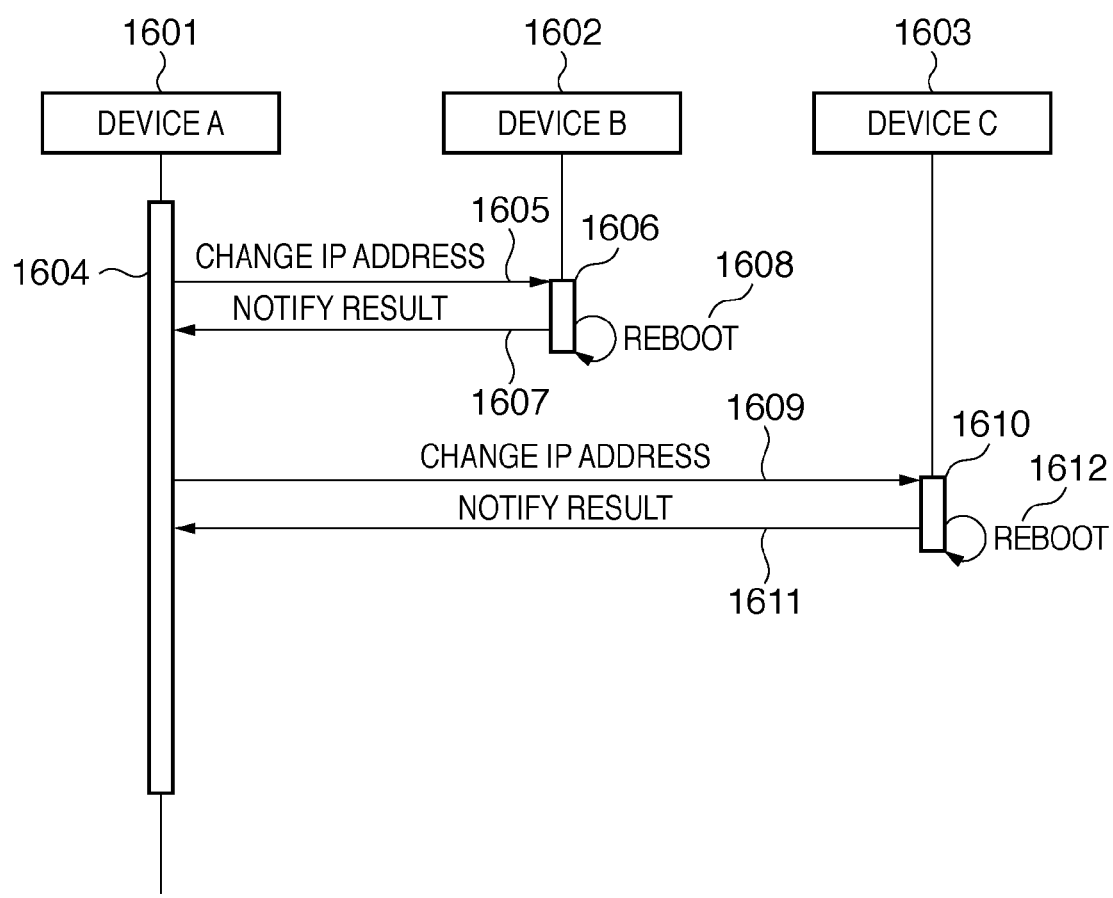
FIG. 16 is a sequence chart when the management apparatus according to the first embodiment of the present invention changes the IP addresses of a plurality of devices which do not include the self device.

A further description will be given using FIG. 16. A device A 1601 is a device which corresponds to the device 1401, and on which the management apparatus of this embodiment runs. A device B 1602 and device C 1603 are those which correspond to the device 1407 and serve as other operation targets. An operation for changing the IP addresses of the device B 1602 and device C 1603 will be examined. Reference numeral 1604 denotes a task which executes the IP address change operation in this order. The device A executes an IP address change operation for the device B 1602 (1605). Then, upon reception of an SNMP Set request (1606), the SNMP agent of the device B executes the IP address change operation for the MIB. The device B notifies the device A of the result (1607).

As a result of this operation, when the IP address on the MIB of the device B 1602 has been changed, rebooting is required to reflect the change in IP address of the device B to an actual operation. For this reason, the SNMP agent of the device B 1602 executes rebooting (1608).

The device A, which received the notification of the result from the device B 1602 (1607), executes an IP address change operation for the device C 1603 (1609). In response to this operation, the device C 1603 changes the IP address on the MIB (1610). The device C then notifies the device A of the result (1611). As in the device B 1602, rebooting is executed to reflect the change in the IP address to an actual operation (1612).

Figure 17:
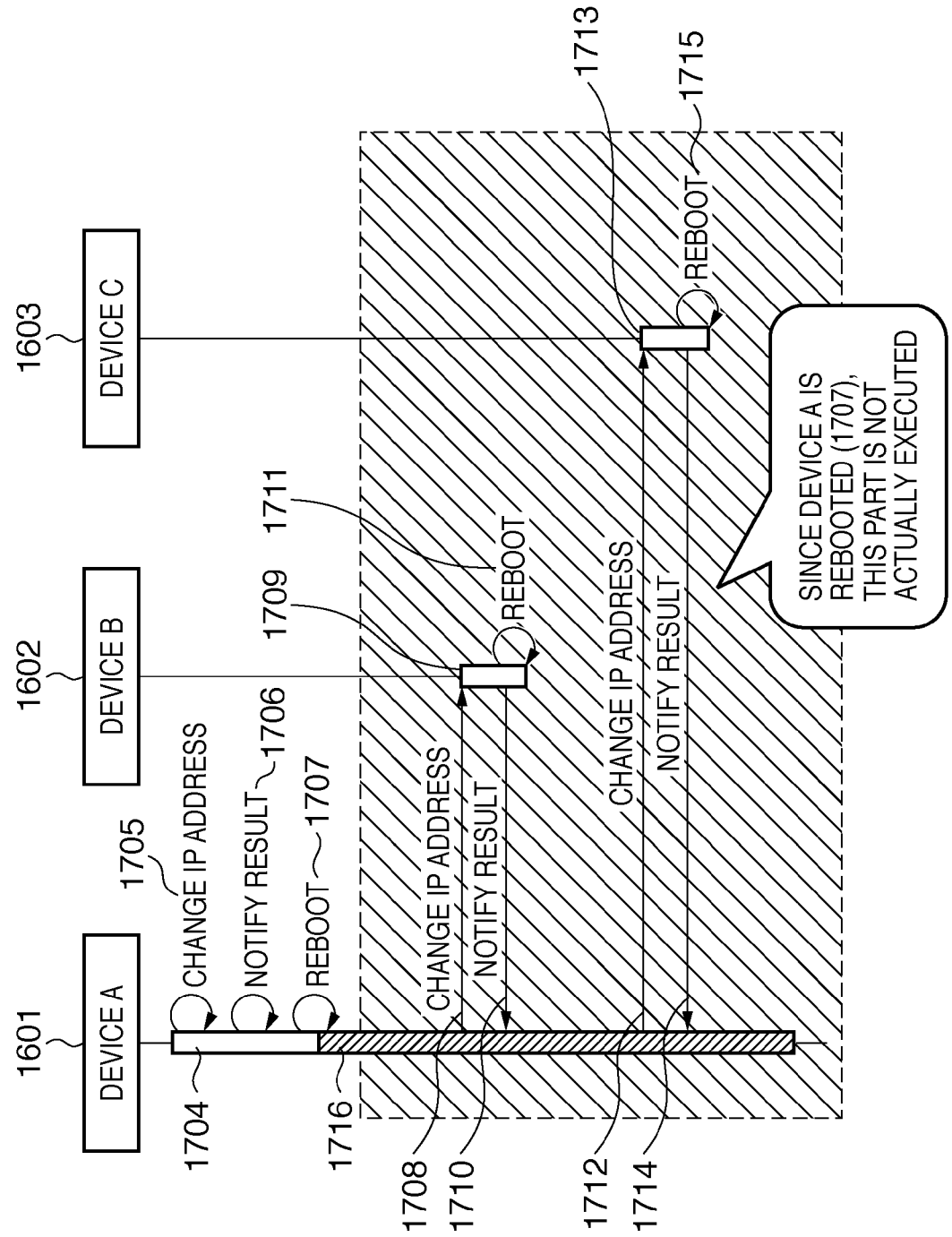
FIG. 17 is a sequence chart for explaining a problem posed in a case in which the processing order is not considered when a conventional management apparatus changes the IP addresses of a plurality of devices including the self device.

FIG. 17 shows a state in which the device A1601 similarly executes the IP address change operation for the devices A 1601, B 1602, and C 1603 in this order without taking any measure. Reference numeral 1704 denotes an IP address change task. The device A 1601 executes the IP address change operation for the device A (1705). The device A 1601 notifies itself of the result (1706), and finally executes rebooting (1707).

In this case, IP address change operations 1708 and 1712 should have been originally executed for the devices B 1602 and C 1603 in the operation 1708 and subsequent operations. However, since the device A 1601 is rebooted at the timing 1707, the task 1704 is interrupted, and the remaining processes are not executed. A hatched part in FIG. 17 indicates processes which should have been executed originally but are left unexecuted. The conventional network device management apparatus executes such processes. However, as can be seen from the above description, when a management apparatus itself runs on a device like in this embodiment, an original object cannot be achieved.

Hence, the management apparatus of this embodiment is configured to apply a sequence different from that shown in FIG. 13 to the IP address change operation, in order to avoid such situation.

FIG. 15 is a flowchart showing an example of processing executed when this management apparatus simultaneously applies processing for changing the IP address of a device to a plurality of devices. The management apparatus starts processing from step S1501. The management apparatus sets "success" in the execution result of a task in step S1502. The management apparatus generates an operation target device list based on the user's selection result in step S1503. These processes are the same as those shown in FIGS. 12 and 13.

In step S1504, the management apparatus selects the first entry of the operation target device list as an entry of interest. The management apparatus checks in step S1505 if the current entry of interest indicates the device 1401 on which the management apparatus 1402 itself runs or another device 1407. If the current entry of interest is the device 1401, the process advances to step S1506; otherwise, the process advances to step S1507.

In step S1506, the management apparatus temporarily saves the contents of the entry of interest. The management apparatus then continues processes from step S1510.

In step S1507, the management apparatus changes the IP address of a device indicated by the entry of interest. The management apparatus checks in step S1508 if the IP address change operation has succeeded. If the operation has succeeded, the process jumps to step S1510. If the operation has failed, the process advances to step S1509, and the management apparatus sets "failure" in the task execution result. After that, the process advances to step S1510.

The management apparatus checks in step S1510 if the operation target device list includes the next entry. If YES in step S1510, the process advances to step S1511; otherwise, the process advances to step S1512.

In step S1511, the management apparatus selects the next entry of the operation target device list as an entry of interest. The process then returns to step S1505 to continue the processes.

In step S1512, the management apparatus saves the task execution result. The process advances to step S1513, and the management apparatus checks if the entry temporarily saved in step S1506 exists. If YES in step S1513, the process advances to step S1514 to change the IP address of a device indicated by the saved entry. After that, the process advances to step S1515. If NO in step S1513, the process jumps to step S1515. In step S1515, the management apparatus ends the processing.

With this arrangement, when the management apparatus of this embodiment executes the operation for changing the IP addresses of the devices A, B, and C, an entry corresponding to the device A as the management apparatus is temporarily saved by necessity in step S1506. Then, the IP address change operation for the device A is lastly executed in step S1514. FIG. 18 illustrates this state.

In FIG. 18, the device A 1601 changes the IP addresses of the devices A 1601, B 1602, and C 1603. Since a task 1804 which actually changes the IP addresses executes processes according to the sequence shown in FIG. 15, this management apparatus temporarily saves the change operation of the device A 1601 in step S1506. Then, the management apparatus executes the IP address change operation for the device B 1602 (1808). The device B 1602 executes the IP address change operation for the MIB (1809). Then, the device B notifies the device A of the result (1810), and lastly executes rebooting (1811).

Upon reception of the result notification 1810, the device A 1601 executes the IP address change operation for the device C 1603 (1812). In response to this operation, the device C changes the IP address on the MIB (1813), and notifies the device A of the result (1814). After that, the device C reboots itself (1815).

Upon reception of the result notification (1814), the device A 1601 completes the processes of the operation target device list up to the last entry in step S1510, and advances to step S1511. The device A 1601 then executes the IP address change operation for itself saved in step S1506 (1816). The device A notifies itself of the result (1817), and reboots itself (1818). At this time, execution of the task 1804 is terminated by rebooting. However, since the change operations of the devices B 1602 and C 1603 are complete, the task is completed without any problem.

In this way, by adopting the processing shown in FIG. 15, the management operation for changing the IP addresses of devices, which cannot be completed intact, can be completed.

<Site Certificate Update Operation>

An operation for updating a site certificate of a device will be examined below as still another operation example. A device to be handled as the management apparatus or a management target in this embodiment includes a function serving as a Web service provider. This Web service provider is a function of calling a function as a Web service via an HTTP Over SSL (to be abbreviated as HTTPS hereinafter) protocol. Note that "HTTP" is an abbreviation for a HyperText Transfer Protocol. Also, "SSL" indicates a protocol called "Secure Socket Layer". Such device has an e-signed certificate called a site certificate upon making a communication via the HTTPS, and the security of the communication is assured by checking the contents described in this certificate.

FIG. 19 illustrates the description contents of such site certificate. An item 1901 describes an IP address of a site. An item 1902 describes a fully-qualified domain name (to be abbreviated as FQDN hereinafter) of the site. An item 1903 describes an owner name of the site. An item 1904 describes the name of a certificate authority which authenticated this site certificate. An item 1905 describes the start time of a valid period of this certificate. An item 1906 describes the end time of the valid period of this certificate. An item 1907 describes data of a public key appended to this certificate. Although other items are described, a description thereof will not be given.

Figure 20:
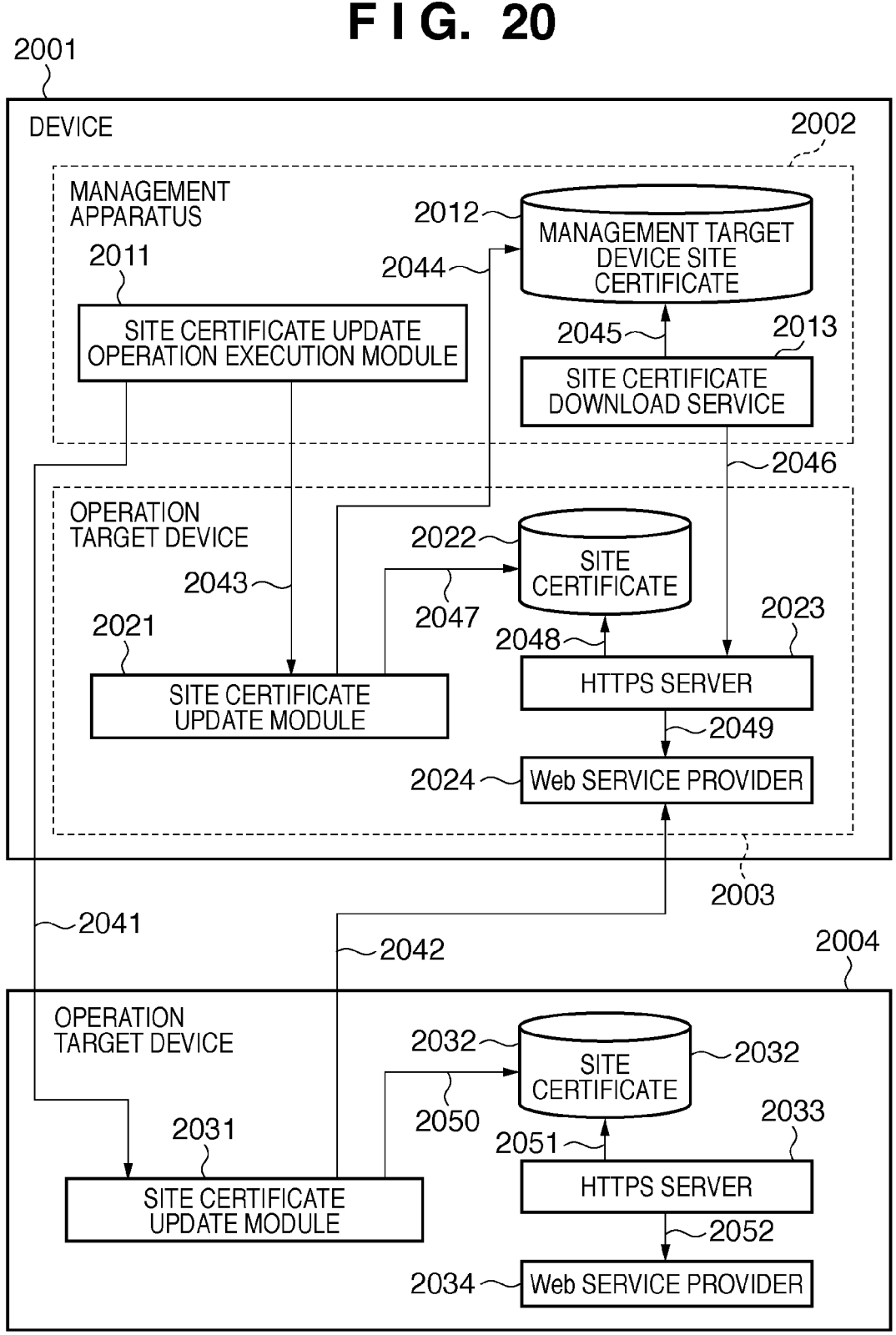
FIG. 20 is a block diagram showing an example of the relationship of respective modules when the management apparatus according to the first and second embodiments of the present invention updates the site certificate of an operation target device.

FIG. 20 is a view showing the mutual relationship of relating modules when the management apparatus of this embodiment executes processing for updating this site certificate. Reference numeral 2001 denotes a device on which the management apparatus of this embodiment runs. Reference numeral 2002 denotes a network device management apparatus part which runs on that device 2001. Reference numeral 2003 denotes an operation target device part serving as a management target of that device 2001. Reference numeral 2004 denotes another operation target device. Reference numeral 2011 denotes a site certificate update operation execution module of the management apparatus 2002. Reference numeral 2012 denotes an update site certificate which is stored to replace a site certificate of each management target device. Reference numeral 2013 denotes a site certificate download service for downloading that site certificate from an external device.

Reference numeral 2021 denotes a site certificate update module which actually executes a site certificate update operation of this device 2001. Reference numeral 2023 denotes an HTTPS server. Reference numeral 2022 denotes a site certificate which is actually used by the HTTPS server 2023 of this device. Reference numeral 2024 denotes a Web service provider module which provides a Web service using this HTTPS server 2023.

Reference numeral 2031 denotes a site certificate update module which executes a site certificate update operation of the device 2004 different from the management apparatus. Reference numeral 2033 denotes an HTTPS server used by this device 2004 to provide an HTTPS service. Reference numeral 2032 denotes a site certificate which is actually used by the HTTPS server 2033 of this device. Reference numeral 2034 denotes a Web service provider module which provides a Web service using this HTTPS server 2033.

Reference numeral 2041 denotes a route along which the site certificate update operation execution module 2011 of the management apparatus 2002 issues an instruction to execute a site certificate update operation to the site certificate update module of the operation target device 2004. Reference numeral 2042 denotes a route along which this site certificate update module 2031 accesses the Web service provider 2024 of the device 2001 on which the management apparatus runs to acquire a site certificate. The Web service provider 2024 returns the management target device site certificate 2012 held by the management apparatus 2002 from the site certificate download service 2013 via the HTTPS server 2023. The site certificate update module 2031 replaces an old certificate stored in the site certificate 2032 by the new site certificate acquired in this way via a route 2050.

On the other hand, the site certificate update operation execution module 2011 also issues a site certificate update instruction to the site certificate update module 2021 of the device 2001 on which the management apparatus 2002 runs via a route 2043. The site certificate update module 2021 directly acquires a new site certificate from the management target device site certificate 2012 via a route 2044, and replaces the site certificate 2022 by the new one via a route 2047.

It is considered that the Web service provider 2024 of the device 2001, on which the management apparatus 2002 runs, operates using the HTTPS server 2023 via a route 2049. At this time, the HTTPS server 2023 accesses the site certificate 2022 via a route 2048 for the SSL protocol, and executes authentication using this information.

The same applies to the device 2004 different from the device on which the management apparatus runs. The Web service provider 2034 uses the HTTPS server 2033 via a route 2052. Upon using the SSL protocol, the HTTPS server 2033 accesses the site certificate 2032 via a route 2051 to use it in authentication.

In the route 2042, the site certificate update module 2031 of another device 2004 acquires the management target device site certificate 2012 from the device 2001 on which the management apparatus 2002 runs. At this time, the site certificate update module 2031 has to use the Web service provider 2024. Since the site certificate is important in terms of the security, it is the rule to use the SSL upon transferring the site certificate from the device 2001 on the management apparatus side to the management target device 2004.

Figure 21:
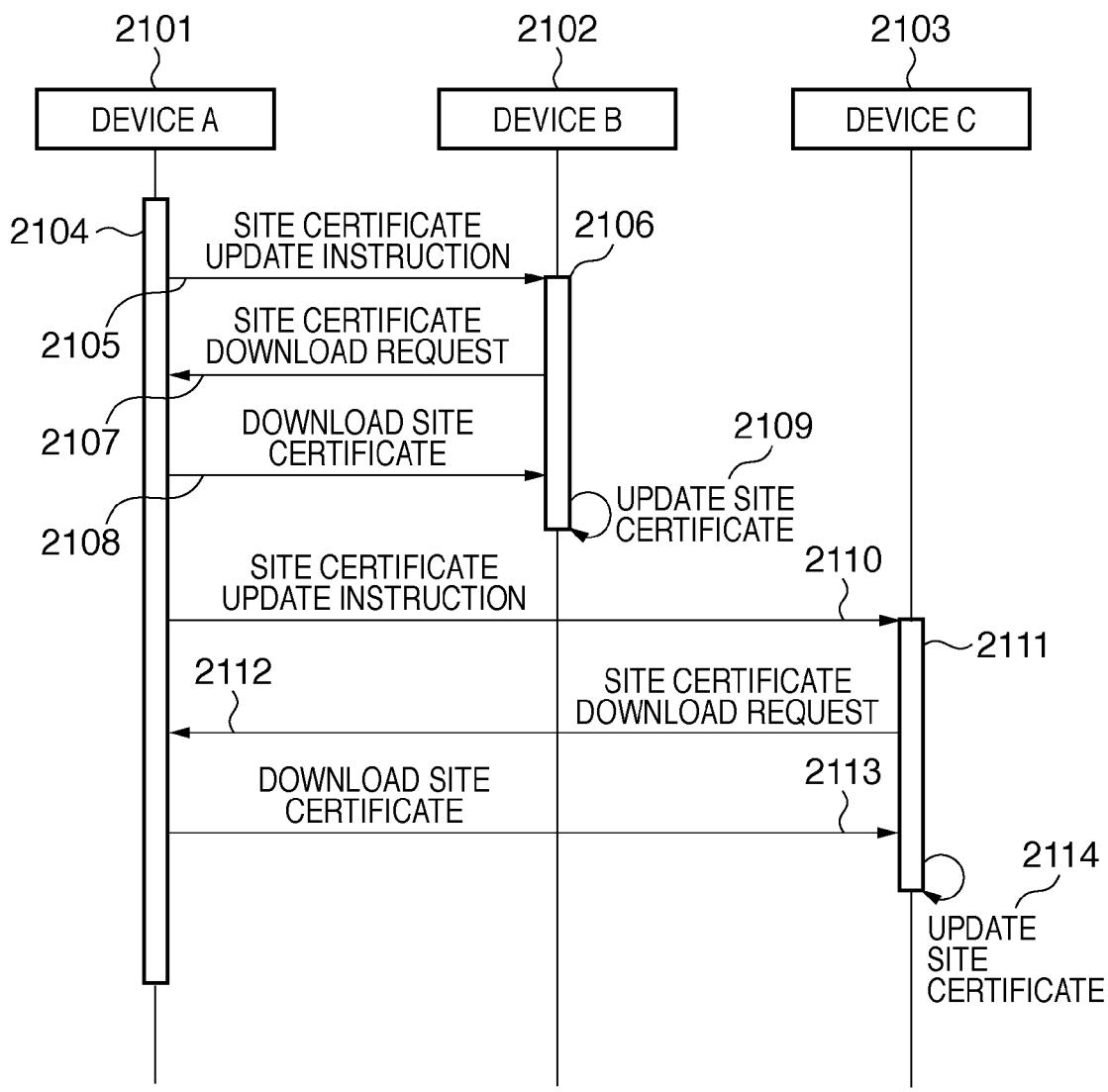
FIG. 21 is a sequence chart for explaining the sequence executed when the management apparatus according to the first embodiment of the present invention updates the site certificates of a plurality of devices.

FIG. 21 is a sequence chart when the management apparatus executes an operation for updating site certificates of a plurality of devices since they are expired to devices other than the self device. Reference numeral 2101 denotes a device A as the management apparatus itself. Reference numeral 2102 denotes a device B as another management target. Reference numeral 2103 denotes a device C as still another management target.

Reference numeral 2104 denotes a site certificate update task executed when the site certificate update operation execution module 2011 of the device A 2101 updates the site certificates of the devices B 2102 and C 2103. The device A 2101 as the management apparatus sends a site certificate update instruction to the device B 2102 (2105). The site certificate update module 2031 of the device B 2102 executes a site certificate update operation (2106). The device B 2102 transmits a site certificate download request to the Web service provider 2024 of the device A 2101 (2107). The device A 2101 transmits a site certificate to the device B 2102 (2108). The device B 2102 updates the downloaded site certificate (2109).

Furthermore, the device A 2101 as the management apparatus sends a site certificate update instruction to the device C 2103 (2110). The site certificate update module 2031 of the device C 2103 executes a site certificate update operation (2111). The device C 2103 transmits a site certificate download request to the Web service provider 2024 of the device A 2101 (2112). The device A 2101 transmits a site certificate to the device C 2103 (2113). The device C 2103 updates the site certificate (2114).

This case is premised on that the site certificate of the device A is valid since it assumes a situation in which the site certificate of the device A need not be updated. Therefore, respective connections (2107, 2108, 2112, and 2113) based on the SSL protocol via the Web service providers never fail. For this reason, the site certificate update operations of the respective devices are completed without any problem in this sequence.

Figure 22:
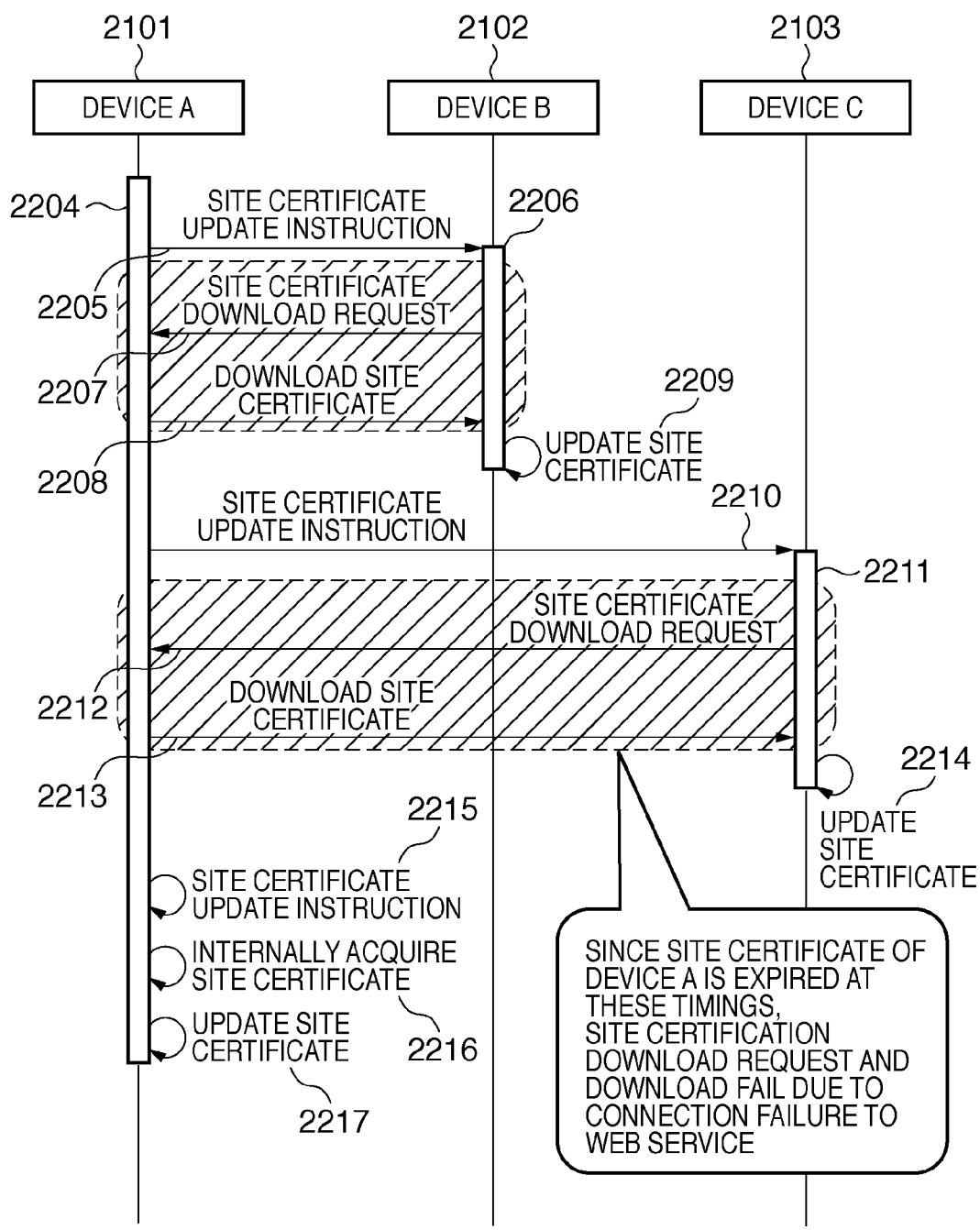
FIG. 22 is a sequence chart for explaining a problem posed in a case in which the processing order is not considered when a conventional management apparatus updates the site certificates of a plurality of devices including the self device.

FIG. 22 is a sequence chart when the management apparatus executes an operation for updating site certificates of a plurality of devices including the self device since they are expired, without taking any measure.

As in FIG. 21, reference numeral 2101 denotes a device A on which the management apparatus itself runs. Reference numeral 2102 denotes a device B. Reference numeral 2103 denotes a device C.

Reference numeral 2204 denotes a task executed when the site certificate update operation execution module 2011 of the device A updates the site certificates of the devices A 2101, B 2102, and C 2103. The device A 2101 sends a site certificate update instruction to the device B 2102 (2205). The site certificate update module 2031 of the device B 2102 executes a site certificate update operation (2206). The device B 2102 transmits a site certificate download request to the Web service provider 2024 of the device A 2101 (2207). However, in this case, since the site certificate 2022 of the device A 2101 is expired, this connection fails.

Note that this connection does not fail if it is set to ignore an expired site certificate upon SSL connection. However, the following description will be given under the assumption that it is set not to ignore an expired site certificate in terms of the security.

Therefore, a site certificate download operation (2208) which should have been executed after that operation also fails. A site certificate update operation (2209) also fails since it is not executed.

For the same reason as described above, a download request of a site certificate by the device C 2103 also fails. That is, as can be seen from the above description, management operations for devices fail unless any measure is taken for the processing order of devices in such situation.

FIGS. 24 and 25 are flowcharts for explaining an example of the sequence executed when the management apparatus of this embodiment executes a site certificate update operation in such case.

The management apparatus starts processing from step S2401. In step S2402, the management apparatus sets "success" in the execution result of a task. In step S2403, the management apparatus generates an operation target device list based on the user's selection result.

In step S2404, the management apparatus selects the first entry of the generated operation target device list as an entry of interest. The management apparatus checks in step S2405 if the processing for the self device is complete. If YES in step S2405, the process advances to step S2518; otherwise, the process advances to step S2406.

The management apparatus checks in step S2406 if the current entry of interest indicates a device on which the management apparatus itself runs. If NO in step S2406, the process advances to step S2407; otherwise, the process advances to step S2408.

In step S2407, the management apparatus temporarily saves the contents of the current entry of interest. After that, the process advances to step S2521.

In step S2408, the management apparatus updates a site certificate of the device on which the management apparatus itself runs as the entry of interest. The management apparatus checks in step S2409 if execution of the update operation has succeeded. If the update operation has succeeded, the process jumps to step S2511. If the update operation has failed, the process advances to step S2410, and the management apparatus sets "failure" in the task execution result. After that, the process advances to step S2511.

The management apparatus checks in step S2511 if the temporarily saved entries exist. If NO in step S2511, the process jumps to step S2521. If YES in step S2511, the process advances to step S2512.

In step S2512, the management apparatus selects a first one of the temporary saved entries as an entry of interest. In step S2513, the management apparatus updates a site certificate of a device indicated by the temporarily saved entry of interest. The management apparatus checks in step S2514 if execution of the update operation has succeeded. If the operation has succeeded, the process jumps to step S2516. If the operation has failed, the process advances to step S2515, and the management apparatus sets "failure" in the task execution result. After that, the process advances to step S2516.

The management apparatus checks in step S2516 if the temporarily saved entries still remain. If such entries still remain, the process advances to step S2517 to select the next one of the temporarily saved entries. Then, the management apparatus continues the processes from step S2513. If no temporarily saved entry remains in step S2516, the process advances to step S2521.

If the processing for the self device is complete in step S2405, the process advances to step S2518. In step S2518, the management apparatus updates a site certificate of a device indicated by the entry of interest. The management apparatus checks in step S2519 if execution of the update operation has succeeded. If the operation has succeeded, the process jumps to step S2521. If the operation has failed, the management apparatus sets "failure" in the task execution result in step S2520. After that, the process advances to step S2521.

The management apparatus checks in step S2521 if the operation target device list includes the next entry. If YES in step S2521, the process advances to step S2522 to select the next entry in the operation target device list as an entry of interest. The process then returns to step S2405 to continue the processes.

If the operation target device list does not include the next entry, the process advances to step S2523 to save the task execution result. After that, the process advances to step S2524, thus ending the processing.

Figure 23:
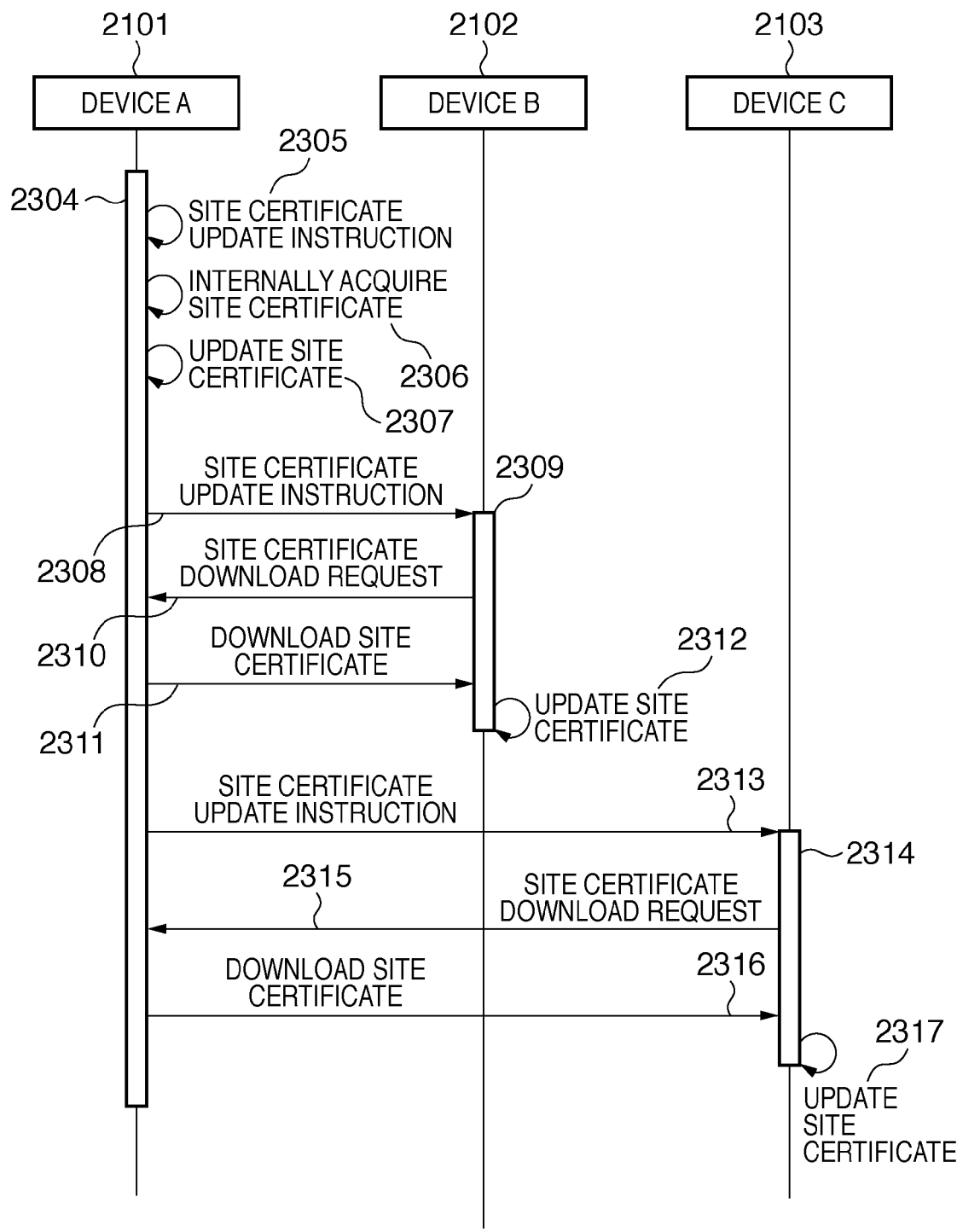
FIG. 23 is a sequence chart for explaining a case in which the processing order is considered when the management apparatus according to the first, second, and third embodiments of the present invention updates the site certificates of a plurality of devices including the self device.

FIG. 23 is a sequence chart of the site certificate update operation when the processing is executed according to FIGS. 24 and 25. Reference numeral 2101 denotes a device A. Reference numeral 2102 denotes a device B. Reference numeral 2103 denotes a device C. Reference numeral 2304 denotes a task executed when the device A 2101 as the management apparatus updates site certificates of the devices A 2101, B 2102, and C 2103. The management apparatus of the device A 2101 temporarily saves site certificate update operations of the devices B 2102 and C 2103 in step S2407. As a result, the process advances to step S2408, and the device A 2101 gives the instruction to update a site certificate of itself (2305). The site certificate update module 2021 of the device A 2101 acquires a site certificate using the route 2044 (2306). The device A updates the site certificate 2022 via a route 2046 (2307).

In this way, the site certificate of the device A 2101 is updated, and the subsequent connection to the Web service provider 2024 of the device A 2101 can be authenticated using the valid site certificate. Hence, a site certificate update operation of the device B 2102 starting from a timing 2308 and that of the device C 2103 starting from a timing 2313 can be executed without any problem, thus completing the task.

As described above, the management apparatus of this embodiment is configured to successfully execute the processing associated with the site certificate update operation.

<SNMP Protocol Stack ON/OFF Operation>

An SNMP protocol stack ON/OFF switching operation of a device will be examined as yet another operation. A device to be handled as the management apparatus or management target in this embodiment includes the SNMP manager or agent function, as shown in FIG. 14. Note that the SNMP protocol includes two types, that is, version 1 and version 3, and these two types of protocols are not compatible with each other. Therefore, an SNMP manager in which only the SNMP version 1 (to be abbreviated as SNMPv1 hereinafter) is ON cannot manage an SNMP agent in which the SNMPv1 is OFF. Likewise, an SNMP manager in which only the SNMP version 3 (to be abbreviated as SNMPv3 hereinafter) is ON cannot manage an SNMP agent in which the SNMPv3 is OFF.

When the SNMP manager of the device as the management apparatus itself sets, for example, only the SNMPv1 to ON, switching the SNMPv1 of the self SNMP agent to OFF poses a problem. That is, switching the protocol used to manage itself to OFF means that there is no means for returning it to ON. In this case, this means that the self device can no longer be managed at that time, and no means for returning to a manageable state is available.

The table shown in FIG. 26 summarizes this relationship. When only the SNMPv1 is ON, switching the SNMPv1 of the SNMP agent to OFF by the SNMP manager, that is, the management apparatus side poses a problem, as described above. When only the SNMPv3 is ON, switching the SNMPv3 of the SNMP agent to OFF by the SNMP manager similarly poses a problem. Therefore, as for the SNMP protocol ON/OFF switching operation, whether or not to apply this operation to itself has to be determined in consideration of the condition. However, since this condition is not definite, as shown in FIG. 26, it is very difficult for the user to make a correct decision to stop the operation.

FIG. 27 is a sequence chart of processing executed when the management apparatus of this embodiment executes an SNMP protocol stack ON/OFF operation for a device A 2701 on which the management apparatus itself runs, and other devices B 2702 and C 2703.

Reference numeral 2704 denotes a task for executing an SNMP ON/OFF operation. The device A 2701 issues an SNMP ON/OFF instruction to the device B 2702 (2705). Upon reception of this instruction, the device B 2702 executes the SNMP ON/OFF processing (2706), and notifies the device A 2701 of this result (2707).

The device A 2701 issues an SNMP ON/OFF instruction to the device C 2703 (2708). Upon reception of this instruction, the device C 2703 executes SNMP ON/OFF processing (2709), and notifies the device A 2701 of the result (2710).

The device A 2701 issues an SNMP ON/OFF instruction to itself (2711), and notifies itself of that result (2712).

However, as described above, issuance of the SNMP ON/OFF instruction to itself (2711) poses a problem. In such case, the SNMP ON/OFF instruction to itself is automatically skipped, thus implementing safe device management operations without imposing any extra load on the user.

FIG. 28 is a flowchart that describes an example of processing for executing an SNMP protocol stack ON/OFF operation with respect to a plurality of devices including the self device in consideration of the above situation.

The management apparatus starts processing from step S2801. The management apparatus checks in step S2802 if execution of the designated SNMP ON/OFF operation for the self device is OK. If YES in step S2802, the process advances to step S2803 to execute the SNMP ON/OFF operations for the selected devices including the self device. The process then advances to step S2805.

If NO in step S2802, the process advances to step S2804 to execute the SNMP ON/OFF operations of the selected devices except for the self device. After that, the process advances to step S2805. In step S2805, the management apparatus ends the processing.

FIG. 29 is a flowchart that describes, in more detail, processing in step S2804 executed when the management apparatus of this embodiment executes the SNMP ON/OFF operation for a plurality of devices except for the self device.

In step S2901, the management apparatus starts processing. In step S2902, the management apparatus sets "success" in the execution result of a task. In step S2903, the management apparatus generates an operation target device list based on the user's selection result.

In step S2904, the management apparatus selects the first entry of the operation target device list generated in step S2903 as an entry of interest. The management apparatus checks in step S2905 if the current entry of interest indicates a device on which the management apparatus itself runs. If YES in step S2905, the process jumps to step S2909; otherwise, the process advances to step S2906.

In step S2906, the management apparatus executes an SNMP ON/OFF operation for a device indicated by the entry of interest. The management apparatus checks in step S2907 if the SNMP ON/OFF operation has succeeded. If the operation has succeeded, the process jumps to step S2909. If the operation has failed, the process advances to step S2908, and the management apparatus sets "failure" in the task execution result. After that, the process advances to step S2909.

The management apparatus checks in step S2909 if the operation target device list includes the next entry. If YES in step S2909, the process advances to step S2910; otherwise, the process jumps to step S2911.

In step S2910, the management apparatus selects the next entry in the operation target device list as an entry of interest, and the process returns to step S2905 to continue the processes. If the process reaches step S2911, the management apparatus ends the processing.

FIG. 30 is a flowchart that describes, in more detail, processing in step S2803 executed when the management apparatus of this embodiment executes an SNMP ON/OFF operation for all of a plurality of devices including the self device.

In step S3001, the management apparatus starts processing. In step S3002, the management apparatus sets "success" in the execution result of a task. In step S3003, the management apparatus generates an operation target device list based on the user's selection result. In step S3004, the management apparatus selects the first entry of the operation target device list generated in step S3003 as an entry of interest. In step S3006, the management apparatus executes an SNMP ON/OFF operation for a device indicated by the entry of interest. The management apparatus checks in step S3007 if the SNMP ON/OFF operation has succeeded. If the operation has succeeded, the process jumps to step S3009. If the operation has failed, the process advances to step S3008, and the management apparatus sets "failure" in the task execution result. After that, the process advances to step S3009.

The management apparatus checks in step S3009 if the operation target device list includes the next entry. If YES in step S3009, the process advances to step S3010; otherwise, the process jumps to step S3011.

In step S3010, the management apparatus selects the next entry in the operation target device list as an entry of interest, and the process returns to step S3006 to continue the processes. If the process reaches step S3011, the management apparatus ends the processing.

Figure 31:
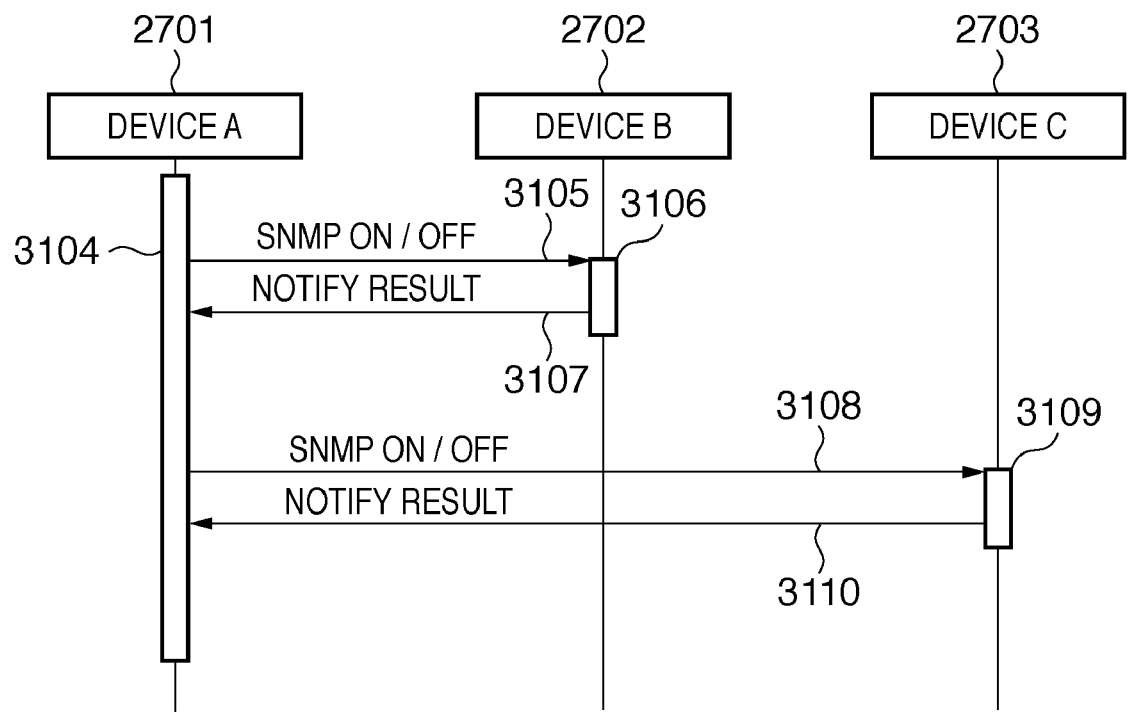
FIG. 31 is a sequence chart for explaining a case in which the management apparatus according to the first, second, and third embodiments of the present invention skips an SNMP ON/OFF operation for itself when it executes that operation for a plurality of devices including the self device.

FIG. 31 is a sequence chart of processing when the management apparatus of this embodiment is designated to execute a management operation designated with an SNMP ON/OFF operation which is inhibited from being applied to the self device. Reference numeral 2701 denotes a device A on which the management apparatus runs. Reference numeral 2702 denotes a device B. Reference numeral 2703 denotes a device C.

Reference numeral 3104 denotes a task executed by the device A 2701 as the management apparatus to apply an SNMP ON/OFF operation. The device A 2701 issues an SNMP ON/OFF operation instruction to the device B 2702 (3105). The device B 2702 executes the SNMP ON/OFF operation (3106). The device B 2702 notifies the device A 2701 of that result (3107).

Subsequently, the device A 2701 issues an SNMP ON/OFF instruction to the device C 2703 (3108). The device C 2703 executes the SNMP ON/OFF operation (3109), and notifies the device A 2701 of the result (3110).

After that, since the SNMP ON/OFF operation to the device A itself is skipped, the task ends at this timing.

As described above, according to this embodiment, even when the network device management apparatus runs on a device which may be selected as a management target, the order of operation for the self device is considered in correspondence with various management operations upon execution of these management operations, thus executing them without posing any problem.

As described above, when a management operation to be executed is designated, and the self apparatus is selected as a management target, the network device management apparatus of this embodiment sets the order of execution of the management operation for the self apparatus to be an order determined in accordance with the type of the management operation. The management apparatus then executes the management operation for network devices as the management targets in the set order. More specifically, upon execution of a management operation that requires resetting a network device as a management target such as an IP address re-setting instruction via the SNMP or a protocol stack ON/OFF setting instruction, the management apparatus sets the execution order of the management operation to the self apparatus to be the end of target devices. On the other hand, upon execution of a management operation which is to be applied to other devices using the management operation result for the self apparatus such as a DNS server re-setting instruction and a site certificate update instruction, the management apparatus sets the execution order of the management operation for the self apparatus to be the head of target devices.

When the self apparatus is selected as a management target, the management apparatus checks according to the type of the management operation whether or not execution of the management operation for the self apparatus is adequate. The types of management operations which are inadequate to be executed for the self apparatus include downloading of a file from the network management apparatus via the HTTPS that requires to provide a site certificate, delivery of device setting information, and an ON/OFF setting of a protocol used in the management operation. When the management operation of such type is designated, the management apparatus executes the management operation for network devices as management targets except for the self apparatus.

For this reason, even when the network device management apparatus runs on a network device, the management operations can be appropriately applied to a plurality of network devices including the self device, and can be successfully executed.

Second Embodiment

The second embodiment of the present invention will be described hereinafter with reference to the drawings. A view showing the overall configuration of a network device management system of this embodiment is the same as that shown in FIG. 1. Also, a block diagram showing the internal arrangement of a PC 104 of this embodiment is the same as that shown in FIG. 2. Block diagrams showing examples of the internal arrangements of an MFP of this embodiment are the same as those shown in FIGS. 3 and 4.

The sequence of processing executed when a search module of a management apparatus of this embodiment conducts a search is the same as that shown in FIG. 5. Also, a device list generated by this search module is the same as that shown in FIG. 6.

A flowchart that describes the sequence executed when the user selects devices from the device list, and applies a management operation to these selected devices in this embodiment is the same as that shown in FIG. 7. Examples of windows that appear in this sequence are the same as those shown in FIGS. 8, 9, 10, and 11.

A flowchart that describes the sequence of processing for changing the installation locations of a plurality of devices including a device on which the management apparatus runs in this embodiment is the same as that shown in FIG. 12. Also, the sequence for generating an operation target device list from the selection result in step S1203 and the device list in this processing is the same as that shown in FIG. 13.

The mutual relationship of relating modules upon changing the installation location of a device in this embodiment is the same as that shown in FIG. 14.

Furthermore, a management operation for switching a protocol stack used in management operations to ON or OFF is executed in the sequence shown in FIGS. 28 to 30 as in the first embodiment. Processing unique to this embodiment with respect to the first embodiment will be described below.

<IP Address Change Operation>

Figure 32:
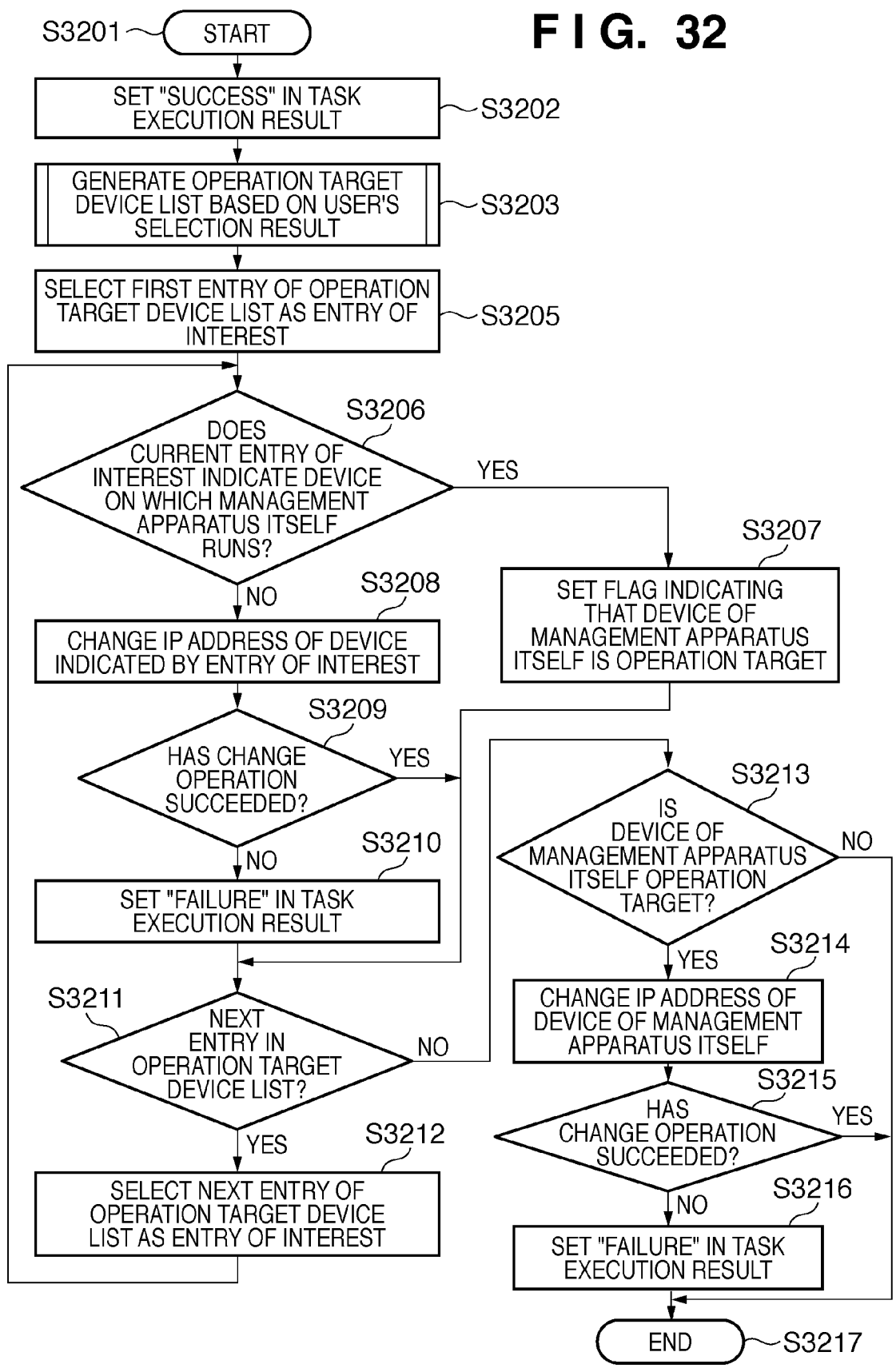
FIG. 32 is a flowchart for explaining an example of the sequence executed when the management apparatus according to the second embodiment of the present invention changes the IP addresses of devices selected by the user.

FIG. 32 is a flowchart that describes an example of the sequence of processing executed when the management apparatus of this embodiment executes an IP address change operation for a plurality of devices including the self device. This processing is executed in place of FIG. 15 of the first embodiment.

The management apparatus starts processing from step S3201. The management apparatus sets success in the execution result of a task in step S3202. The management apparatus generates an operation target device list based on the user's selection result in step S3203. In step S3205, the management apparatus selects the first entry of the operation target device list as an entry of interest. The management apparatus checks in step S3206 if the current entry of interest indicates a device on which the management apparatus itself runs. If YES in step S3206, the process advances to step S3207; otherwise, the process advances to step S3208.

In step S3207, the management apparatus sets a flag indicating that the management apparatus itself is selected as an operation target. After that, the process jumps to step S3211.

In step S3208, the management apparatus changes the IP address of a device indicated by the entry of interest. The management apparatus checks in step S3209 if the IP address change operation has succeeded. If the operation has succeeded, the process jumps to step S3211. If the operation has failed, the process advances to step S3210, and the management apparatus sets "failure" in the task execution result. After that, the process advances to step S3211.

The management apparatus checks in step S3211 if the operation target device list includes the next entry. If YES in step S3211, the process advances to step S3212; otherwise, the process advances to step S3213.

In step S3212, the management apparatus selects the next entry of the operation target device list as an entry of interest. The process then returns to step S3206 to continue the processes.

The management apparatus checks in step S3213 if the device of the management apparatus itself is an operation target. If YES in step S3213, the process advances to step S3214; otherwise, the process jumps to step S3217.

In step S3214, the management apparatus changes the IP address of the device of the management apparatus itself. The management apparatus checks in step S3215 if the IP address change operation has succeeded. If the operation has succeeded, the process jumps to step S3217. If the operation has failed, the process advances to step S3216.

In step S3216, the management apparatus sets "failure" in the task execution result. After that, the process advances to step S3217. If the process reaches step S3217, the management apparatus ends the processing.

As described above, according to this embodiment, whether or not the device of the management apparatus itself is a management target is checked, and that result is saved as a flag. In addition, the processing for the device of the management apparatus itself is skipped after the last entry, thus successfully changing the IP address. A sequence chart of the operation state at this time is the same as that shown in FIG. 18.

In this way, the IP address change operation of network devices can be normally completed even when management targets include the self apparatus.

<Site Certificate Update Operation>

A case will be explained below wherein the management apparatus of this embodiment updates a site certificate. The site certificate in this embodiment is the same as that which is used in authentication of a site in the SSL and is shown in FIG. 19.

A view showing the mutual relationship of relating modules when the management apparatus of this embodiment updates a site certificate of a device is the same as that shown in FIG. 20.

Figure 33:
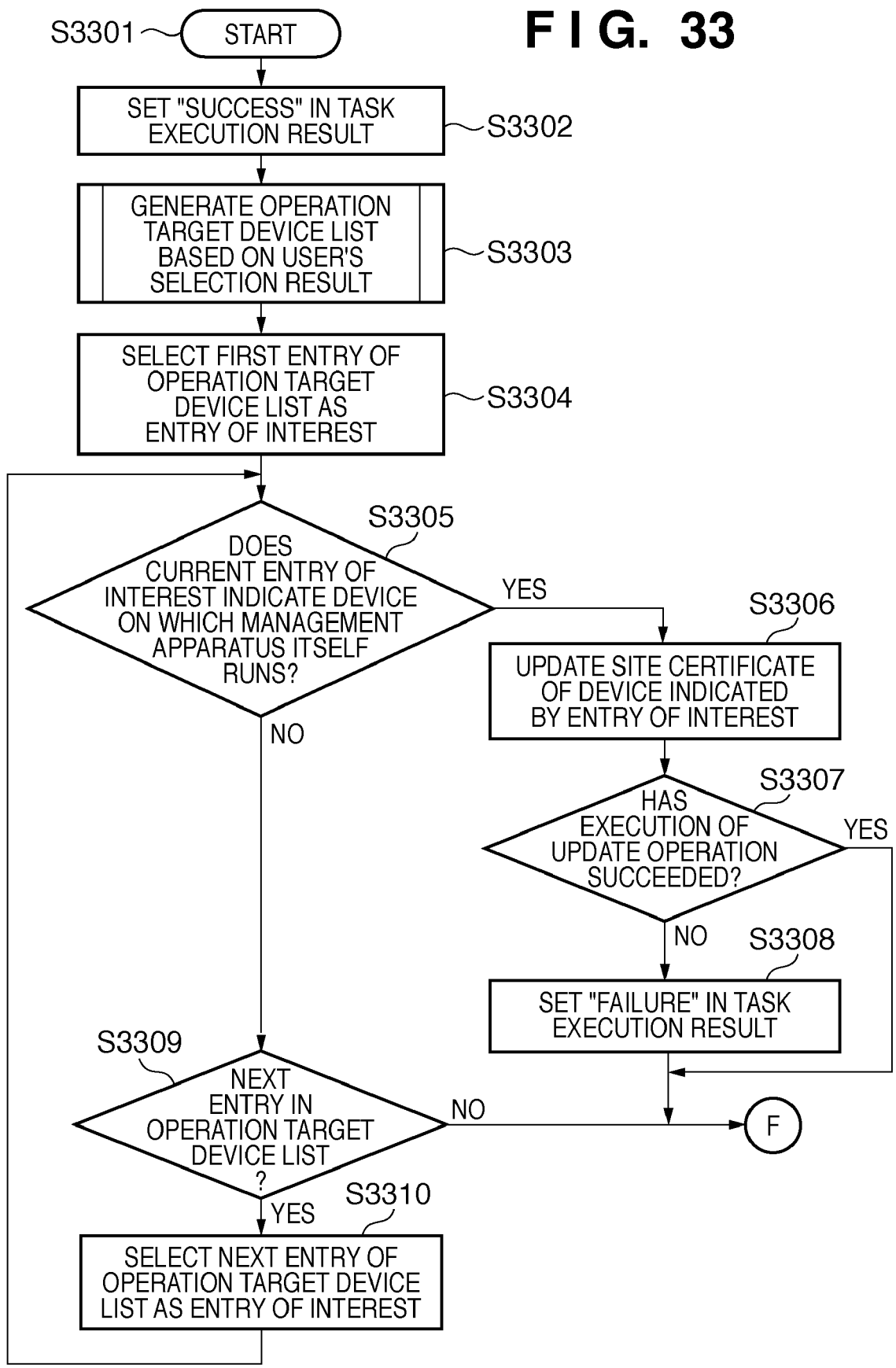
FIG. 33 is a part of a flowchart for explaining an example of the sequence executed when the management apparatus according to the second embodiment of the present invention updates the site certificates of devices selected by the user.
Figure 34:
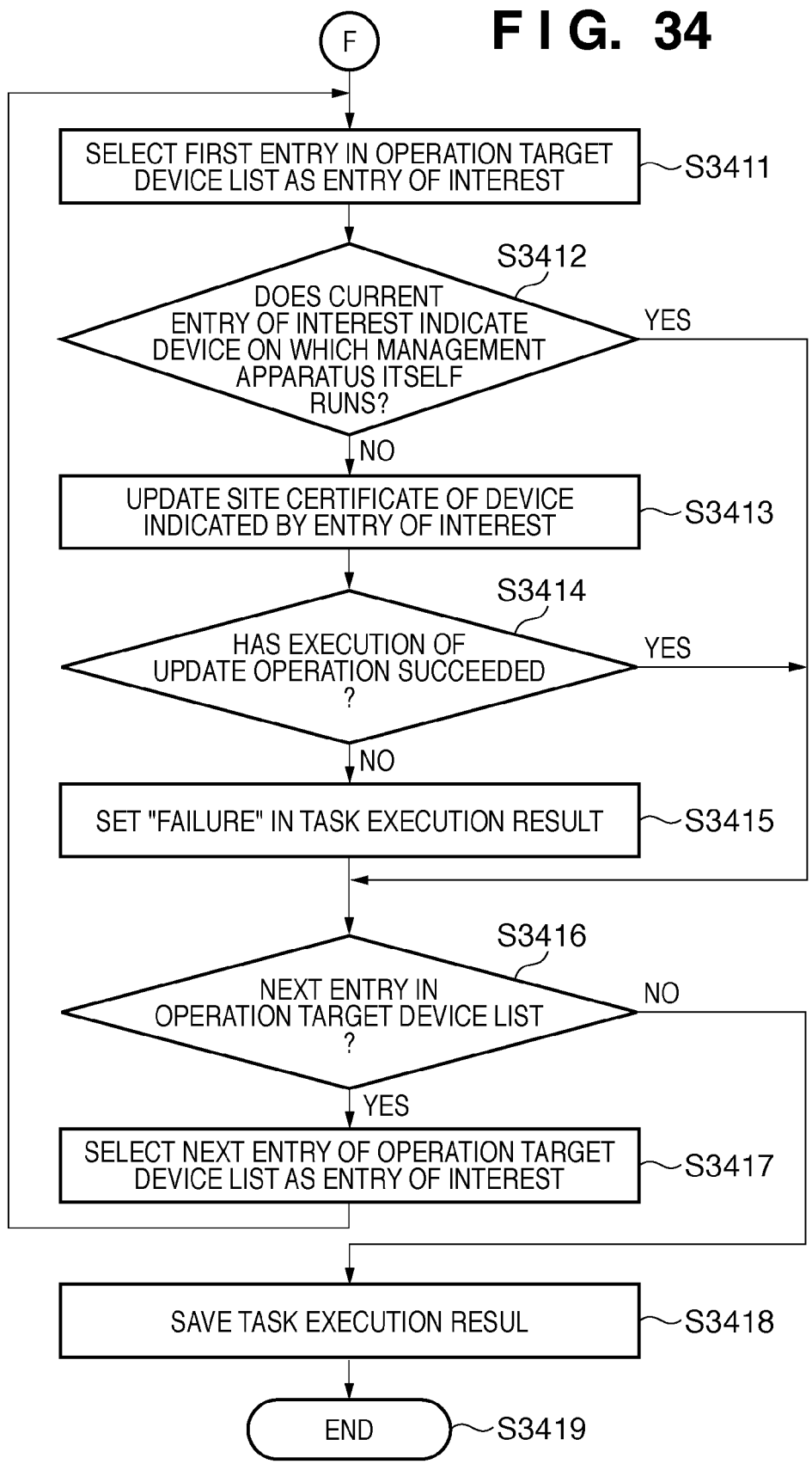
FIG. 34 is another part of a flowchart for explaining an example of the sequence executed when the management apparatus according to the second embodiment of the present invention updates the site certificates of devices selected by the user.

FIGS. 33 and 34 are flowcharts that describe an example of the sequence of processing executed when the management apparatus of this embodiment updates a site certificate of a device.

The management apparatus starts processing from step S3301. In step S3302, the management apparatus sets "success" in the execution result of a task. In step S3303, the management apparatus generates an operation target device list based on the user's selection result.

In step S3304, the management apparatus selects, as an entry of interest, the first entry of the operation target device list generated in step S3303. The management apparatus checks in step S3305 if the current device of interest indicates a device on which the management apparatus itself runs. If YES in step S3305, the process advances to step S3306; otherwise, the process advances to step S3309.

In step S3306, the management apparatus updates a site certificate of a device indicated by the entry of interest. The management apparatus checks in step S3307 if the site certificate update operation has succeeded. If the operation has succeeded, the process jumps to step S3411. If the operation has failed, the process advances to step S3308, and the management apparatus sets "failure" in the task execution result. After that, the process advances to step S3411.

The management apparatus checks in step S3309 if the operation target device list includes the next entry. If YES in step S3309, the process advances to step S3310; otherwise, the process advances to step S3411. In step S3310, the management apparatus selects the next entry of the operation target device list as an entry of interest. After that, the process returns to step S3305 to continue the processes.

In step S3411, the management apparatus selects the first entry of the operation target device list as an entry of interest again. The management apparatus checks in step S3412 if the current entry of interest indicates a device on which the management apparatus itself runs. If YES in step S3412, the process jumps to step S3416; otherwise, the process advances to step S3413.

In step S3413, the management apparatus updates a site certificate of a device indicated by the entry of interest. The management apparatus checks in step S3414 if execution of the update operation has succeeded. If the operation has succeeded, the process jumps to step S3416. If the operation has failed, the process advances to step S3415.

In step S3415, the management apparatus sets "failure" in the task execution result. After that, the process advances to step S3416.

The management apparatus checks in step S3416 if the operation target device list includes the next entry. If YES in step S3416, the process advances to step S3417; otherwise, the process advances to step S3418.

In step S3417, the management apparatus selects the next entry of the operation target device list as an entry of interest. After that, the process returns to step S3412 to continue the processes. If the process reaches step S3418, the management apparatus ends the processing. The operation sequence at that time is the same as that shown in FIG. 23.

In this way, the site certificate update operation of network devices can be normally completed even when management targets include the self apparatus.

<SNMP Protocol Stack ON/OFF Operation>

An operation for switching ON/OFF of an SNMP protocol stack of a device by the management apparatus of this embodiment will be described below. The sequence of processing executed when the management apparatus of this embodiment switches ON/OFF of an SNMP protocol stack of a device is the same as those shown in FIGS. 28, 29, and 30. A sequence chart in such processing is the same as those shown in FIGS. 27 and 31.

As described above, according to this embodiment, even in a case in which the management apparatus runs on a device as a management target, a management operation can be applied to devices of management targets without any failure as in the first embodiment.

Third Embodiment

The third embodiment of the present invention will be described hereinafter with reference to the drawings. In this embodiment, a device iterator sorted according to the designated management operation is generated in advance from a device list, and the management operation is executed for each management target device according to the device iterator.

A view showing the overall configuration of a network device management system of this embodiment is the same as that shown in FIG. 1. Also, a block diagram showing the internal arrangement of a PC 104 of this embodiment is the same as that shown in FIG. 2. Block diagrams showing examples of the internal arrangements of an MFP of this embodiment are the same as those shown in FIGS. 3 and 4.

The sequence of processing executed when a search module of a management apparatus of this embodiment conducts a search is the same as that shown in FIG. 5. Also, a device list generated by this search module is the same as that shown in FIG. 6. A flowchart that describes the sequence executed when the user selects devices from the device list, and applies a management operation to these selected devices in this embodiment is the same as that shown in FIG. 7. Examples of windows that appear in this sequence are the same as those shown in FIGS. 8, 9, 10, and 11.

Figure 36:
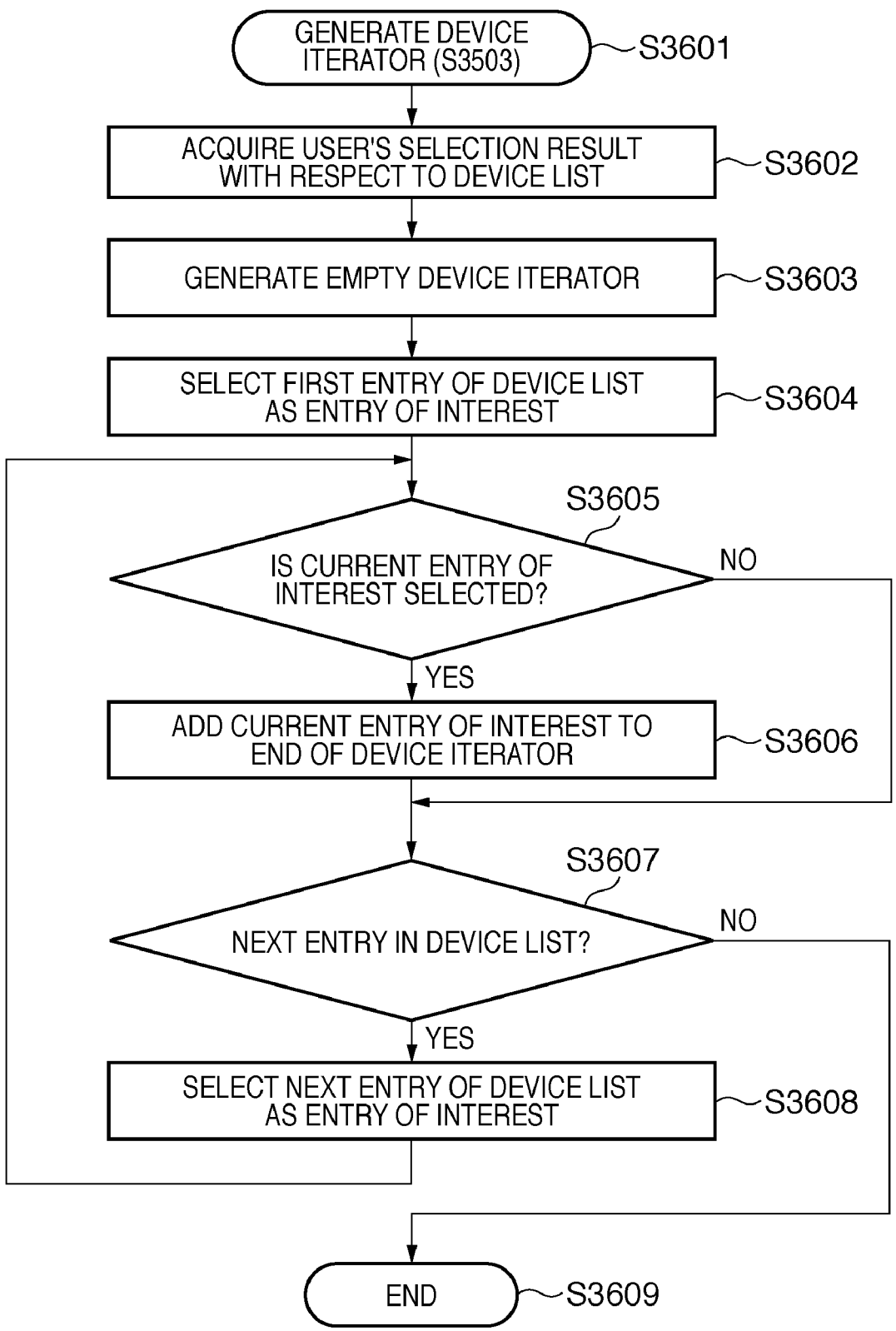
FIG. 36 is a flowchart for explaining an example of the sequence executed when the management apparatus according to the third embodiment of the present invention generates a device iterator from devices selected by the user when it changes the installation locations of devices selected by the user.
Figure 38:
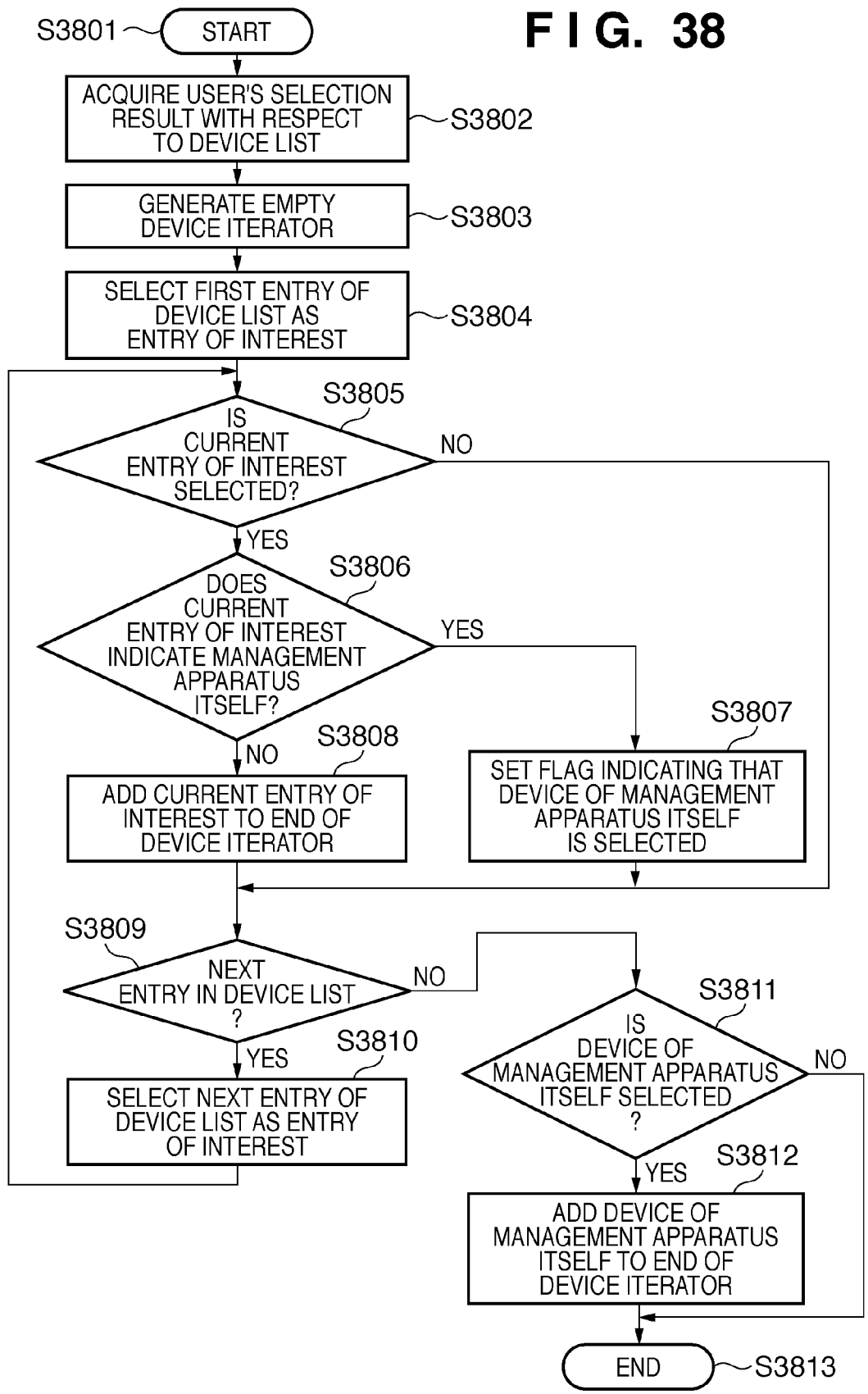
FIG. 38 is a flowchart for explaining an example of the sequence executed when the management apparatus according to the third embodiment of the present invention generates a device iterator from devices selected by the user when it changes the IP addresses of devices selected by the user.
Figure 40:
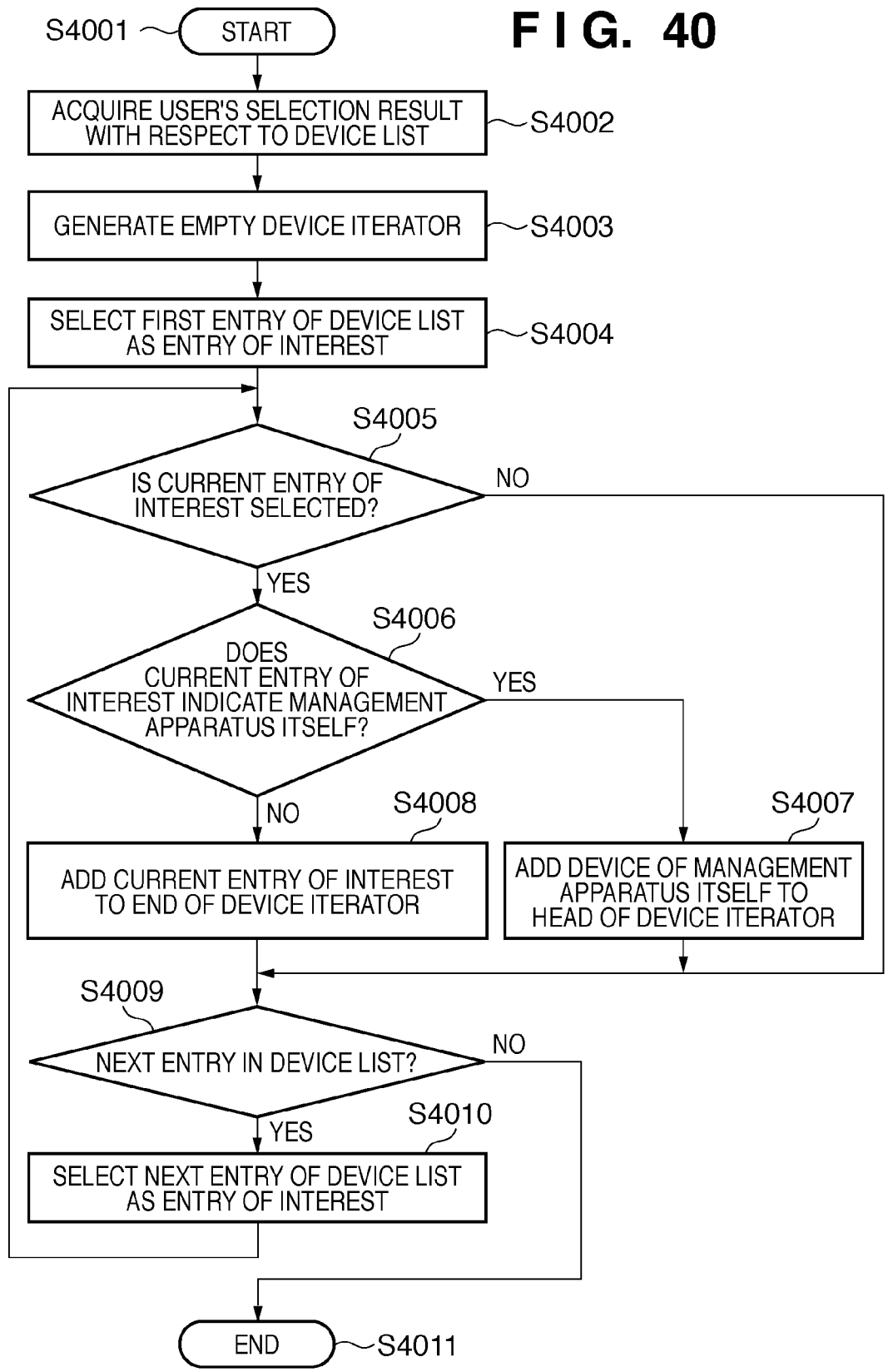
FIG. 40 is a flowchart for explaining an example of the sequence executed when the management apparatus according to the third embodiment of the present invention generates a device iterator from devices selected by the user when it updates the site certificates of devices selected by the user.

The processing sequence unique to this embodiment will be described below. In this embodiment, device iterator generation processing is an independent sequence for each type of the designated management operation. However, the type of management operation may be checked, and the processing sequence of a device iterator may be switched according to the checking result. In this case, a network device management apparatus checks the type of the designated management operation. For example, when the management operation is an installation location change operation according to the checking result, FIG. 36 is executed as the device iterator generation processing. FIG. 36 is executed not only for the installation location change operation, but also for a management operation when the device itself as the network device management apparatus (i.e., the self apparatus) is selected as a management target, and the order of processing for the self apparatus does not influence the processing for other devices. For example, when the management operation is an IP address change operation according to the checking result, FIG. 38 is executed as the device iterator generation processing. FIG. 38 is executed not only for the IP address change operation, but also for a management operation when the device itself as the network device management apparatus (i.e., the self apparatus) is selected as a management target, and the device is reset by the management operation. For example, this processing is also executed for a management operation that sets a protocol stack to be ON or OFF. Furthermore, when the management operation is a site certificate update operation, FIG. 40 is executed as the device iterator generation processing. FIG. 40 is executed not only for the site certificate update operation, but also for a management operation when the device itself as the network device management apparatus (i.e., the self apparatus) is selected as a management target, and the management operation refers to the result of the management operation for the self apparatus. For example, this processing is also executed for a management operation that sets a protocol stack to be ON or OFF. Moreover, when the management operation is that which switches a protocol stack (SNMP in this embodiment) to ON or OFF, FIG. 42 is executed as the device iterator generation processing.

Figure 35:
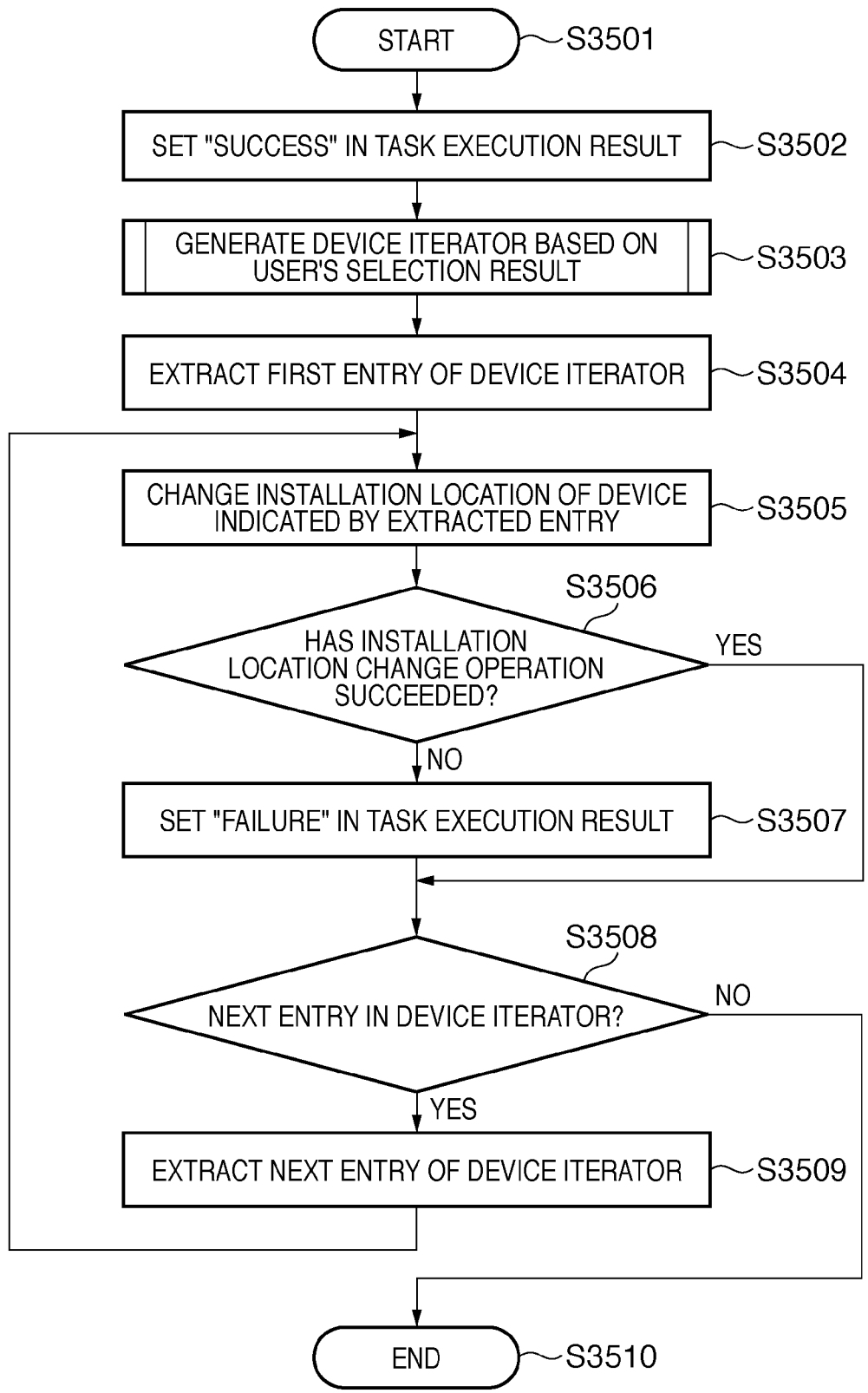
FIG. 35 is a flowchart for explaining an example of the sequence executed when the management apparatus according to the third embodiment of the present invention changes the installation locations of devices selected by the user.

In this manner, when the device iterator generation processing is unified, management operations themselves can be executed in the sequence shown in, for example, FIG. 35 independently of their types. Processing unique to this embodiment with respect to the first embodiment will be described below.

<Installation Location Change Operation>

FIG. 35 is a flowchart that describes the sequence of processing for changing the installation locations of a plurality of devices including a device on which the management apparatus runs in this embodiment.

The management apparatus starts processing from step S3501. In step S3502, the management apparatus of this embodiment sets "success" in the execution result of a task. In step S3503, the management apparatus generates a device iterator based on the user's selection result.

In step S3504, the management apparatus extracts the first entry of the device iterator generated in step S3503. In step S3505, the management apparatus changes the installation location of a device indicated by the extracted entry. The management apparatus checks in step S3506 if the installation location change operation has succeeded. If the operation has succeeded, the process jumps to step S3508. If the operation has failed, the process advances to step S3507, and the management apparatus sets "failure" in the task execution result. After that, the process advances to step S3508.

The management apparatus checks in step S3508 if the device iterator includes the next entry. If YES in step S3508, the process advances to step S3509; otherwise, the process jumps to step S3510.

In step S3509, the management apparatus extracts the next entry from the device iterator. The process then returns to step S3505 to continue the processes. If the process reaches step S3510, the management apparatus ends the processing.

<Device Iterator Generation Processing>

FIG. 36 is a flowchart showing an example of the sequence executed when the management apparatus generates a device iterator in step S3503 in this embodiment.

The management apparatus starts processing from step S3601. In step S3602, the management apparatus of this embodiment acquires a user's selection result for the device list. In step S3603, the management apparatus generates an empty device iterator. In step S3604, the management apparatus selects the first entry of the device list as an entry of interest. The management apparatus checks in step S3605 if the current entry of interest is selected. If YES in step S3605, the process advances to step S3606; otherwise, the process jumps to step S3607.

If the process reaches step S3606, the management apparatus adds the current entry of interest to the end of the device iterator. The process then advances to step S3607.

The management apparatus checks in step S3607 if the device list includes the next entry. If YES in step S3607, the process advances to step S3608; otherwise, the process jumps to step S3609.

In step S3608, the management apparatus selects the next entry of the device list as an entry of interest. The process then returns to step S3605 to continue the processes. If the process reaches step S3609, the management apparatus ends processing. The mutual relationship of relating modules upon changing the installation location of a device in this embodiment is the same as that shown in FIG. 14.

<IP Address Re-setting Operation>

Figure 37:
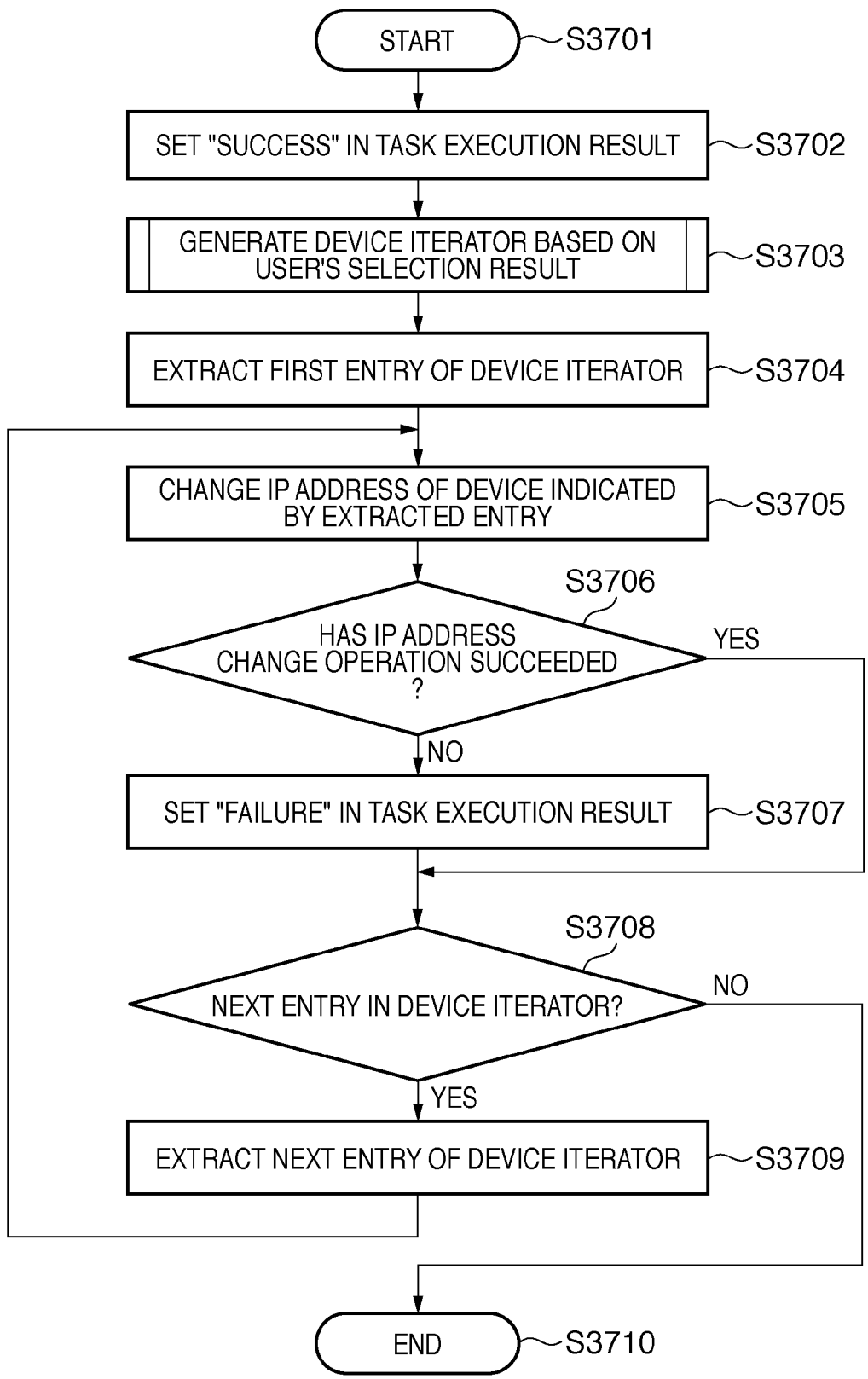
FIG. 37 is a flowchart for explaining an example of the sequence executed when the management apparatus according to the third embodiment of the present invention changes the IP addresses of devices selected by the user.

FIG. 37 is a flowchart that describes an example of the sequence of processing executed when the management apparatus of this embodiment executes an IP address change operation for a plurality of devices including itself. The management apparatus starts processing in step S3701. In step S3702, the management apparatus of this embodiment sets "success" in the execution result of a task. In step S3703, the management apparatus generates a device iterator based on the user's selection result. In step S3704, the management apparatus extracts the first entry of the device iterator generated in step S3703. In step S3705, the management apparatus changes the IP address of a device indicated by the extracted entry. The management apparatus checks in step S3706 if the IP address change operation has succeeded. If the operation has succeeded, the process jumps to step S3708. If the operation has failed, the process advances to step S3707, and the management apparatus sets "failure" in the task execution result. After that, the process advances to step S3708.

The management apparatus checks in step S3708 if the device iterator includes the next entry. If YES in step S3708, the process advances to step S3709; otherwise, the process jumps to step S3710.

In step S3709, the management apparatus extracts the next entry from the device iterator. The process then returns to step S3705 to continue the processes. If the process reaches step S3710, the management apparatus ends the processing.

FIG. 38 is a flowchart showing an example of the sequence executed when the management apparatus generates a device iterator in step S3703 in this embodiment.

The management apparatus starts processing from step S3801. In step S3802, the management apparatus of this embodiment acquires a user's selection result for the device list. In step S3803, the management apparatus generates an empty device iterator. In step S3804, the management apparatus selects the first entry of the device list as an entry of interest. The management apparatus checks in step S3805 if the current entry of interest is selected. If YES in step S3805, the process advances to step S3806; otherwise, the process jumps to step S3809.

The management apparatus checks in step S3806 if the current entry of the interest indicates a device of the management apparatus itself. If YES in step S3806, the process advances to step S3807; otherwise, the process advances to step S3808.

In step S3807, the management apparatus sets a flag indicating that the device of the management apparatus itself is selected. The process then advances to step S3809. In step S3808, the management apparatus adds the current entry of interest to the end of the device iterator. The process then advances to step S3809.

The management apparatus checks in step S3809 if the device list includes the next entry. If YES in step S3809, the process advances to step S3810; otherwise, the process jumps to step S3811.

In step S3810, the management apparatus selects the next entry of the device list as an entry of interest. The process then returns to step S3805 to continue the processes.

The management apparatus checks in step S3811 if the device of the management apparatus itself is selected. If the flag indicating selection is set, the process advances to step S3812; otherwise, the process jumps to step S3813.

In step S3812, the management apparatus adds the device of the management apparatus itself to the end of the device iterator. The process then advances to step S3813.

If the process reaches step S3813, the management apparatus ends the processing. A sequence chart of the operation state at that time is the same as that shown in FIG. 18.

With the aforementioned sequence as well, when a management operation that requires resetting a device is applied to a plurality of devices including the self apparatus, the operation associated with the self apparatus can be executed at the end of the order as in the first embodiment. For this reason, management operations associated with other devices can also be executed.

<Site Certificate Update Operation>

A case will be explained below wherein the management apparatus of this embodiment updates a site certificate of a device. The site certificate in this embodiment is the same as that which is used in authentication of a site in the SSL and is shown in FIG. 19. A view showing the mutual relationship of relating modules when the management apparatus of this embodiment updates a site certificate of a device is the same as that shown in FIG. 20.

Figure 39:
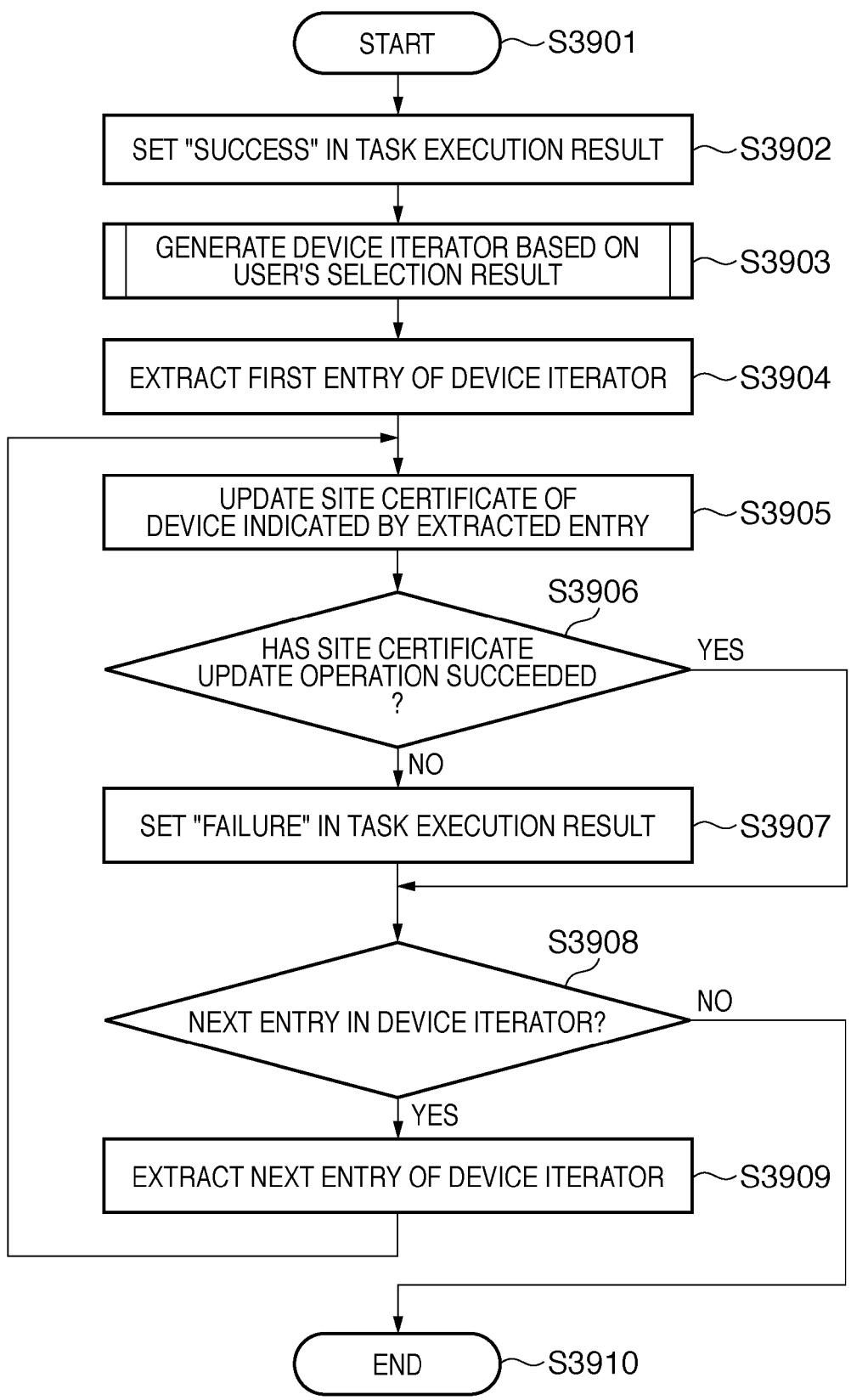
FIG. 39 is a flowchart for explaining an example of the sequence executed when the management apparatus according to the third embodiment of the present invention updates the site certificates of devices selected by the user.

FIG. 39 is a flowchart that describes an example of the sequence of processing upon execution of a site certificate update operation for a plurality of devices including itself in this embodiment.

The management apparatus starts processing from step S3901. In step S3902, the management apparatus of this embodiment sets "success" in the execution result of a task. In step S3903, the management apparatus generates a device iterator based on the user's selection result. In step S3904, the management apparatus extracts the first entry of the device iterator generated in step S3903. In step S3905, the management apparatus updates a site certificate of a device indicated by the extracted entry. The management apparatus checks in step S3906 if the site certificate update operation has succeeded. If the operation has succeeded, the process jumps to step S3908. If the operation has failed, the process advances to step S3907, and the management apparatus sets "failure" in the task execution result. After that, the process advances to step S3908.

The management apparatus checks in step S3908 if the device iterator includes the next entry. If YES in step S3908, the process advances to step S3909; otherwise, the process jumps to step S3910.

In step S3909, the management apparatus extracts the next entry from the device iterator. The process then returns to step S3905 to continue the processes. If the process reaches step S3910, the management apparatus ends the processing.

FIG. 40 is a flowchart showing an example of the sequence executed when the management apparatus generates a device iterator in step S3903 in this embodiment.

The management apparatus starts processing from step S4001. In step S4002, the management apparatus of this embodiment acquires a user's selection result for the device list. In step S4003, the management apparatus generates an empty device iterator. In step S4004, the management apparatus selects the first entry of the device list as an entry of interest. The management apparatus checks in step S4005 if the current entry of interest is selected. If YES in step S4005, the process advances to step S4006; otherwise, the process jumps to step S4009.

The management apparatus checks in step S4006 if the current entry of the interest indicates a device of the management apparatus itself. If YES in step S4006, the process advances to step S4007; otherwise, the process advances to step S4008.

In step S4007, the management apparatus adds the device of the management apparatus itself to the head of the device iterator. The process then advances to step S4009.

In step S4008, the management apparatus adds the current entry of interest to the end of the device iterator. The process then advances to step S4009.

The management apparatus checks in step S4009 if the device list includes the next entry. If YES in step S4009, the process advances to step S4010; otherwise, the process jumps to step S4011.

In step S4010, the management apparatus selects the next entry of the device list as an entry of interest. The process then returns to step S4005 to continue the processes. If the process reaches step S4011, the management apparatus ends the processing. An operation sequence at that time is the same as that shown in FIG. 23.

With the above sequence, a management operation to be executed first for the self apparatus (e.g., a site certificate update operation) can be applied first to the self apparatus. For this reason, a management operation for other devices can be completed without causing any error.

<SNMP ON/OFF Operation>

A case will be described below wherein the management apparatus of this embodiment executes an SNMP ON/OFF operation of a device.

Figure 41:
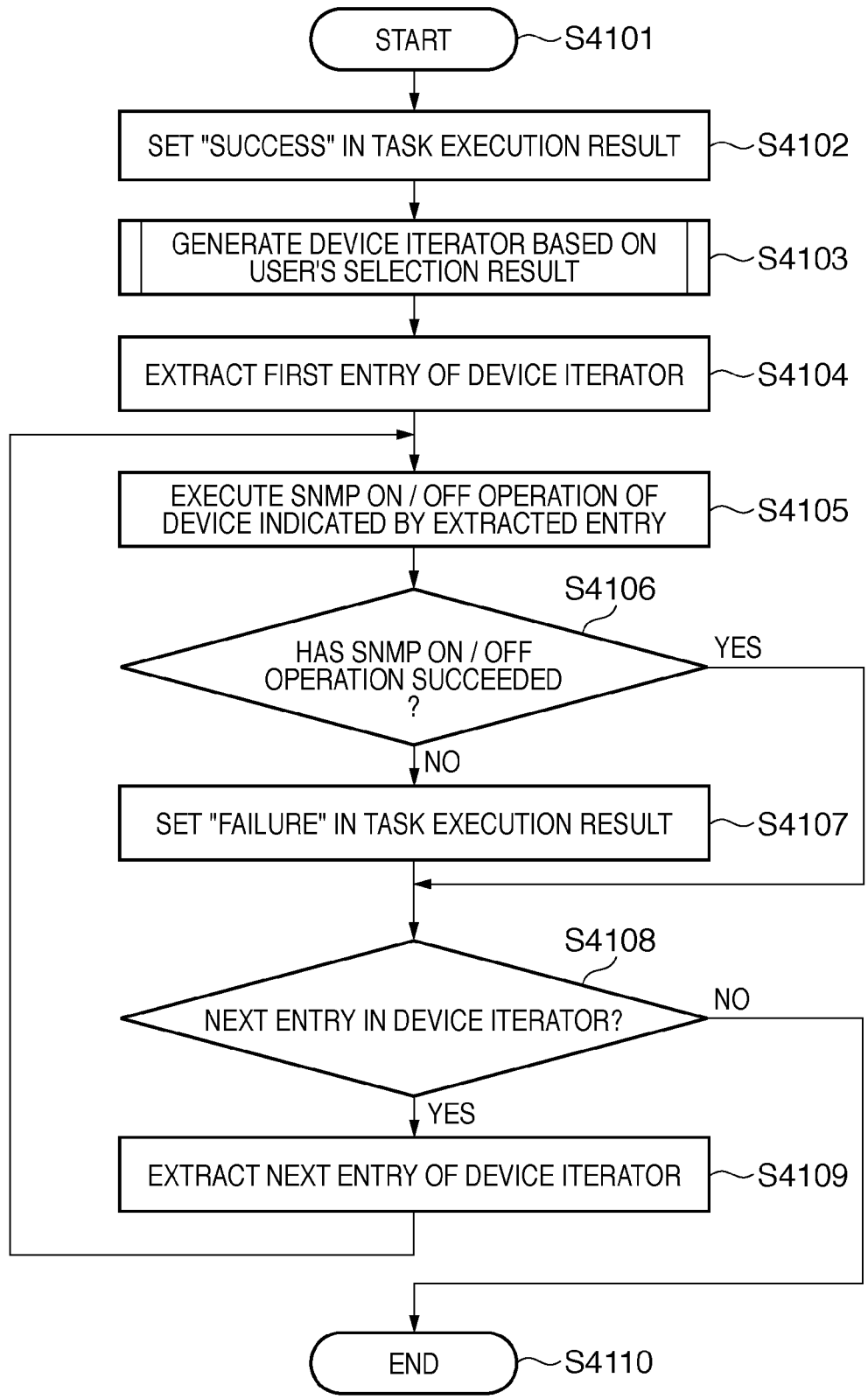
FIG. 41 is a flowchart for explaining an example of the sequence executed when the management apparatus according to the third embodiment of the present invention executes an SNMP ON/OFF operation of devices selected by the user.

FIG. 41 shows the sequence of processing upon execution of an SNMP ON/OFF operation for a plurality of devices including itself in this embodiment.

The management apparatus starts processing from step S4101. In step S4102, the management apparatus of this embodiment sets "success" in the execution result of a task. In step S4103, the management apparatus generates a device iterator based on the user's selection result. In step S4104, the management apparatus extracts the first entry of the device iterator generated in step S4103. In step S4105, the management apparatus executes an SNMP ON/OFF operation of a device indicated by the extracted entry. The management apparatus checks in step S4106 if the SNMP ON/OFF operation has succeeded. If the operation has succeeded, the process jumps to step S4108. If the operation has failed, the process advances to step S4107, and the management apparatus sets "failure" in the task execution result. After that, the process advances to step S4108.

The management apparatus checks in step S4108 if the device iterator includes the next entry. If YES in step S4108, the process advances to step S4109; otherwise, the process jumps to step S4110.

In step S4109, the management apparatus extracts the next entry from the device iterator. The process then returns to step S4105 to continue the processes. If the process reaches step S4110, the management apparatus ends the processing.

FIG. 42 is a flowchart showing an example of the sequence executed when the management apparatus generates a device iterator in step S4103 in this embodiment.

The management apparatus starts processing from step S4201. In step S4202, the management apparatus of this embodiment acquires a user's selection result for the device list. In step S4203, the management apparatus generates an empty device iterator. In step S4204, the management apparatus selects the first entry of the device list as an entry of interest. The management apparatus checks in step S4205 if the current entry of interest is selected. If YES in step S4205, the process advances to step S4206; otherwise, the process jumps to step S4210.

The management apparatus checks in step S4206 if the current entry of the interest indicates a device of the management apparatus itself. If YES in step S4206, the process advances to step S4207; otherwise, the process advances to step S4209.

The management apparatus checks in step S4207 if the SNMP ON/OFF operation of the device of the management apparatus itself is OK. If YES in step S4207, the process advances to step S4208; otherwise, the process jumps to step S4210.

In step S4208, the management apparatus adds the device of the management apparatus itself to the end of the device iterator. The process then advances to step S4210.

In step S4209, the management apparatus adds the current entry of interest to the end of the device iterator. The process then advances to step S4210.

The management apparatus checks in step S4210 if the device list includes the next entry. If YES in step S4210, the process advances to step S4211; otherwise, the process jumps to step S4212.

In step S4211, the management apparatus selects the next entry of the device list as an entry of interest. The process then returns to step S4205 to continue the processes. If the process reaches step S4212, the management apparatus ends the processing.

Operation sequence charts in such processing are the same as those shown in FIGS. 27 and 31.

As described above, according to this embodiment, even in a case in which the management apparatus runs on a management target device, a management operation can be applied to devices of management targets without any failure as in the first and second embodiments.

Note that the present invention may be applied to either a system constituted by a plurality of devices (e.g., a host computer, interface device, reader, and printer), or an apparatus consisting of a single piece of equipment (e.g., a copying machine or facsimile apparatus). The objects of the present invention are also achieved when a recording medium which records a program code that implements the functions of the aforementioned embodiments is supplied to the system or apparatus, and a computer of that system or apparatus reads out and executes the program code stored in the storage medium. In this case, the program code itself read out from the storage medium implements the functions of the aforementioned embodiments, and the program code itself and the storage medium which stores the program code constitute the present invention.

Also, the present invention includes a case in which an operating system (OS) or the like running on a computer executes some or all of actual processes based on an instruction of the program code to implement the functions of the aforementioned embodiments. Furthermore, the present invention is also applicable to a case in which the program code read out from the storage medium is written in a memory equipped on a function expansion card or function expansion unit which is inserted in or connected to the computer. In this case, a CPU or the like equipped on the function expansion card or unit executes some or all of actual processes based on an instruction of the written program code to implement the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-051115, filed Feb. 29, 2008, which is hereby incorporated by reference herein in its entirety.

What is claimed is:

1. A network device management apparatus which can execute a management operation for a plurality of network devices, which are connected to a network and include a self apparatus, as management targets, said network device management apparatus comprising: at least a processor and memory, functioning as:

a designation unit, configured to designate a management operation to be executed for the plurality of network devices; and an execution unit, configured to determine an order of execution of the management operation for the self apparatus in accordance with a type of the management operation designated by said designation unit, and execute the management operation for the plurality of network devices, wherein, when the management operation requires resetting one of the plurality of network devices as a management target, the order of execution of the management operation for the self apparatus is determined to be an end of the plurality of network devices.

2. A network device management apparatus which can execute a management operation for a plurality of network devices, which are connected to a network and include a self apparatus, as management targets, said network device management apparatus comprising: at least a processor and memory, functioning as:

a designation unit, configured to designate a management operation to be executed for the plurality of network devices; and an execution unit, configured to determine an order of execution of the management operation for the self apparatus in accordance with a type of the management operation designated by said designation unit, and execute the management operation for the plurality of network devices, wherein, when the management operation uses a result of the management operation for the self apparatus, the order of execution of the management operation for the self apparatus is determined to be a head of the plurality of network devices.

3. The apparatus according to claim 2, wherein the management operation to be executed using the result of the management operation for the self apparatus includes a Domain Name Service (DNS) server re-setting instruction and a site certificate update instruction.

4. A network device management apparatus which can execute a management operation for a plurality of network devices, which are connected to a network and include a self apparatus, as management targets, said network device management apparatus comprising: at least a processor and memory, functioning as:

a designation unit, configured to designate a management operation to be executed for the plurality of network devices;

a determination unit, configured to determine, in accordance with a type of the management operation designated by said designation unit, whether or not execution of the management operation for the self apparatus is adequate; and an execution unit, configured to
execute the management operation for network devices except for the self apparatus when said determination unit determines that execution for the self apparatus is inadequate, and
execute the management operation for the plurality of network devices including the self apparatus when said determination unit determines that execution for the self apparatus is adequate, wherein the management operation which is inadequate to be executed for the self apparatus includes an instruction for downloading a file from said network device management apparatus via Hypertext Transfer Protocol Secure (HTTPS) that requires provision of a site certificate, delivery of device setting information, and an ON/OFF setting instruction of a protocol used in the management operation.

5. A device management method for controlling a network device management apparatus which can execute a management operation for a network device connected to a network as a management target, and in which a self apparatus can be the network device being the management target, comprising:

determining, when a management operation to be executed is designated, an order of execution of the management operation for the self apparatus in accordance with a type of the management operation; and executing the management operation for the network device, wherein, when the management operation requires resetting one of the plurality of network devices as the management target, the order of execution of the management operation for the self apparatus is determined to be an end of plurality of network devices.

6. The method according to claim 5, wherein, when the management operation to be executed uses a result of the management operation for the self apparatus, the order of execution of the management operation for the self apparatus is determined to be a head of a plurality of network devices.

7. A device management method for controlling a network device management apparatus which can execute a management operation for a network device connected to a network as a management target, and in which a self apparatus can be the network device being the management target, comprising:

a determination step of, when a management operation to be executed is designated, determining, in accordance with a type of the designated management operation, whether or not execution of the management operation for the self apparatus is adequate; and an execution step of, when it is determined in the determination step that execution is inadequate, executing the management operation for network devices as management targets except for the self apparatus, wherein the management operation which is inadequate to be executed for the self apparatus includes an instruction for downloading a file from the network device management apparatus via Hypertext Transfer Protocol Secure (HTTPS) that requires provision of a site certificate, delivery of device setting information, and an ON/OFF setting instruction of a protocol used in the management operation.

8. A non-transitory storage medium storing a program for making a computer execute steps of a device management method for controlling a network device management apparatus which can execute a management operation for a network device connected to a network as a management target, and in which a self apparatus can be the network device being the management target, said method comprising:

determining, when a management operation to be executed is designated, an order of execution of the management operation for the self apparatus in accordance with a type of the management operation; and executing the management operation for the network device, wherein, when the management operation requires resetting one of the network devices as the management target, the order of execution of the management operation for the self apparatus is determined to be an end of plurality of network devices.

9. A non-transitory storage medium storing a program for making a computer execute steps of a device management method for controlling a network device management apparatus which can execute a management operation for a network device connected to a network as a management target, and in which a self apparatus can be the network device as the management target, said method comprising:

a determination step of, when a management operation to be executed is designated, determining, in accordance with a type of the designated management operation, whether or not execution of the management operation for the self apparatus is adequate; and an execution step of, when it is determined in the determination step that execution is inadequate, executing the management operation for network devices as management targets except for the self apparatus, wherein the management operation which is inadequate to be executed for the self apparatus includes an instruction for downloading a file from the network device management apparatus via Hypertext Transfer Protocol Secure (HTTPS) that requires provision of a site certificate, delivery of device setting information, and an ON/OFF setting instruction of a protocol used in the management operation.

10. A device management method for controlling a network device management apparatus which can execute a management operation for a network device connected to a network as a management target, and in which a self apparatus can be the network device being the management target, comprising:

a designation step of designating a management operation to be executed for the plurality of network devices; and an execution step of determining an order of execution of the management operation for the self apparatus in accordance with a type of the management operation designated by said designation unit, and executing the management operation for the plurality of network devices, wherein, when the management operation uses a result of the management operation for the self apparatus, the order of execution of the management operation for the self apparatus is determined to be a head of the plurality of network devices.

11. A non-transitory storage medium storing a program for making a computer execute steps of a device management method for controlling a network device management apparatus which can execute a management operation for a network device connected to a network as a management target, and in which a self apparatus can be the network device being the management target, said method comprising:

a designation step of designating a management operation to be executed for the plurality of network devices; and an execution step of determining an order of execution of the management operation for the self apparatus in accordance with a type of the management operation designated by said designation unit, and executing the management operation for the plurality of network devices, wherein, when the management operation uses a result of the management operation for the self apparatus, the order of execution of the management operation for the self apparatus is determined to be a head of the plurality of network devices.

* * * * *